United States Patent [19]

Vincent

[11] 4,320,458
[45] Mar. 16, 1982

[54] WELL LOG PROCESSING TECHNIQUE

[75] Inventor: Philippe Vincent, Chilly Mazarin, France

[73] Assignee: Schlumberger Technology Corporation, New York, N.Y.

[21] Appl. No.: 94,597

[22] Filed: Nov. 15, 1979

Related U.S. Application Data

[63] Continuation of Ser. No. 362,160, May 21, 1973, abandoned.

[30] Foreign Application Priority Data

May 19, 1972 [FR] France .................. 72.17978

[51] Int. Cl.³ .................................... G06F 15/20
[52] U.S. Cl. .................................... 364/422; 324/323; 367/33
[58] Field of Search .......... 364/300, 422, 728; 324/323; 33/133, 142; 367/25, 33

[56] References Cited

U.S. PATENT DOCUMENTS

| | | | |
|---|---|---|---|
| 3,275,980 | 9/1966 | Foster | 367/46 |
| 3,449,553 | 6/1969 | Swan | 364/728 X |
| 3,512,127 | 5/1970 | Burg | 367/43 |
| 3,550,074 | 12/1970 | Kerns et al. | 367/42 |
| 3,568,143 | 3/1971 | Naquin, Jr. | 364/421 X |

OTHER PUBLICATIONS

Paulson and Merdler, "Automatic Seismic Reflection Picking", *Geophysics*, vol. 33, No. 3, (Jun. 1968), pp. 431–439.

*Primary Examiner*—Jerry Smith
*Attorney, Agent, or Firm*—Cooper, Dunham, Clark, Griffin & Moran

[57] ABSTRACT

An illustrative embodiment described herein discloses an automatic method of determining correlations between characteristic signal elements corresponding to common recognizable features represented by sampled signals. Specific types of characteristic elements are detected and their boundary positions and characteristic parameters recorded. These records are sorted according to predefined procedures employing relative positions of the boundaries. Efficient references are generated to provide search bounds and elements located above and below each boundary.

Specified types of elements are selected in a given order to provide a desired type of correlation. Compatible types of elements occurring within predefined search bounds are located and compared to determine corresponding elements. The comparison employs the use of the previously recorded characteristic parameters. As the correspondents are found, the search bounds are modified accordingly to guide the procedure in location of subsequent elements. The modification of the search bounds updates the previous references. The search bounds used for locating and comparing subsequent elements are consequently restricted to prevent miscomparison.

Use of boundary positions of the detected elements in the correlation process allows a natural determination of correlation and search intervals. Comparison of the characteristic parameters allows correlation of features of unequal length without the necessity of resampling or warping one or more of the signals.

When the correlation method is applied to dipmeter signals used to determine dip and strike information on subsurface formations penetrated by an exploration borehole, the displacements calculated from the resulting correlations produce more reliable and more detailed information than customary correlation methods.

31 Claims, 42 Drawing Figures

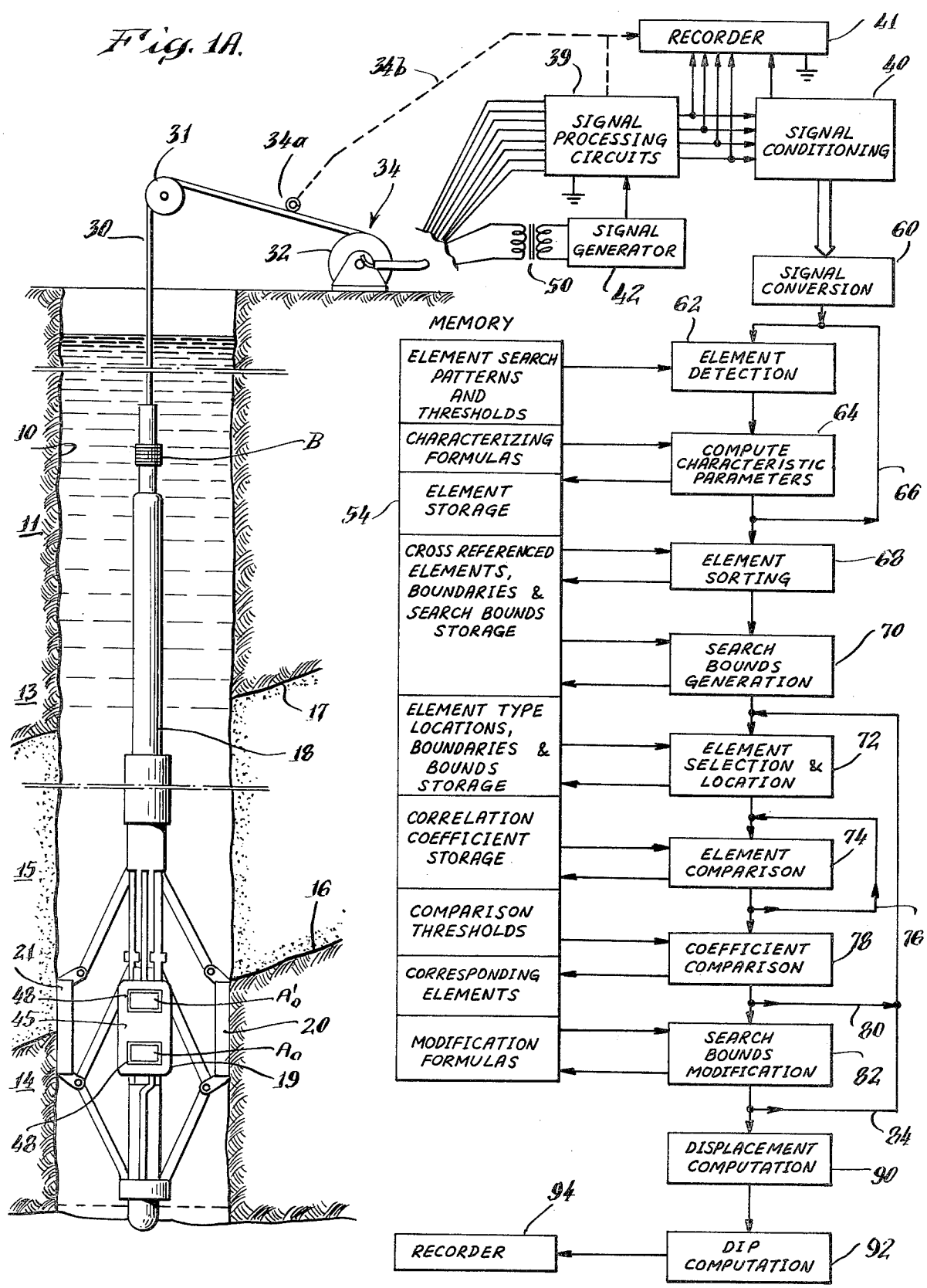

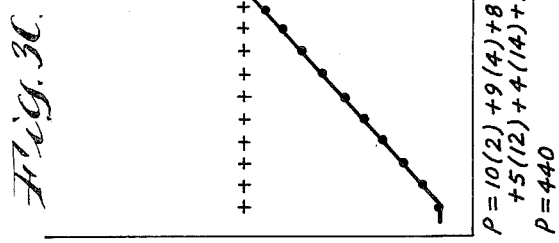
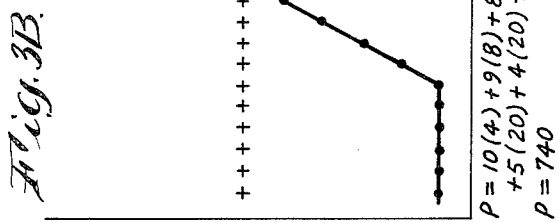
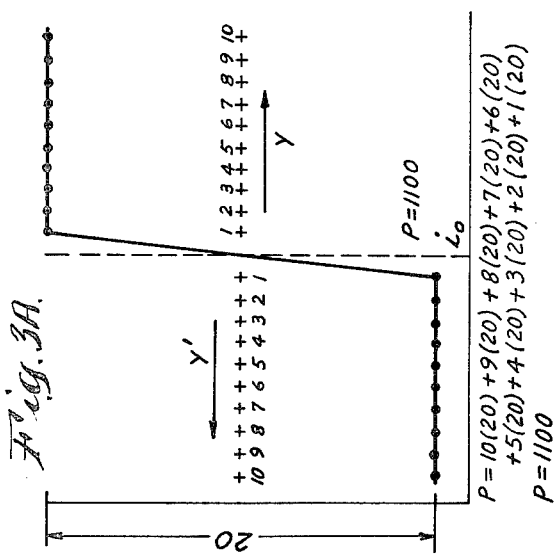
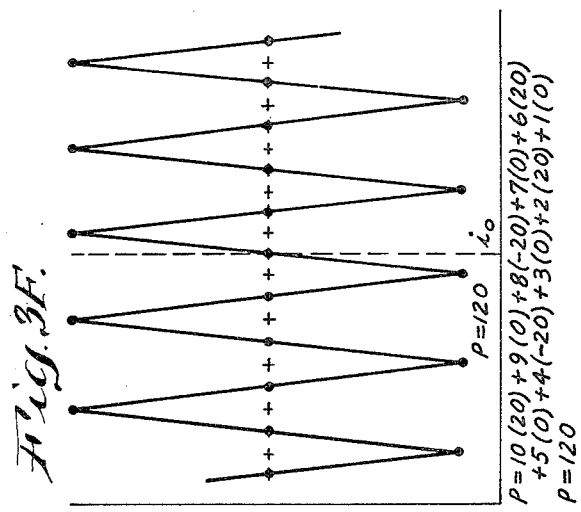
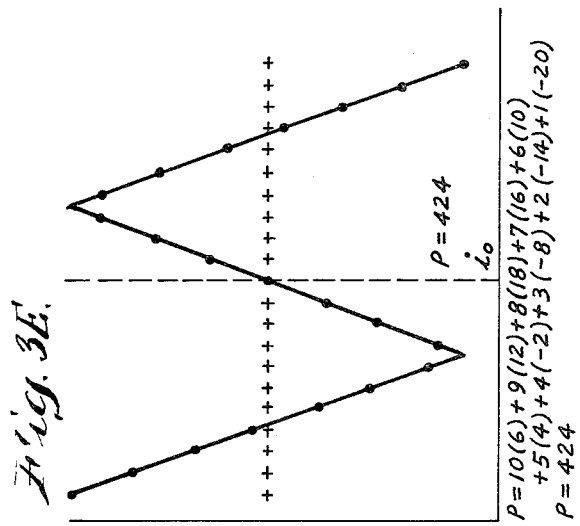
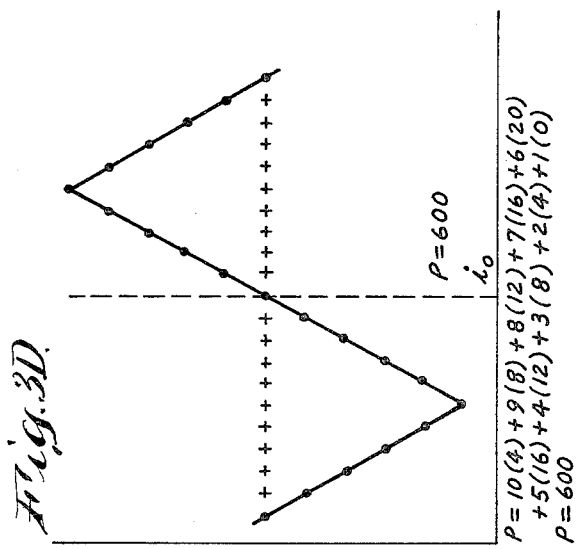

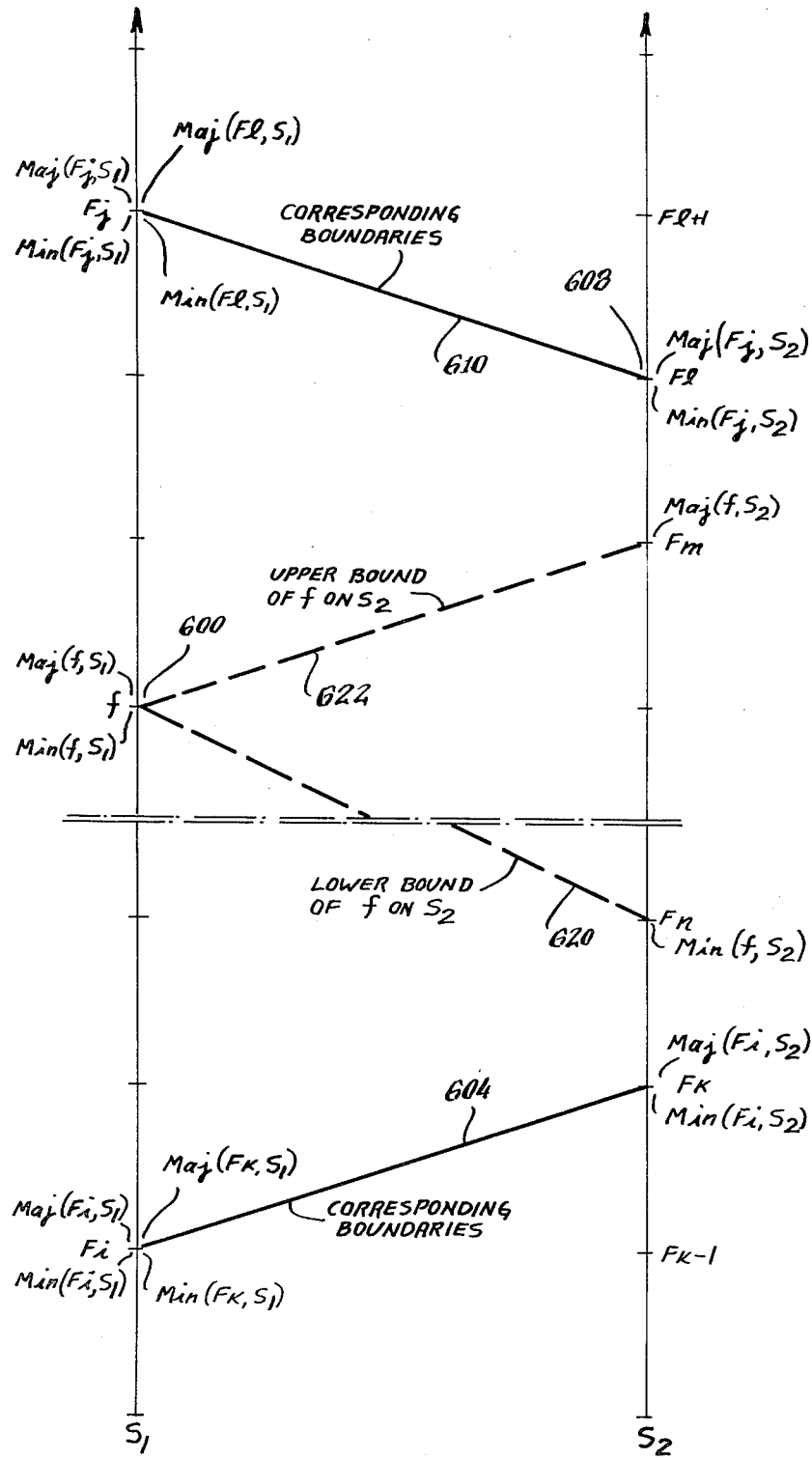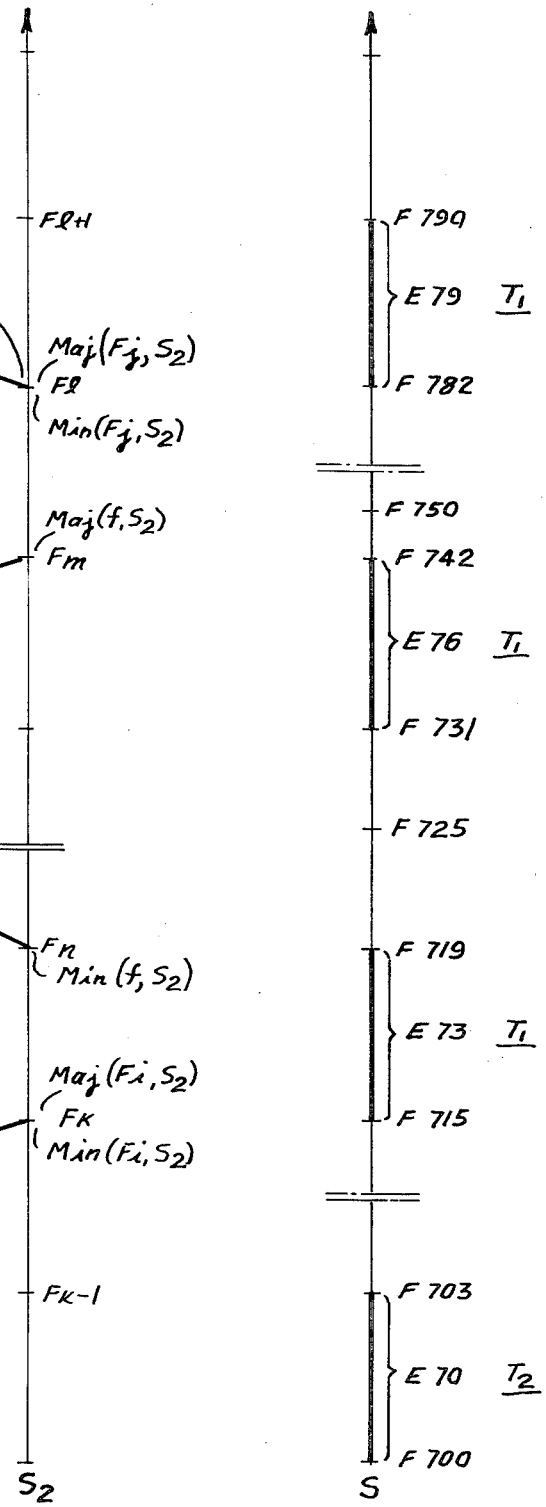

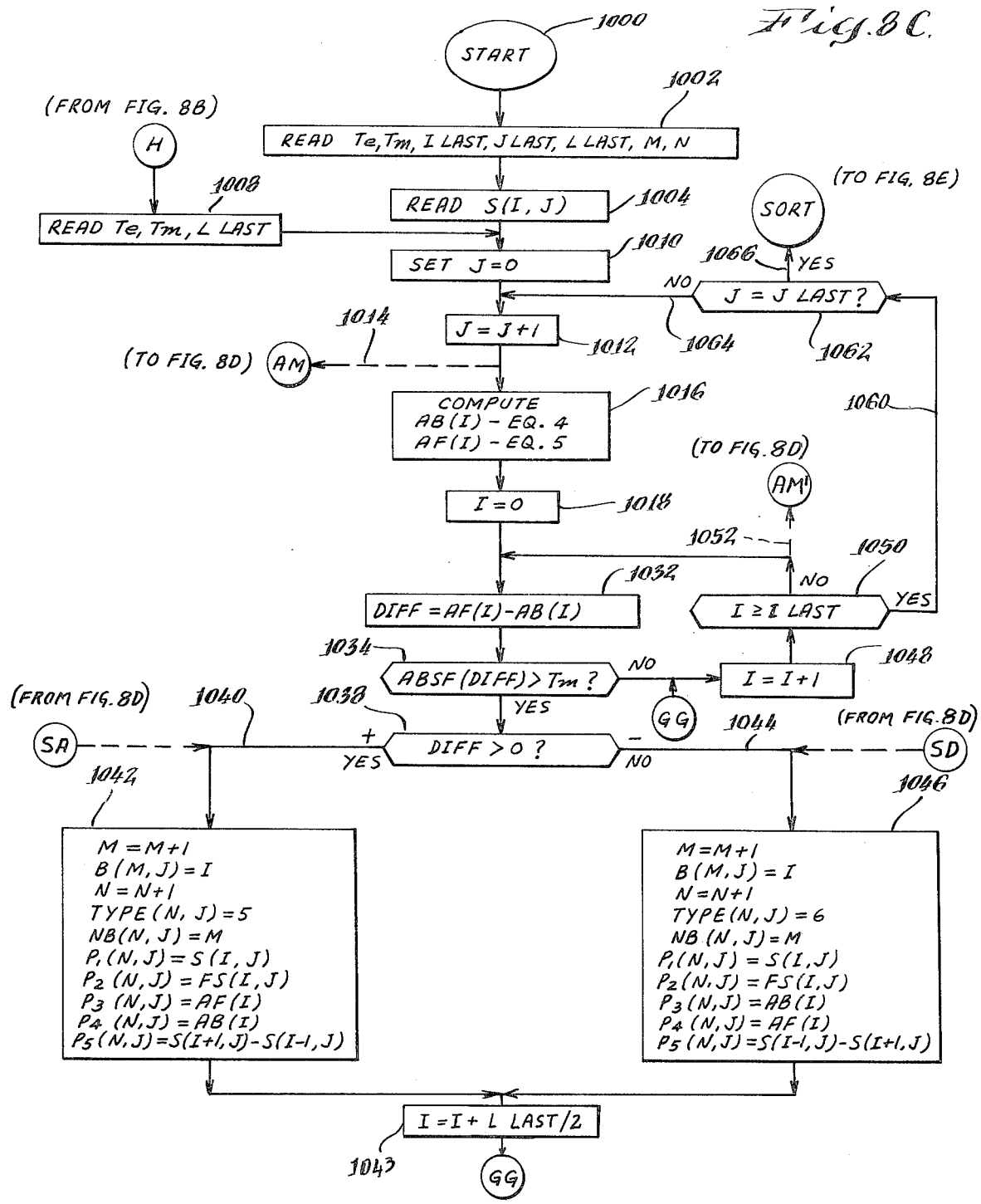

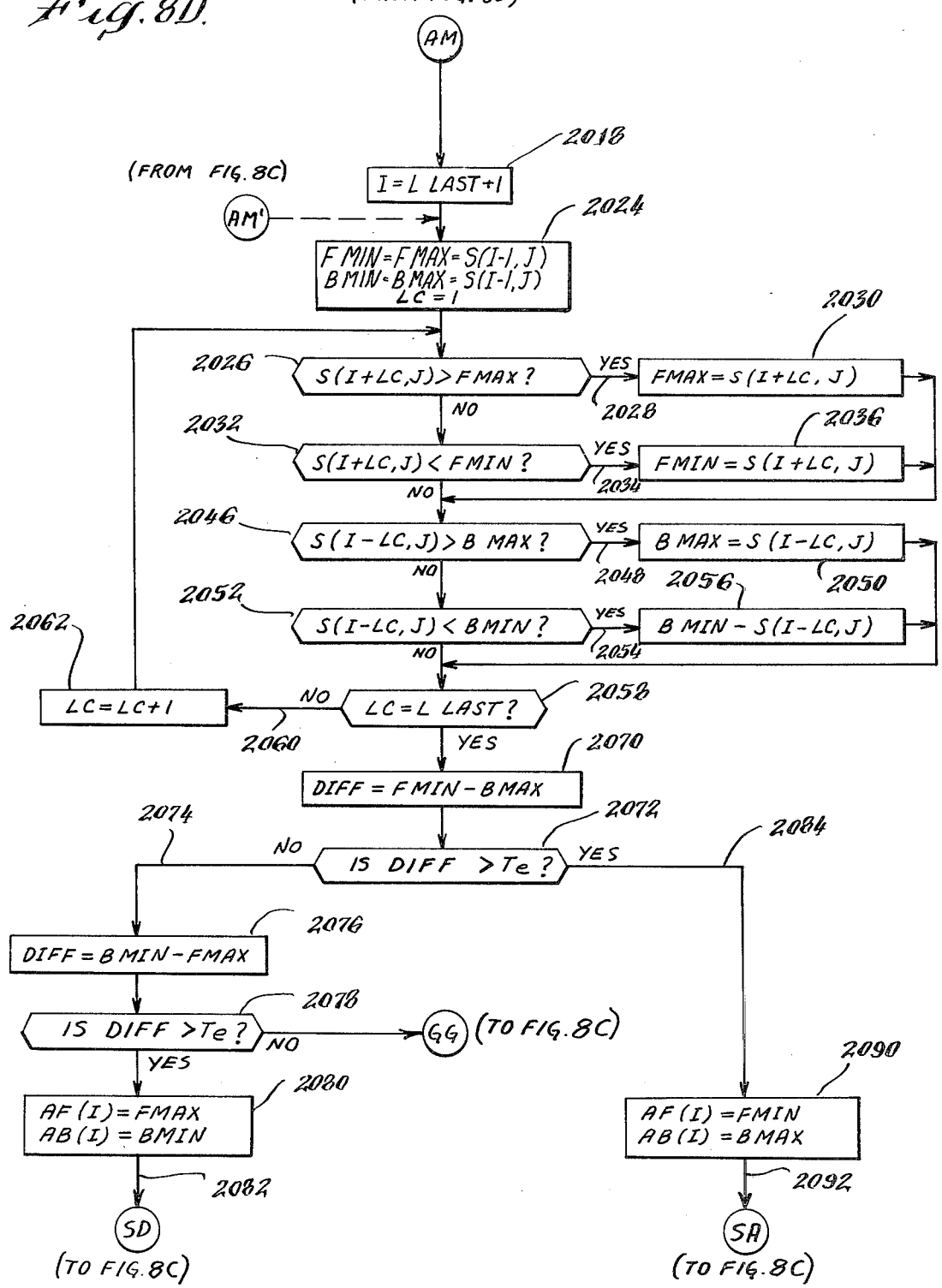

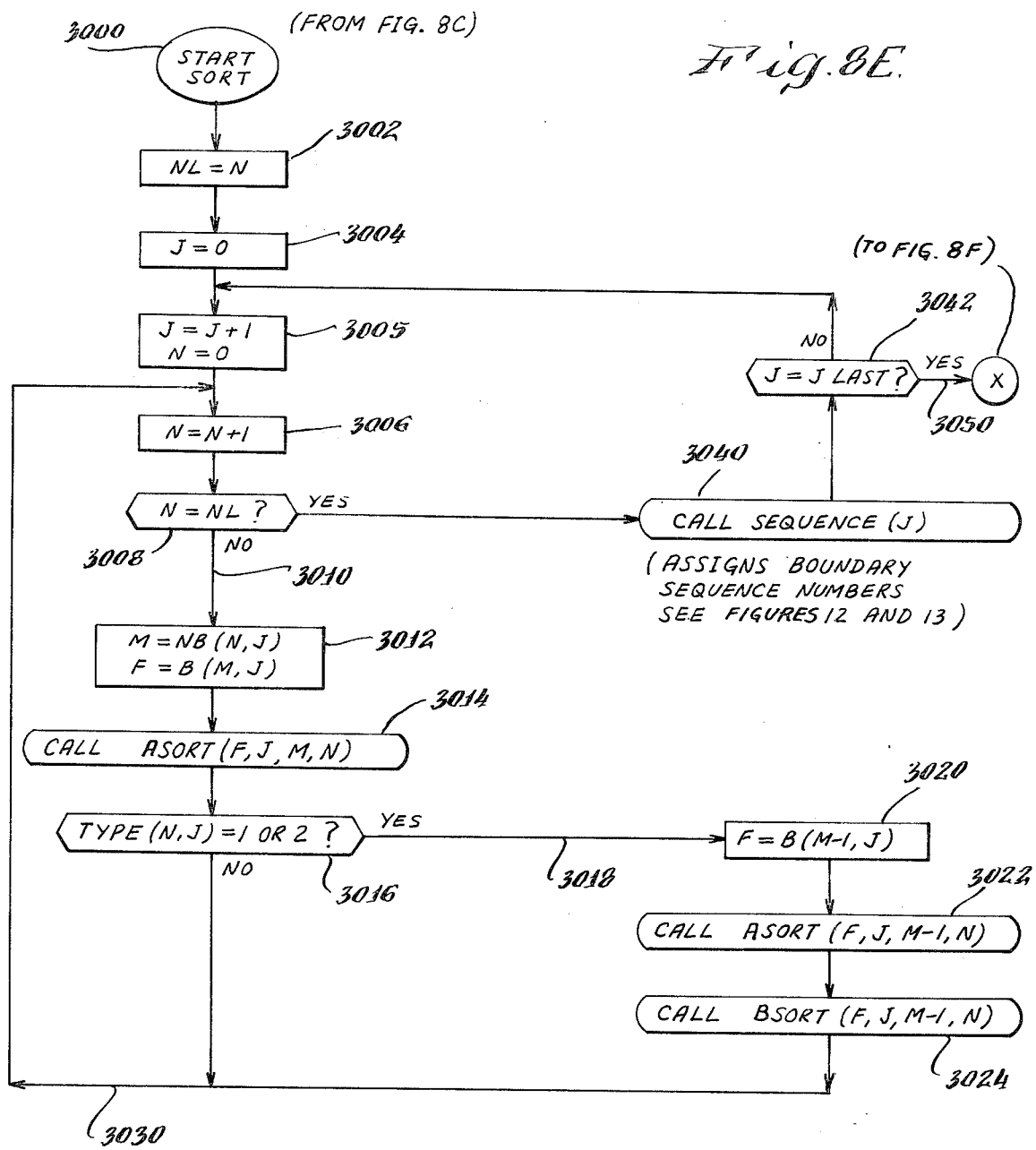

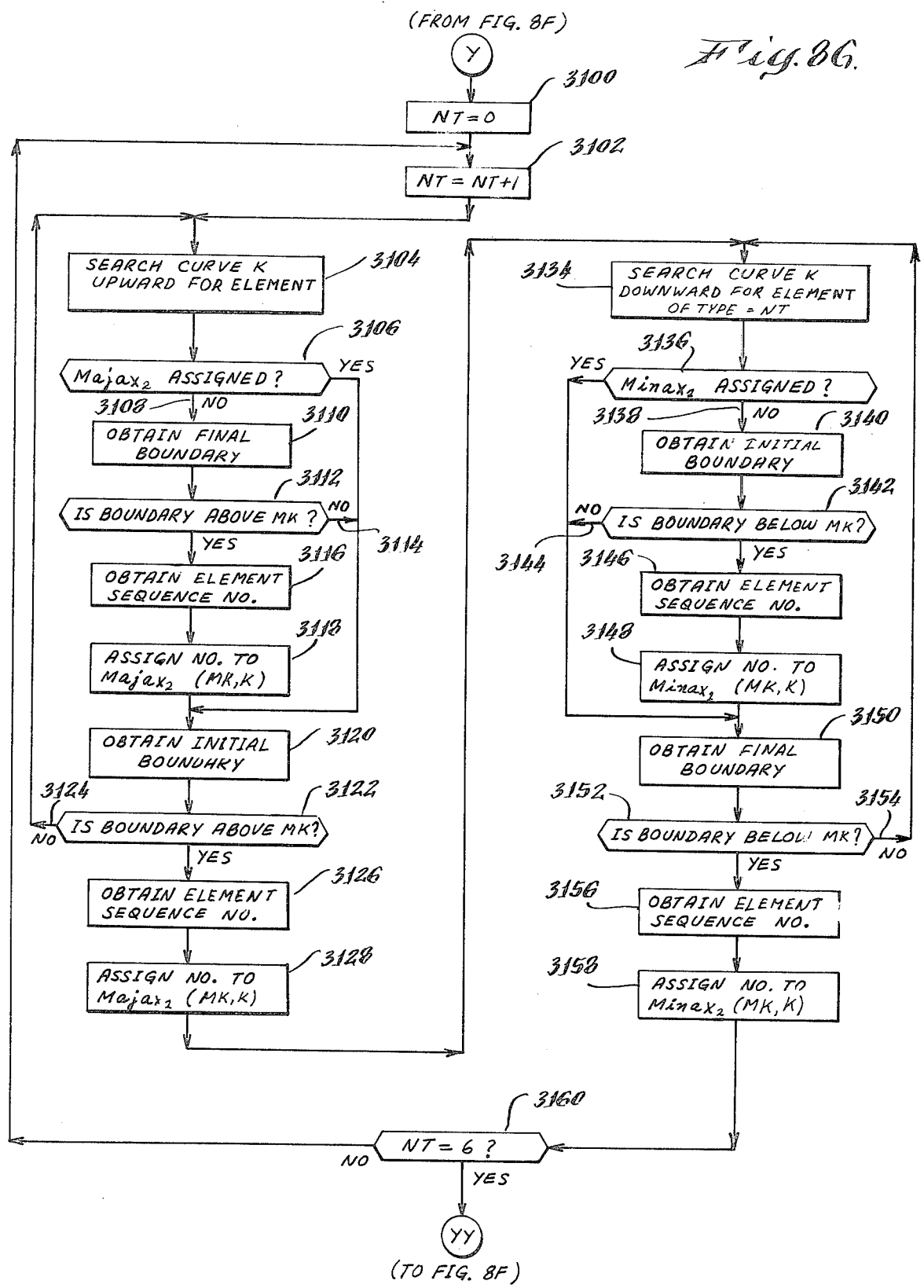

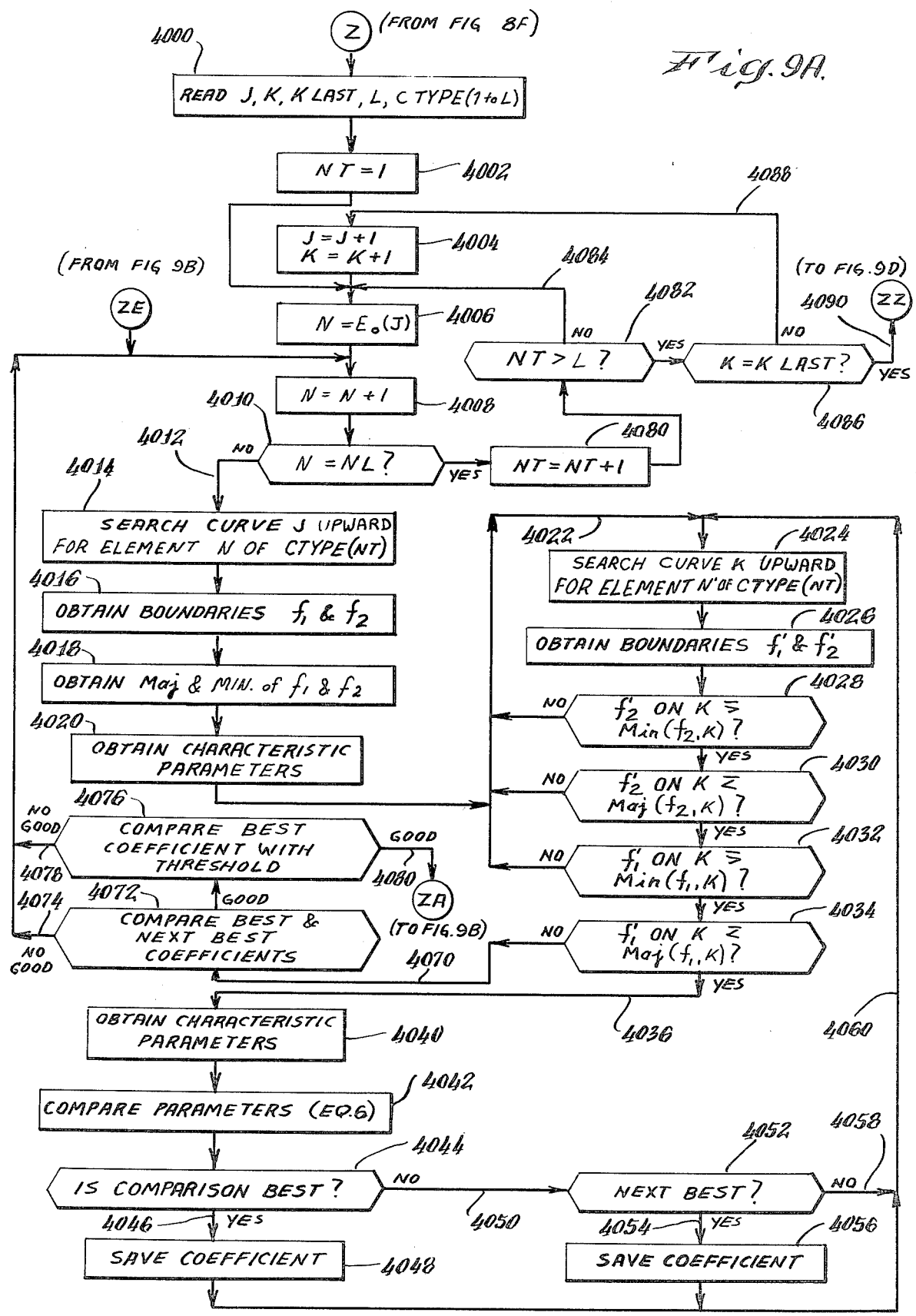

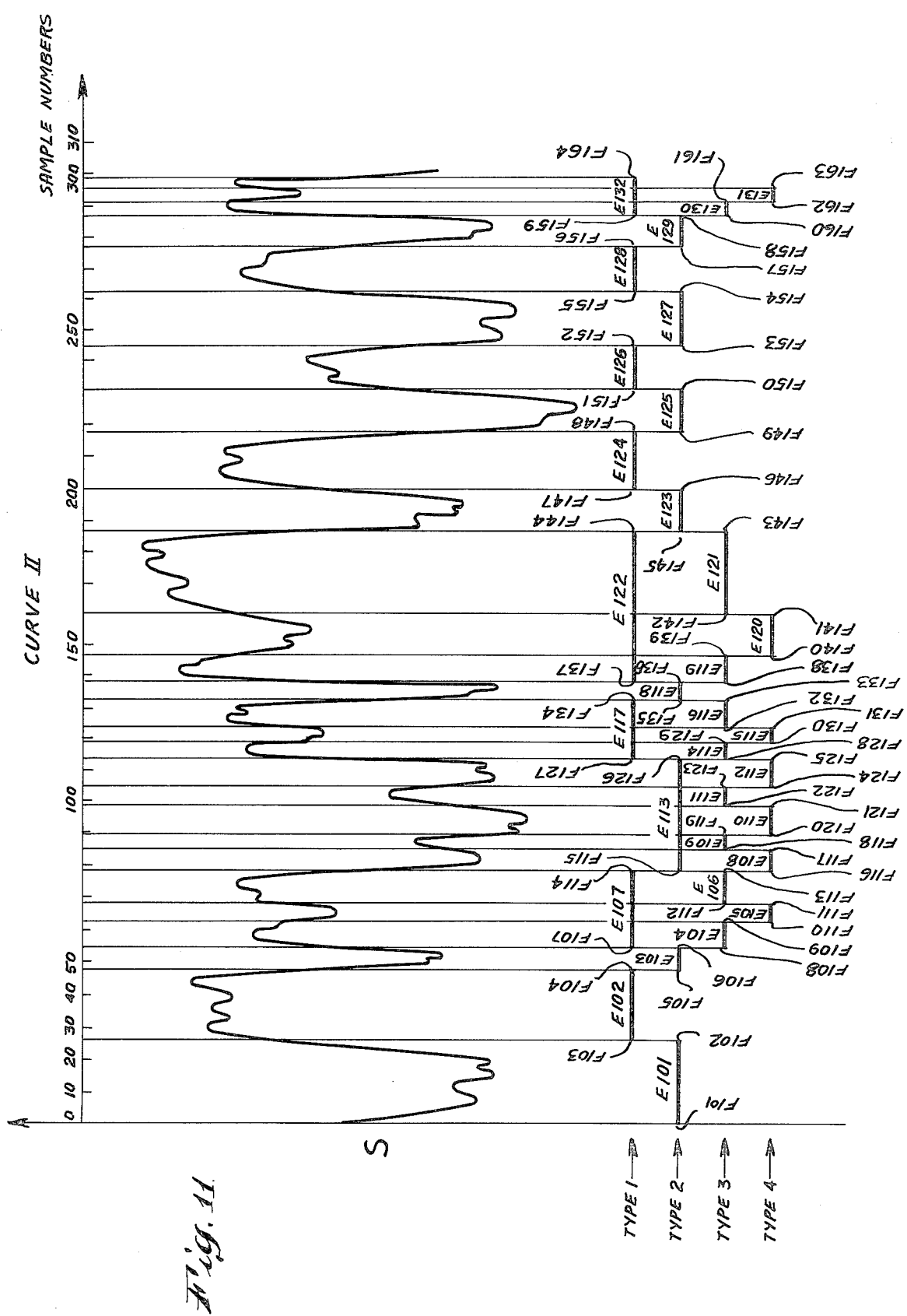

Fig. 12.

CURVE I

TABLE I

| ELEMENT NUMBERS | TYPE | BOUNDARY NUMBERS INITIAL $f_1$ | FINAL $f_2$ |
|---|---|---|---|
| E 1 | T 2 | F 1 | F 2 |
| E 2 | T 1 | F 3 | F 4 |
| E 3 | T 2 | F 5 | F 6 |
| E 4 | T 1 | F 7 | F 8 |
| E 5 | T 2 | F 9 | F 10 |
| E 6 | T 3 | F 12 | F 13 |
| E 7 | T 4 | F 14 | F 15 |
| E 8 | T 3 | F 16 | F 17 |
| E 9 | T 1 | F 11 | F 18 |
| E 10 | T 4 | F 20 | F 21 |
| E 11 | T 3 | F 22 | F 23 |
| E 12 | T 4 | F 24 | F 25 |
| E 13 | T 3 | F 26 | F 27 |
| E 14 | T 4 | F 28 | F 29 |
| E 15 | T 2 | F 19 | F 30 |
| E 16 | T 3 | F 32 | F 33 |
| E 17 | T 4 | F 34 | F 35 |
| E 18 | T 3 | F 36 | F 37 |
| E 19 | T 1 | F 31 | F 38 |
| E 20 | T 2 | F 39 | F 40 |
| E 21 | T 3 | F 42 | F 43 |
| E 22 | T 4 | F 44 | F 45 |
| E 23 | T 3 | F 46 | F 47 |
| E 24 | T 1 | F 41 | F 48 |
| E 25 | T 1 | F 49 | F 50 |
| E 26 | T 2 | F 51 | F 52 |
| E 27 | T 1 | F 53 | F 54 |
| E 28 | T 2 | F 55 | F 56 |
| E 29 | T 1 | F 57 | F 58 |
| E 30 | T 2 | F 59 | F 60 |
| E 31 | T 1 | F 61 | F 62 |

TABLE II

| BOUNDARY NUMBERS | ABCISSA | BOUNDARY NUMBERS | ABCISSA |
|---|---|---|---|
| F 1 | 0 | F 32 | 133 |
| F 2 | 24 | F 33 | 136 |
| F 3 | 24 | F 34 | 136 |
| F 4 | 33 | F 35 | 142 |
| F 5 | 33 | F 36 | 142 |
| F 6 | 41 | F 37 | 151 |
| F 7 | 41 | F 38 | 151 |
| F 8 | 63 | F 39 | 151 |
| F 9 | 63 | F 40 | 157 |
| F 10 | 71 | F 41 | 157 |
| F 11 | 71 | F 42 | 157 |
| F 12 | 71 | F 43 | 166 |
| F 13 | 80 | F 44 | 166 |
| F 14 | 80 | F 45 | 179 |
| F 15 | 84 | F 46 | 207 |
| F 16 | 84 | F 47 | 207 |
| F 17 | 96 | F 48 | 207 |
| F 18 | 96 | F 49 | 219 |
| F 19 | 96 | F 50 | 219 |
| F 20 | 103 | F 51 | 239 |
| F 21 | 103 | F 52 | 239 |
| F 22 | 106 | F 53 | 252 |
| F 23 | 106 | F 54 | 252 |
| F 24 | 119 | F 55 | 266 |
| F 25 | 119 | F 56 | 266 |
| F 26 | 123 | F 57 | 284 |
| F 27 | 123 | F 58 | 284 |
| F 28 | 133 | F 59 | 300 |
| F 29 | 133 | F 60 | 300 |
| F 30 | 133 | F 61 | 309 |
| F 31 | 133 | F 62 | |

Fig. 13.

CURVE II

| ELEMENT NUMBERS | TYPE | BOUNDARY NUMBERS INITIAL $f_i$ | BOUNDARY NUMBERS FINAL $f_2$ |
|---|---|---|---|
| E101 | T2 | F101 | F102 |
| E102 | T1 | F103 | F104 |
| E103 | T2 | F105 | F106 |
| E104 | T3 | F108 | F109 |
| E105 | T4 | F110 | F111 |
| E106 | T3 | F112 | F113 |
| E107 | T1 | F107 | F114 |
| E108 | T4 | F116 | F117 |
| E109 | T3 | F118 | F119 |
| E110 | T4 | F120 | F121 |
| E111 | T3 | F122 | F123 |
| E112 | T4 | F124 | F125 |
| E113 | T2 | F115 | F126 |
| E114 | T3 | F128 | F129 |
| E115 | T4 | F130 | F131 |
| E116 | T3 | F132 | F133 |
| E117 | T1 | F127 | F134 |
| E118 | T2 | F135 | F136 |
| E119 | T3 | F138 | F139 |
| E120 | T4 | F140 | F141 |
| E121 | T3 | F142 | F143 |
| E122 | T1 | F137 | F144 |
| E123 | T2 | F145 | F146 |
| E124 | T1 | F147 | F148 |
| E125 | T2 | F149 | F150 |
| E126 | T1 | F151 | F152 |
| E127 | T2 | F153 | F154 |
| E128 | T1 | F155 | F156 |
| E129 | T1 | F157 | F158 |
| E130 | T2 | F160 | F161 |
| E131 | T4 | F162 | F163 |
| E132 | T1 | F159 | F164 |

TABLE III

| BOUNDARY NUMBERS | ABCISSA | BOUNDARY NUMBERS | ABCISSA |
|---|---|---|---|
| F101 | 0 | F133 | 136 |
| F102 | 26 | F134 | 136 |
| F103 | 26 | F135 | 136 |
| F104 | 48 | F136 | 142 |
| F105 | 48 | F137 | 142 |
| F106 | 56 | F138 | 142 |
| F107 | 56 | F139 | 151 |
| F108 | 56 | F140 | 151 |
| F109 | 65 | F141 | 164 |
| F110 | 65 | F142 | 164 |
| F111 | 69 | F143 | 192 |
| F112 | 69 | F144 | 192 |
| F113 | 81 | F145 | 192 |
| F114 | 81 | F146 | 204 |
| F115 | 81 | F147 | 204 |
| F116 | 88 | F148 | 224 |
| F117 | 88 | F149 | 224 |
| F118 | 88 | F150 | 237 |
| F119 | 91 | F151 | 237 |
| F120 | 91 | F152 | 251 |
| F121 | 104 | F153 | 251 |
| F122 | 104 | F154 | 269 |
| F123 | 108 | F155 | 269 |
| F124 | 109 | F156 | 285 |
| F125 | 118 | F157 | 285 |
| F126 | 118 | F158 | 294 |
| F127 | 118 | F159 | 294 |
| F128 | 118 | F160 | 294 |
| F129 | 121 | F161 | 299 |
| F130 | 121 | F162 | 299 |
| F131 | 127 | F163 | 302 |
| F132 | 127 | F164 | 306 |

TABLE IV

*Fig. 14.*

CURVE I

| $f$ | Min$(f, II)$ | | | Maj$(f, II)$ | | |
|---|---|---|---|---|---|---|
| | INITIAL | $a$ | $a'$ | INITIAL | $d$ | $d'$ |
| F0 | F100 | F100 | F100 | F100 | F100 | F100 |
| F1 | F100 | F100 | F100 | F121 | F103 | F103 |
| F2 | F100 | F100 | F100 | F131 | F103 | F103 |
| F3 | F100 | F100 | F100 | F131 | F103 | F103 |
| F4 | F100 | F100 | F100 | F133 | F103 | F103 |
| F5 | F100 | F100 | F100 | F133 | F103 | F103 |
| F6 | F100 | F100 | F100 | F136 | F103 | F103 |
| F7 | F100 | F103 | F103 | F136 | F103 | F103 |
| F8 | F100 | F103 | F104 | F141 | F141 | F104 |
| F9 | F100 | F103 | F104 | F141 | F141 | F141 |
| F10 | F100 | F103 | F104 | F143 | F143 | F143 |
| F11 | F100 | F103 | F104 | F143 | F143 | F143 |
| F12 | F100 | F103 | F104 | F143 | F143 | F143 |
| F13 | F100 | F103 | F104 | F143 | F143 | F143 |
| F14 | F100 | F103 | F104 | F143 | F143 | F143 |
| F15 | F100 | F103 | F104 | F143 | F143 | F143 |
| F16 | F100 | F103 | F104 | F143 | F143 | F143 |
| F17 | F100 | F103 | F104 | F146 | F146 | F146 |
| F18 | F100 | F103 | F104 | F146 | F146 | F146 |
| F19 | F100 | F103 | F104 | F146 | F146 | F146 |
| F20 | F100 | F103 | F104 | F146 | F146 | F146 |
| F21 | F101 | F103 | F104 | F146 | F146 | F146 |
| F22 | F101 | F103 | F104 | F146 | F146 | F146 |
| F23 | F101 | F103 | F104 | F148 | F148 | F148 |
| F24 | F101 | F103 | F104 | F148 | F148 | F148 |
| F25 | F101 | F103 | F104 | F148 | F148 | F148 |
| F26 | F101 | F103 | F104 | F148 | F148 | F148 |
| F27 | F101 | F103 | F104 | F148 | F148 | F148 |
| F28 | F101 | F103 | F104 | F148 | F148 | F148 |
| F29 | F102 | F102 | F104 | F150 | F150 | F150 |
| F30 | F102 | F102 | F104 | F150 | F150 | F150 |
| F31 | F102 | F102 | F104 | F150 | F150 | F150 |
| F32 | F102 | F102 | F104 | F150 | F150 | F150 |
| F33 | F102 | F102 | F104 | F150 | F150 | F150 |
| F34 | F102 | F102 | F104 | F150 | F150 | F150 |
| F35 | F102 | F102 | F104 | F152 | F152 | F152 |
| F36 | F102 | F102 | F104 | F152 | F152 | F152 |
| F37 | F104 | F104 | F104 | F152 | F152 | F152 |
| F38 | F104 | F104 | F104 | F152 | F152 | F152 |
| F39 | F104 | F104 | F104 | F152 | F152 | F152 |
| F40 | F106 | F106 | F106 | F154 | F154 | F154 |
| — | | | | | | |
| — | | | | | | |

TABLE V

Fig. 15.

CURVE II

| $f$ | Min($f,I$) | | | Maj($f,I$) | | | Majax$_1$ ($f,T_I$) | Majax$_2$ ($f,T_I$)$^2$ | Minax$_1$ ($f,T_I$) | Minax$_2$ ($f,T_I$)$^2$ |
|---|---|---|---|---|---|---|---|---|---|---|
| | INITIAL | $c$ | $c'$ | INITIAL | $b$ | $b'$ | | | | |
| F 100 | F 0 | F 0 | F 0 | F 0 | F 0 | F 0 | E 100 | E 100 | E 0 | E 0 |
| F 101 | F 0 | F 0 | F 0 | F 21 | F 7 | F 7 | E 102 | E 102 | E 0 | E 0 |
| F 102 | F 0 | F 0 | F 0 | F 29 | F 7 | F 7 | E 107 | E 102 | E 0 | E 0 |
| F 103 | F 0 | F 7 | F 7 | F 29 | F 7 | F 7 | E 107 | E 102 | E 0 | E 0 |
| F 104 | F 0 | F 7 | F 8 | F 37 | F 37 | F 8 | E 107 | E 107 | E 102 | E 0 |
| F 105 | F 0 | F 7 | F 8 | F 37 | F 37 | F 37 | E 107 | E 107 | E 102 | E 0 |
| F 106 | F 0 | F 7 | F 8 | F 40 | F 40 | F 40 | E 117 | E 107 | E 102 | E 102 |
| F 107 | F 0 | F 7 | F 8 | F 40 | F 40 | F 40 | E 117 | E 107 | E 102 | E 102 |
| F 108 | F 0 | F 7 | F 8 | F 40 | F 40 | F 40 | E 117 | E 107 | E 102 | E 102 |
| F 109 | F 0 | F 7 | F 8 | F 43 | F 43 | F 43 | E 117 | E 107 | E 107 | E 102 |
| F 110 | F 0 | F 7 | F 8 | F 43 | F 43 | F 43 | E 117 | E 107 | E 107 | E 102 |
| F 111 | F 0 | F 7 | F 8 | F 45 | F 45 | F 45 | E 117 | E 107 | E 107 | E 102 |
| F 112 | F 0 | F 7 | F 8 | F 45 | F 45 | F 45 | E 117 | E 107 | E 107 | E 102 |
| F 113 | F 0 | F 7 | F 8 | F 47 | F 47 | F 47 | E 117 | E 117 | E 107 | E 102 |
| F 114 | F 0 | F 7 | F 8 | F 47 | F 47 | F 47 | E 117 | E 117 | E 107 | E 102 |
| F 115 | F 0 | F 7 | F 8 | F 47 | F 47 | F 47 | E 117 | E 117 | E 107 | E 102 |
| F 116 | F 0 | F 7 | F 8 | F 47 | F 47 | F 47 | E 117 | E 117 | E 107 | E 102 |
| F 117 | F 0 | F 7 | F 8 | F 47 | F 47 | F 47 | E 117 | E 117 | E 107 | E 107 |
| F 118 | F 0 | F 7 | F 8 | F 47 | F 47 | F 47 | E 117 | E 117 | E 107 | E 107 |
| F 119 | F 0 | F 7 | F 8 | F 47 | F 47 | F 47 | E 117 | E 117 | E 107 | E 107 |
| F 120 | F 0 | F 7 | F 8 | F 47 | F 47 | F 47 | E 117 | E 117 | E 107 | E 107 |
| F 121 | F 1 | F 7 | F 8 | F 47 | F 47 | F 47 | E 117 | E 117 | E 107 | E 107 |
| F 122 | F 1 | F 7 | F 8 | F 47 | F 47 | F 47 | E 117 | E 117 | E 107 | E 107 |
| F 123 | F 1 | F 7 | F 8 | F 47 | F 47 | F 47 | E 117 | E 117 | E 107 | E 107 |
| F 124 | F 1 | F 7 | F 8 | F 50 | F 50 | F 50 | E 117 | E 117 | E 107 | E 107 |
| F 125 | F 1 | F 7 | F 8 | F 50 | F 50 | F 50 | E 122 | E 117 | E 107 | E 107 |
| F 126 | F 1 | F 7 | F 8 | F 50 | F 50 | F 50 | E 122 | E 117 | E 107 | E 107 |
| F 127 | F 1 | F 7 | F 8 | F 50 | F 50 | F 50 | E 122 | E 117 | E 107 | E 107 |
| F 128 | F 1 | F 7 | F 8 | F 50 | F 50 | F 50 | E 122 | E 117 | E 107 | E 107 |
| F 129 | F 1 | F 7 | F 8 | F 52 | F 52 | F 52 | E 122 | E 117 | E 117 | E 107 |
| F 130 | F 1 | F 7 | F 8 | F 52 | F 52 | F 52 | E 122 | E 117 | E 117 | E 107 |
| F 131 | F 2 | F 7 | F 8 | F 52 | F 52 | F 52 | E 122 | E 117 | E 117 | E 107 |
| F 132 | F 2 | F 7 | F 8 | F 52 | F 52 | F 52 | E 122 | E 117 | E 117 | E 107 |
| F 133 | F 4 | F 7 | F 8 | F 52 | F 52 | F 52 | E 122 | E 122 | E 117 | E 107 |
| F 134 | F 4 | F 7 | F 8 | F 52 | F 52 | F 52 | E 122 | E 122 | E 117 | E 107 |
| F 135 | F 4 | F 7 | F 8 | F 52 | F 52 | F 52 | E 122 | E 122 | E 117 | E 107 |
| F 136 | F 6 | F 6 | F 8 | F 54 | F 54 | F 54 | E 124 | E 122 | E 117 | E 117 |
| F 137 | F 6 | F 6 | F 8 | F 54 | F 54 | F 54 | E 124 | E 122 | E 117 | E 117 |
| F 138 | F 6 | F 6 | F 8 | F 54 | F 54 | F 54 | E 124 | E 122 | E 117 | E 117 |
| F 139 | F 6 | F 6 | F 8 | F 54 | F 54 | F 54 | E 124 | E 122 | E 122 | E 117 |
| F 140 | F 6 | F 6 | F 8 | F 54 | F 54 | F 54 | E 124 | E 122 | E 122 | E 117 |
| F 141 | F 8 | F 8 | F 8 | F 56 | F 56 | F 56 | E 124 | E 122 | E 122 | E 117 |
| ⋮ | | | | | | | | | | |

TABLE VI

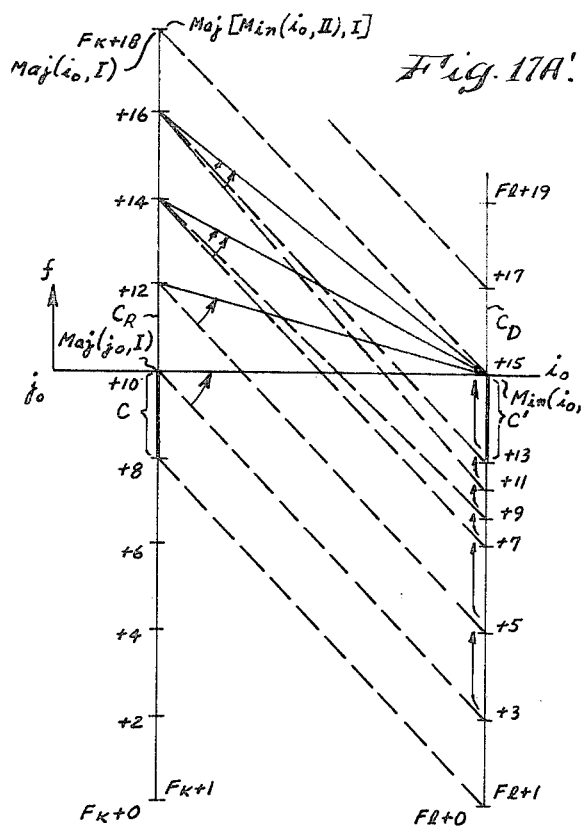
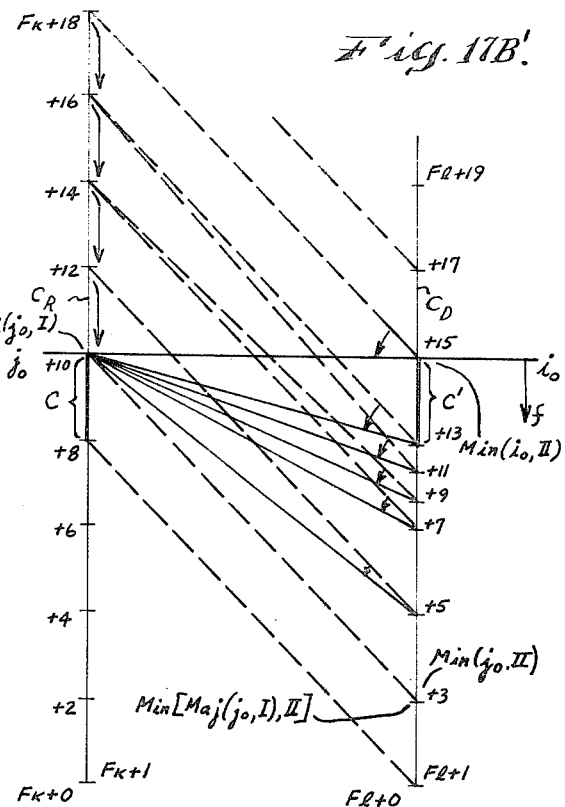
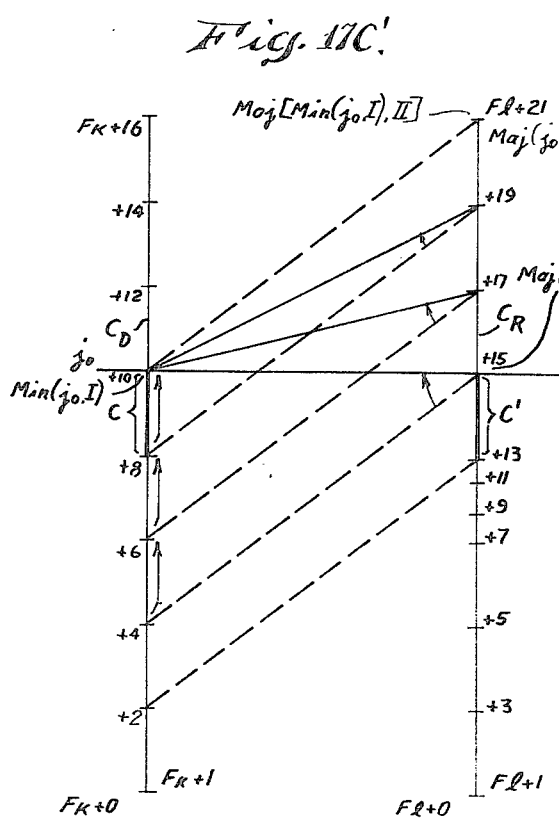
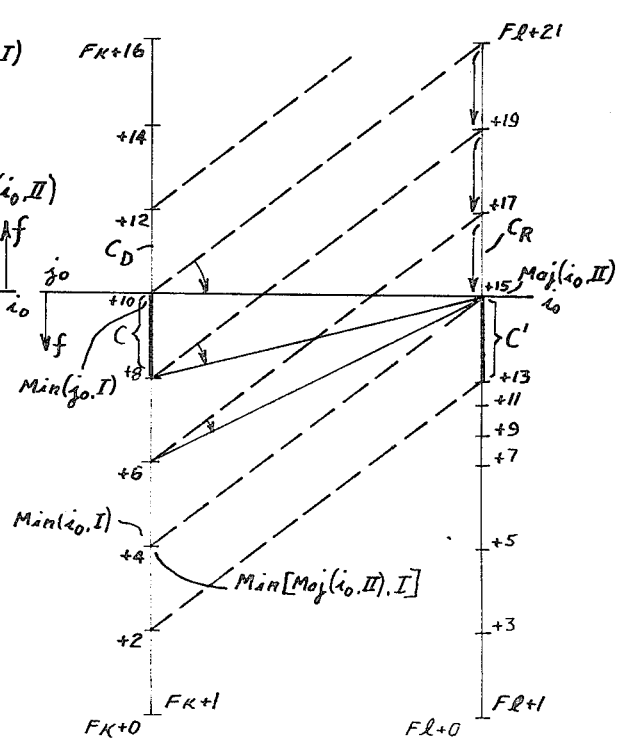

WELL LOG PROCESSING TECHNIQUE

This is a continuation, of application Serial No. 362,160 filed May 21, 1973 and now abandoned.

BACKGROUND OF THE INVENTION

This invention relates generally to techniques used to automatically determine correlations between corresponding recognizable signal elements. More particularly, the invention relates to automatic identification of sampled geophysical signal elements by type, determination of characterizing features of these elements and the use of these features in a search for corresponding elements within a system of related search bounds. The determination of displacements between elements found to be corresponding are useful in investigating subsurface formations.

The properties of subsurface formations of the earth vary considerably with depth. This variation may occur abruptly forming boundaries separating one earth formation from another. These boundaries vary in depth and inclination or dip from the earth's surface. When the direction or the degree of dip changes, structures are often formed which are potential hydrocarbon traps. Thus the recognition and mapping of formation boundaries is important to the oil and gas industry.

In seismic measurements acoustic waves are transmitted from the surface and reflected by such boundaries. The reflections or events, as they are known, are measured at the surface using horizontally spaced geophones. U.S. Pat. No. 3,681,748 entitled, "Velocity Stack Processing of Seismic Data" issued Aug. 1, 1972 to Emory E. Diltz illustrates a method of employing specific event information, limited through predetermined velocity-time patterns, to present event data in the velocity-time domain. Since time, in such cases, may be regarded as a function of formation depth, such presentations may reflect the inclination of formation boundaries with depth and horizontal displacement.

A more direct method of measuring the dip and the direction or azimuth of the dip of subsurface formations employs a dipmeter tool passed through a borehole drilled into the subsurface formations. These tools employ various means to obtain signals representative of variations of formation properties and, in particular, representative of formation boundaries intersecting the borehole. The signals are typically taken from at least three points radially spaced apart on the surface of the borehole. One such tool is described in the paper, THE HIGH RESOLUTION DIPMETER TOOL, by I. A. Allaud and J. Ringot published in the May-June, 1969 issue of "The Log Analyst".

In determining the inclination of a formation boundary from dipmeter signals, the signals obtained from one point on the borehole surface are correlated to determine displacements from corresponding signals obtained from at least two additional points. Two such displacements may determine the position of a plane representing the correlation portion of the signals. The method assumes that the correlated portion of the signal may represent some common feature of the formation.

The correlation of signals to determine displacements is typically accomplished by use of relatively standard correlation techniques. A paper describing one such technique and providing several correlation functions for such use is COMPUTER METHODS OF DIPLOG CORRELATION by L. G. Schoonover and O. R. Holt published in the February 1973 issue of "Society of Petroleum Engineers Journal". To determine displacements, cross correlation functions are applied to pairs of corresponding signals located within identical finite-length intervals called correlation intervals. A correlation function is used to determine the degree of likeness or correlation coefficient for the signals in these intervals.

The finite length correlation intervals used in dipmeter correlation usually comprise a large number of samples corresponding to about three feet of borehole recording. A series of coefficients are determined for a series of possible corresponding correlation intervals taken at different displacements between the intervals. These intervals are systematically selected within a search interval placed about some first assumed depth displacement. Normally the search interval is also of finite length. It is measured on one of the signals in directions both above and below the first assumed displacement. One signal may be considered as a base or reference signal and the other signal as a comparison or search signal. The search intervals are usually taken on the comparison signal.

For example, let $S_1$ and $S_2$ designate respectively the signals considered as the reference signal and the comparison signal. The correlation process considers a finite interval X of $S_1$ and computes the correlation coefficient for a comparison interval X' of the same length on $S_2$. The comparison interval is systematically moved from a first assumed displacement to successively displaced intervals on $S_2$ within the search intervals. A coefficient C(d) to be defined below is computed for each such displacement.

Commonly signals are recorded digitally as discrete samples S(n) versus constant increments of time or depth. Thus the signals $S_1(n)$ and $S_2(n)$ are available as two series of discrete samples each series varying as the value of n. One correlation coefficient C(d) computed between given intervals X' and X' may be expressed as:

$$C(d) = \sum_{n=1}^{N} \frac{[S_1(n) - m_1][S_2(d + n) - m_2]}{\sigma_1 \sigma_2} \quad (1)$$

where:

d is the displacement between the correlation interval X and the comparison interval X'.

N is the number of samples in each interval, X or X'.

$S_1(n)$ is the value of the (n)th sample of signal $S_1$ in the correlation interval X.

$S_2(d+n)$ is the value of the (n)th sample of signal $S_2$ in a comparison interval X' displaced d samples from X.

$$m_1 = \frac{1}{N} \sum_{n=1}^{N} S_1(n) = \text{average value of } S_1 \text{ in the correlation interval.}$$

$$m_2 = \frac{1}{N} \sum_{n=1}^{N} S_2(d + n) = \text{average value of } S_2 \text{ in the comparison interval.}$$

$$\sigma_1 = \sqrt{\frac{1}{N} \sum_{n=1}^{N} [S_1(n) - m_1]^2}$$

-continued $$\sigma_2 = \sqrt{\frac{1}{N} \sum_{n=1}^{N} [S_2(d+n) - m_2]^2}$$

The displacement d which gives the coefficient C(d) corresponding to the best correlation is taken as the displacement between the samples 1 through N of $S_1$ and samples $(d+1)$ and $(d+N)$ of $S_2$.

Even though such expressions may use amplitude and mean value normalization features, they necessarily include the effects of using finite length and arbitrarily placed intervals of the signal. In addition, the length of the correlation interval often determines the type of signal features represented in the value of the best correlation function.

The ends of the finite correlation intervals are usually chosen in an automatic and arbitrary manner. Abnormal sample values occurring near the end portions of the intervals considered in the computation may cause the correlation coefficient to suffer from so called "end effects". These effects may lead to ambiguous values of the correlation coefficient. An improvement on the use of correlation techniques is described in copending application—"Well Logging Depth Correlation Technique", U.S. Ser. No. 70,709, filed Sept. 9, 1970 by David H. Tinch et al and now abandoned.

The finite interval method of correlation requires changing the correlation interval to include many samples of the corresponding signals in order to compare long duration signal features and few samples in order to compare short duration features. Further, when two features or signal elements present on the correlation interval on one signal separated by a first separation are compared with two corresponding features present on a second signal but here separated by a different separation, distorted correlation coefficients may result. Since an identical number of samples is required in each interval, it is difficult to compare two or more corresponding features present in the same correlation intervals but at different separations. One attempt at handling this problem is described in U.S. Pat. No. 3,700,815, "Automatic Speaker Verification by Non-Linear Time Alignment of Acoustic Parameters" issued Oct. 24, 1972 to Doddington et al. This patent describes a method of piece-wise resampling one of the two signals within intervals between signal features. The newly formed or warped samples are then reused in a correlation process. Unfortunately this process also distorts displacements between corresponding features within the warped interval.

Additional U.S. patents describing typical correlation processes and uses of displacements between best comparing signal intervals are U.S. Pat. No. 2,927,656 entitled, "Method and Apparatus for Interpreting Geophysical Data" issued Mar. 8, 1960 to F. J. Feagin, et al and U.S. Pat. No. 3,550,074 entitled, "Method for Determining the Static Shift Between Geophysical Signals" issued Dec. 22, 1970 to C. W. Kerns et al. Whether the simple amplitude difference or the more complex mean value formulas are used to compute the correlation coefficients, each such computation is still repeatedly performed on numerous samples within a preset correlation interval systematically displaced on one of the corresponding signals. The computation is performed usually without examining the type or duration of the signal features actually present. Thus many unproductive computations are performed on intervals which may not even contain significant signal features. Further, the computations may be performed on features of completely different characteristics which in addition to wasting valuable time, may give rise to erroneous miscorrelations.

It is an object of this invention to provide a new technique of determining correlations between features or elements of sampled signals representing variations of measured properties.

A further object is to determine at the same time reliable comparisons between elements of sampled signals represented by varying numbers of samples.

It is an object of this invention to provide an automatic technique of recognizing signal elements representing a variety of features.

It is a further object of the invention to provide a new and improved technique of comparing two or more sample intervals to determine the degree of correspondence of these intervals.

A further object is to provide a correlation technique wherein the intervals to be correlated are determined in a nonarbitrary method.

An additional object is to provide an efficient and accurate method of comparing two signal elements to determine their degree of correspondence.

In particular, an object of the invention is to provide a method of comparing signal intervals of unequal length.

A further object is to provide a technique for comparing signal elements wherein the possibility of making an error and wasting processing capacity in comparing elements which could not possibly correspond is reduced.

A further object of the invention is to provide a technique for properly considering the case where an element present on one signal has no corresponding element.

Further, it is an object to prevent the determination of a false correlation indication in cases where there is no comparable element or where there is only a doubtful comparison.

It is a further object to provide an improved technique of comparing correlations for more than one possible corresponding feature or element of a sampled signal.

It is a still further object to compare correlations corresponding to correlation coefficients or degree of comparison to determine the resolution of such comparisons and still further, the quality of the comparison itself.

An additional object is to provide a technique of correlation wherein only signal features or elements which are of comparable types are compared.

A still additional object is to provide a method of determining comparisons of signal elements of varying significance.

A particular object is to provide a method where the more significant elements are compared to determine reliable corresponding elements.

It is an object of the invention to produce a significant increase in the number of reliably determined correspondences between elements of sampled signals.

It is also an object to provide reliable correspondences between signal elements representing large features as well as small features of sampled signals without the necessity of recomputing with different correlation lengths or correlation functions for this purpose.

More particularly, it is an object to provide a technique to compare only those elements known to be within reasonable limits for displacements between such elements, and wherein such limits are automatically narrowed in a rational manner.

An additional object of the invention is to provide an efficient method of automatically reducing search intervals used in the search and comparison of possibly corresponding signal elements.

It is an object of the invention to provide a new method of determining displacements between corresponding portions of sampled signals.

It is an additional object to determine improved displacement value between corresponding signal elements.

It is a further object to determine corresponding signal elements and the displacements between such elements.

It is an object to provide a new method of correlating sampled signals to determine displacements between samples of these signals.

In accordance with the techniques of the present invention, a method for automatically determining with a machine and without human intervention correlations between characteristic signal elements corresponding to recognizable features as represented by discrete samples of the signals comprises processing the samples to recognize groups of samples representing specific types of elements selected to correspond to significant signal features. Characteristic parameters are determining according to the type of element and compared to determine which elements correspond to one another. In accordance with further features of the invention, characteristic parameters are compared for elements located within predetermined bounds of possible corresponding elements. These bounds may be determined by searching and sorting boundary positions according to pre-established laws of corresponding positions to provide provisional bounds for use in searching for possible corresponding elements. The parameters determined for elements located within provisional search bounds are compared and if an acceptable comparison is found, the corresponding bounds are modified to indicate subsequent search bounds for use in searching for additional possible corresponding elements.

In accordance with additional features of the invention, several specific types of elements of varying significance are recognized. Further, the specific types of elements are classified by using given ranges of thresholds for identifying various sizes of elements corresponding to a range of significance for elements of a given type. Still further, the parameters of elements of the more significant types are compared and if an acceptable comparison is found, the corresponding bounds are modified to indicate bounds for use in searching for possible corresponding elements of less significant types.

The steps of comparing parameters of elements of a given type located within previously provided search bounds and modifying bounds corresponding to elements found to correspond to provide further search bounds are repeated for remaining elements until all elements have been processed.

The displacements between elements and boundaries found to be corresponding may be taken as representing the displacement between corresponding signal features. If the signals are from a dipmeter tool, for example, the displacements may be used to determine the attitude of a geological feature relative to the position of the tool and when provided with the tool position, they may be used to determine the strike and dip of the geological features.

Also, the displacements may be used to align displaced signals by applying alignment corrections. The signals then aligned on common geological features may be properly combined and used for further evaluation of subsurface formations.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

FIG. 1A illustrates one application of the present invention.

FIGS. 3A through 3F illustrate various sampled signal models and corresponding slope function values.

FIGS. 6A and 6B illustrate certain features of the concept of bounds and boundaries described in the disclosure.

FIG. 7 illustrates symbols and notations used in the explanation of the invention.

FIGS. 8A through 8D are processing diagrams illustrative of steps used to recognize specified elements and record their representative boundary positions and characteristic parameters.

FIGS. 8E through 8G are processing diagrams illustrative of the steps used to sort elements and boundaries to provide references for subsequent processes.

FIGS. 9A through 9C are processing diagrams illustrative of steps used to search for corresponding elements within provisional search bounds and the modification of these bounds.

FIGS. 10 and 11 represent illustrative intervals of two signals which are useful to demonstrate certain features of the invention.

FIGS. 12, 13, 14 and 15 represent reference tables useful in the description of the search for possible corresponding elements located on the two signals of FIGS. 10 and 11.

Figure 1B:
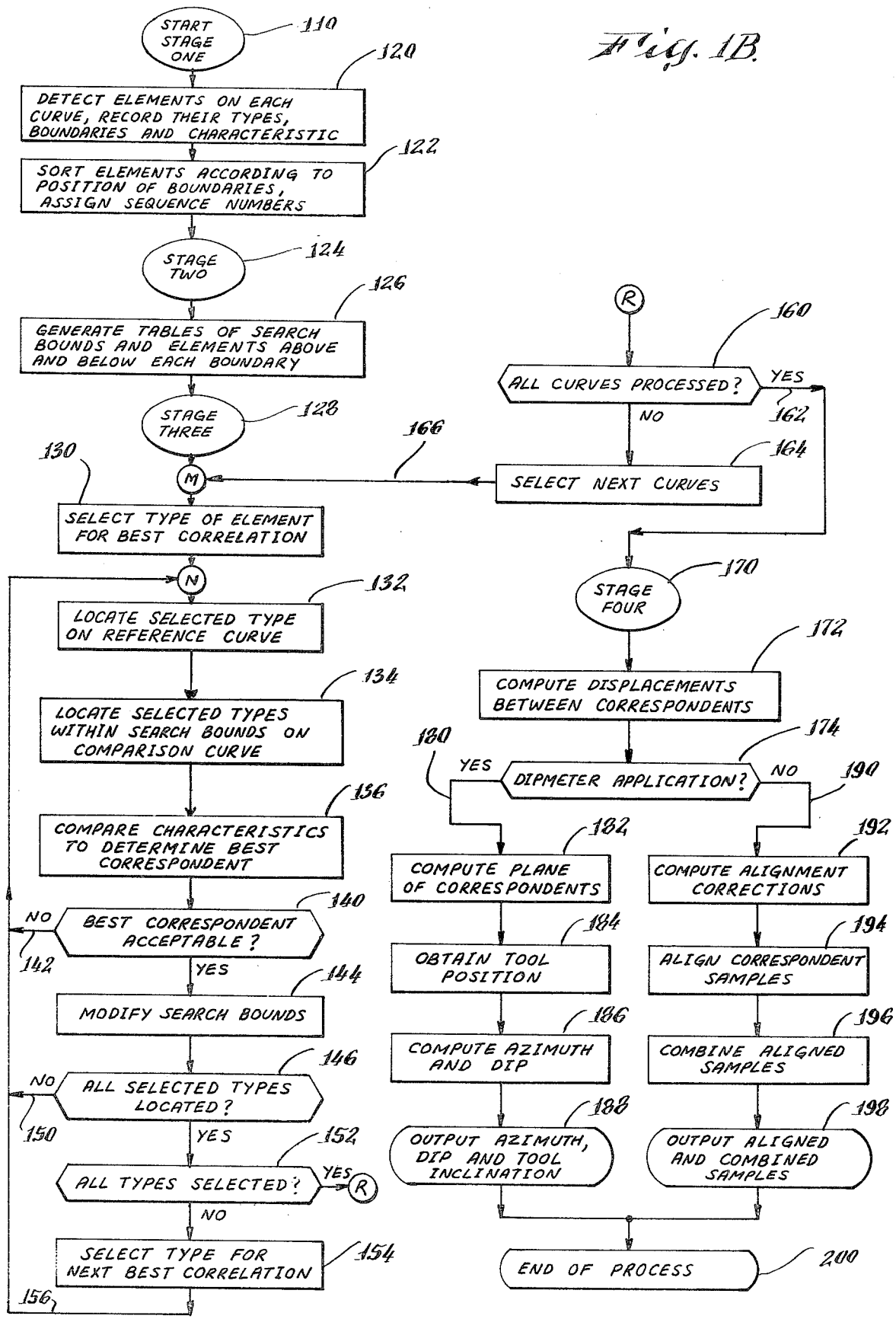
FIG. 1B illustrates simplified steps in the correlation and displacement determination processes.

The method illustrated in the following description may be applied to correlate signal elements obtained from any number of sources. The illustrated signals serve to demonstrate the usefulness of the method as applied to signals obtained from geophysical instruments. The signals might well have been obtained from biomedical instruments, for example.

Referring now to FIG. 1A, there is illustrated a method of obtaining and processing signals obtained from a borehole investigating device commonly known as a dipmeter. A more complete description of this device may be obtained from U.S. Pat. No. 3,521,154 issued July 21, 1970 to J. J. Maricelli.

A borehole apparatus 18 is lowered into a borehole 10 for investigating earth formations 11. Typical earth formations are represented by shale formations 13 and 14 with an intervening sand formation 15. Typical boundaries 16 and 17 are shown between the different formations. The downhole investigating device 18 is adapted for movement through the borehole 10 and includes four pads designated 19, 20, 21 and 22 (the front pad member 19 obscures the view of the backpad member 22, which is not shown). The pad members 19 through 22 are adapted to derive measurements at the wall of the borehole.

The pads 19 through 22 each include a survey electrode Ao. One of the pads herein designated pad 19 may contain an additional survey electrode Ao'. Each survey electrode is surrounded by an insulation material 48. The insulation material and thus also the survey electrodes are surrounded by a main metal portion 45 of the pad. The main metal portion 45 of each pad, along with certain other parts of the apparatus, comprise a composite focussing element for confining the survey current admitted from the various survey electrodes to a desired critical pattern. Survey signals representative of changes in the formations opposite each pad are obtained from circuits comprising the Ao electrodes, focussing elements and current return electrode B.

The upper end of the device 18 is connected by means of armored multiconductor cable 30 to a suitable apparatus at the surface for raising and lowering downhole investigating device through the borehole 10. Mechanical and electrical control of the downhole device may be accomplished with the multiconductor cable which passes over a shieve 31 and then to a suitable drum and winch mechanism 32.

Electrical connections between various conductors of the multiconductor cable which are also connected to the previously described electrodes, and various electrical circuits at the surface of the earth are accomplished by means of a suitable multielement slipring and brush contact assembly 34. In this manner, the signals which originate from the downhole investigating apparatus are supplied to the signal processing circuits 39 which in turn supply the signals to a signal conditioner 40 and recorder 41. Additionally, a suitable signal generator 42 supplies current downhole via transformer 50 and to signal processing circuits located at the surface. The details of these circuits are described in the aforementioned Maricelli patent.

The signals obtained from the downhole device may be recorded graphically by a film recorder 41. One such recorder is described in U.S. Pat. No. 3,453,530 issued to G. E. Attali on July 1, 1969. In addition, the signals may be processed to obtain discrete samples and recorded on tape. On such tape recorder is described in U.S. Pat. No. 3,648,278 issued to G. K. Miller et al on Mar. 7, 1972. The signals or samples thereof may also be transmitted directly to a computer. One such transmission system is described in U.S. Pat. No. 3,599,156 issued to G. K. Miller et al on Aug. 10, 1971.

The recorded or transmitted signals may also be processed as sampled data by general purpose digital computing apparatus properly programmed in a manner to perform the process described herein or by special purpose computers composed of standard modules arranged to accomplish the same process.

Alternatively as shown in FIG. 1A, the signals may be processed at the well site again using conventional digital computing apparatus interfaced to the signal conditioner 40. One such computing apparatus is the Model PDP-11/20 obtainable from Digital Equipment Corporation. Suppliers of such equipment may also supply signal conditioning circuits 40 and signal conversion means 60 for conditioning and converting analog signals to digital samples suitable for subsequent digital storage and processing. Further, such computing apparatus ordinarily includes memory 54 for storing data and information such as parameters, coefficients and controls used and generated by the processing steps.

A brief description of the process is illustrated by blocks 62 through 92 of FIG. 1A. The process will be described later in greater detail. The recorder 94 may be of the same type as recorder 41 or of the type of tape recorder previously referenced. Also the common analog or incremental X-Y Plotter may be used. Therefore the details and circuits of such apparatus which are available elsewhere will not be described herein.

A summary of the processing steps indicated by FIG. 1A will be given at this point.

The processing may be described as four smaller processes which may be performed in sequence or optionally in parallel, at least in part. The first process is indicated by Blocks 62 and 64, the second by Blocks 68 and 70, the third by Blocks 72 through 82 and the fourth by Blocks 90 and 92. Block 62 represents an element detection process wherein samples of the signals obtained from signal conversion means 60 are searched to recognize groups of samples representing specific types of elements. This search is conducted using search patterns and threshold values stored in memory 54. The detection process includes boundary determination and element typing. Once an element is detected, characteristic parameters are computed as represented by Block 64 according to control procedures referenced from the memory. The detected elements, along with their boundaries and characteristic parameters are subsequently stored in memory 54.

The first process may continue, as indicated by Branch 66, until a number of elements have been detected and processed as indicated by Blocks 62 and 64. Then, either in sequence with or in coincidence with the previously described processes, the second process may be performed. The detected elements may be sorted, as represented by Block 68, to provide cross-references to additional elements and boundaries according to their type, which are then stored in memory 54. Additionally, as indicated by Blocks 70, search bounds may be generated for each boundary creating additional cross-references. Further details for the above described processes may be found in reference to the description of FIGS. 8A through 8G.

The start of the next process is represented by Block 72 and begins with a selection of a type of element known to provide a desired type of correlation. For example, the elements corresponding to outstanding features known to provide reliable correlations might be selected first. Once the desired type is selected one such element previously having been detected on one of the signals, here designated as a reference signal, is located in storage means 54. Possible corresponding elements of comparable types previously detected on a comparison signal within the previously established search bounds are also located within said storage means.

Then, as indicated by Block 74, the element located on the reference signal is compared with the elements located on the comparison signal. Each such comparison generates a correlation coefficient which is subsequently stored in the memory. The comparison process continues, as indicated by Branch 76, until all such elements have been compared.

As indicated by Block 78, the resulting correlation coefficients are then compared using methods described herein and threshold values stored in the memory for use in such methods. If a satisfactory comparison has been found, satisfactorily comparing elements are considered as corresponding and their corresponding boundaries used to modify search bounds according to a modification routine as indicated by Block 82. If no satisfactory comparison is found, the process continues as indicated by Branch 80. The modification of bounds results in an updating of the previously established search bounds stored within the memory. When the modifications are complete, as indicated by Branch 84, the modified search bounds are used in the processing of subsequent elements as previously described in reference to Block 72. Additional details of the processes for element selection, location, comparison and modification of bounds for boundaries of elements found to correspond will be given in regard to the discussion of FIGS. 9A through 9C and FIGS. 14 through 17.

Once a satisfactory number of such elements have been found to correspond, an optional next process may begin. Here displacements may be computed between corresponding elements. This process is represented by Block 90. The displacements may then be converted, as indicated by Block 92, to the dip or inclination of a formation boundary such as formation boundaries 16 and 17, for example. The computed dip information may be recorded on the previously mentioned recorder 94.

There is an additional application for the present invention illustrated in FIG. 1A. On pad 19 there is shown two substantially identical electrodes, the usual electrode Ao and an additional electrode Ao' aligned in the direction of movement of the device 18 through the borehole 10. One purpose of such aligned electrodes is to obtain two nearly identical signals derived from the same radial portion of a borehole at separate times. If the motion of the device is constant, the displacement between these two signals will also be constant and correspond to the displacement between these electrodes. However, the motion of the device may become unsteady in time, perhaps induced by varying amounts of drag between the cable 30 or pads 19 through 22 contacting the borehole wall. In such cases the unsteady motion may be indicated by varying displacements between signals obtained from Ao and Ao'.

This variation is particularly noticeable when the signals are sampled with independently driven sampling devices, such as those driven by the cable motion as measured at the surface. One such driving device is a cable length measuring wheel as shown at 34A used in controlling the signal processing, sampling and recording as indicated by signal lines 34B. Therefore displacements determined between such sampled signals are indicative of changes in velocity of the device and may be used to compensate misalignment of samples of additional signals derived at different sampling periods. A more detailed description of the effects of velocity variations may be found in the previously referenced paper by L. A. Allaud et al.

Additional applications for the enclosed invention are found in aligning two or more similar derived versus depth from separate devices passed through the same borehole at separate times. The signal so derived may be subject to initial depth reference errors and also to periodic misalignments introduced by the previously described drag effects.

In a similar situation, both signals may be derived on the same borehole pass from devices separated by distances more substantial than indicated by the two electrodes of pad 19 shown in FIG. 1A. In some cases devices are stacked one above the other to provided needed room. Accordingly, the signals derived from the device first to measure a given formation characteristic are stored or memorized for playback and re-recording at the same time as the device last to measure the same formation obtains its measurement. However, because of memorizing errors or lack of such memorizing apparatus, the first derived signal may be recorded without proper alignment to the last derived signal. In such cases of misaligned signals, displacements obtained by applying the techniques of the present invention may be used to correctly align these signals and allow their proper combination and use in further evaluation of the formation.

A further application known as well-to-well correlation is discussed in previously mentioned Feagin et al patent, U.S. Pat. No. 2,927,656. Here, however, the same or similar devices are used to measure what may be the same formation, but in a different borehole. Because of changes in the formation thickness, corresponding signals may vary substantially in length. In such cases, the ability of the present invention to recognize signal elements corresponding to such formations, characterize such elements and compare them using such characteristics constitutes a substantial improvement in well-to-well correlation. These and other features of the present invention readily allow correlation of elements of unequal length.

An additional application arises when separate signals are sampled versus time. The time displacement between corresponding signal features may provide both alignment and velocity information. One patent of interest is U.S. Pat. No. 3,571,787 issued Mar. 23, 1971 to Milo M. Backus et al.

In the Backus patent, a method of processing seismic signals is disclosed wherein seismic events corresponding to relative maxima or minima may be detected based upon time varying amplitude and frequency criteria and selected if they meet a determined constraint for lateral continuity between corresponding signals. The constraint may be based upon prior event continuity. The selected events may be combined for visual presentation to indicate a grade for the number and amplitude of events combined.

In the previously referenced Diltz patent, the similar seismic processing method is disclosed. Seismic events corresponding to peaks whose amplitudes may optionally exceed a threshold are detected and selected if they occur within an adjustable time gate or time constraint. The selected events may be enhanced and stacked for visual presentation.

An additional U.S. Patent which utilizes the unique characteristics of seismic events is U.S. Pat. No. 3,056,945 entitled, "Processing Seismic Traces and Apparatus Therefore" issued Oct. 2, 1962 to C. W. Horton. This patent conceives seismic events or reflections as amplitude modulations of a carrier frequency. It is generally recognized that seismic signals have well defined frequency and power spectra resulting from mechanical vibrations of the earth formations. As such, it is common to use demodulation techniques or even characteristic frequency filtering on seismic signals. Further, use of complex autocorrelation and Fourier transforms may be necessary to design such filters.

No such natural amplitude or frequency limiting processes are usually present in the case of well logging signals. Indeed, signals derived from well logs are usually more complex than seismic signals. Thus the correlation techniques of the present invention, which are useful in correlating the more complex well logging signals, can be expected to substantially improve the seismic processing typified by the above Diltz, Backus and Horton patents.

In the situation described in the above patents, the features of the present invention may be used to detect seismic events, select possible corresponding events occurring within a naturally determined time constraint utilizing the boundaries of the events themselves. In addition, the characteristic parameters for each event may be utilized in comparing events of unequal duration. Further, the comparison techniques described herein may be used to compare possible corresponding events to determine which events correspond. Displacements determined between corresponding events may be used to determine the velocity of the formations traversed by the seismic signal. The formation velocity information combined with formation boundary information determined by the methods taught herein may then be presented as a log of formation velocity versus depth or time.

In order to describe the many features of the invention in detail, the description will be generally divided into four smaller processes. When performed in sequence, each process may be regarded as a stage or phase of a total process. However, only the first three phases have features believed to be new and will be described in detail.

The first stage may be described as the element recognition and classification stage. Its function is to detect and locate each element, determine its type and size, number and position of its boundaries, the sequence of the elements and boundaries in regard to one another and calculate the characteristic parameters which describe the correlatable features of the element.

The second stage or phase may be regarded as a reference generating stage. Its function is to sort the elements and boundaries according to predetermined laws for possibly corresponding elements and boundaries. Cross-references are provided to locate each element of a given type on a given signal in regard to boundaries located on each signal regarded as a reference signal. Further, cross-references are provided for each boundary on each reference signal which locates provisional bounds used in a search for possible elements on a given signal which may correspond to an element located on each reference signal.

The third stage or phase may be described as the correlation stage. Its function is to select a type of element known to provide a desired type of correlation, locate such an element on the reference signal and search for possible corresponding elements of comparable types located on a comparison signal within the provisional bounds for searching already established and compare these elements to determine corresponding elements. If a corresponding element should be found, the previously established bounds are modified accordingly to guide subsequent searches for further possible corresponding elements which may be also selected to provide a desired type of correlation. When all selected types of elements have been considered, the correlation phase is complete.

An optional fourth phase may be described as the displacement calculation and utilization phase. Here displacements are determined between boundaries or outstanding samples of elements known to correspond. The utilization of these displacements depend upon the source of the signals corresponding to these elements.

FIG. 1A describes some steps of the present invention in one form as they might be practiced on a small computer at the well site, for example, wherein some of the steps could be performed as soon as output from previous processes had provided enough information for them to proceed. FIG. 1B describes an additional method of practicing the invention wherein each of four stages are performed in sequence, that is stage one is completed before stage two starts and similarly stage two is completed before stage three starts. This is one method in which the present invention might be implemented, in particular larger scale digital computers wherein sufficient core and other types of memory could be provided. One such computer system capable of practicing the present invention is designated as an EMR Model 6050 comprising 32,000 words of 24 bits each in conventional memory along with at least one digital tape transport to provide for input of recorded signal samples and additional tape transports or drum or disc memory to store the controls and reference information generated by the processes of the invention. These processes will subsequently be described in enough detail to enable a scientific programmer of ordinary skill to implement the invention on this or comparable machines.

Now referring to FIG. 1B, Block 110 indicates the start of the process which includes reading of signals from digital tapes on the previously mentioned transport and preparing the computer with a program written in a language such as FORTRAN which controls the computer to perform the processes described herein. Included with the preparation of the computer are the reading of the necessary parameters and controls as will be described later in detail. The discussion will now include a general description of the processes incorporated in each of the four previously mentioned stages.

As indicated by Block 120 on FIG. 1B, stage one is divided into a first process wherein elements are detected on each curve. These elements are of specific types such as bumps, depressions, peak-bumps and peak-depressions as well as other types such as surges, for example. The detection processes are detailed in FIGS. 8A, 8B, 8C and 8D. For each such element detected, the element type, its size and its boundaries as well as other characteristic parameters which describe the specific type of element are determined and recorded, perhaps on the drum or disc memory previously mentioned. As is commonly the case in recording information which will subsequently be referenced, an index may also be constructed indicating the position or addresses used to store the recorded data.

Such an index allows the detection of the elements to proceed in any manner desired such that, for example, each type of element and each size of each type of element may be detected as they occur on each of the curves or signals. On the other hand, the process may proceed by searching for one specific type of element or pairs of complimentary types of elements with each processing of a given curve or signal.

For example, in a preferred method of executing the present invention, the smallest elements of a given type are first detected. More particularly, boundaries which exceed the requirements of the smallest element may be detected and recorded. Subsequent examination may find that the boundaries of the small elements actually correspond to boundaries for larger elements. Thus boundaries first found to correspond to elements of at least a given size, such as the smallest size, may subsequently be found to also correspond to boundaries of elements of medium and large sizes. A subsequent search for these larger sizes may then only consider resizing the elements corresponding to these first detected boundaries.

After all sizes and types of elements on each of the curves or signals considered in the detection process have been detected, the elements may be sorted according to their relative positions. Further element sequence numbers may also be then assigned providing reference information. Further boundaries detected on each curve may be sorted according to their relative position and type to provide references which indicate the relative positions of any boundary or any given element of a particular type in relation to other boundaries or elements detected on the same curve or signal. These references will be described in greater detail in regard to FIGS. 12 and 13. Block 122 represents this sorting procedure which concludes the first stage.

The second stage, as indicated by Block 124, follows the completion of the references generated for a given curve. Additional references or tables are generated by the process represented by Block 122 but now providing information indicating the relative position of a boundary on one curve or signal as related to additional boundaries or elements on other curves. These references generated as indicated in Block 126 are illustrated as tables in FIGS. 14 and 15 and will be discussed later in greater detail.

These references may be stored in any of the memory systems available to the computer but preferably would be stored in memory systems having random address capabilities. Thus, information previously determined for any given element or boundary may be quickly cross-referenced and obtained. It is essential that such memory systems readily allow updating of such previously determined information. This updating is necessary for the processes that follow in stage three.

Block 128 designates the beginning of the third stage. This stage incorporates iterative processes as indicated by the return points in the flow diagram designated as M and N. Initially, however, the process begins as indicated by Block 130 by the selection of a type of element known to provide a given type of correlation. For example, if the type of correlation desired is one which first provides for comparing the long duration signal elements, the type of element first selected in the process might be a surge. More particularly, the selected type might be a series of elements occurring in some prescribed order, for example, a series of bumps and depressions might be selected. The order of preference for such selections is determined by previously input control parameters, read perhaps in the execution of preparation, Block 110.

As indicated by Block 132 of FIG. 1B, the next step in the process is the location of the selected type of element on one of the signals or curves designated as a reference signal. Since the elements of all types have already been detected on each curve or signal, the process performed here is actually the process of referencing the elements of the selected type previously detected on the reference curve and now stored in the memory system. The location process utilizes the references created previously as indicated in Blocks 122 and 126.

The next step in the process, as indicated by Block 134, is a similar location process now performed on a curve or signal designated as a comparison signal. However, restrictions are now placed as to the possible location. In this case, the selected element must be located within search bounds previously defined and stored within the memory system. Initially, the search bounds were created as indicated in Block 126. However, as the process proceeds these search bounds will be systematically updated.

As several elements of the selected type may be found within the search bounds, it is necessary to compare these elements and determine which element, if any, actually corresponds to the element located on the reference signal. This process is indicated by Block 136. The processes of selecting, locating and comparing elements will be described in detail later in reference to FIG. 9A. As for now, it suffices to say that each of the selected types of elements located within the search bounds is compared with the element located as indicated in Block 132 and a best comparing set of elements is provisionally considered as corresponding elements. That is, the element best comparing to the selected element located on the reference signal is considered as the best correspondent of that element.

Then, as indicated by Block 140 this best correspondent is checked to see if the degree of comparison is acceptable. If it is not acceptable, then the process continues as shown by Branch 142 since the test indicated by Block 140 answers NO, and starts again at point N with the location of a new selected element on the reference signal.

However, if the correspondent is acceptable, as indicated by the test in Block 140 answering YES, the previously established search bounds are modified as indicated by Block 144. This modification process is an important feature of this invention and is described in detail in regard to the descriptions of FIGS. 16 through 18 and particularly in regard to the processing diagrams described in FIGS. 9B and 9C.

The next step indicated in FIG. 1B is the test shown in Block 146 which serves to test to see if all elements of the selected type have been located. If not, the test answers NO, the process returns to point N and commences again at Block 132 as previously described. If, however, all elements of the type previously selected in Block 130 have been processed, the test answers YES and the procedure continues to the test indicated in Block 152. This test checks to see if all types of elements have been selected. If the answer is NO, as indicated by Block 154, the next type of element previously defined in the order providing the desired type of correlation is selected. For example, if the first type was a surge, the next might be a bump or depression. The process then begins again, as indicated by Branch 156, returning to point N at Block 132.

Once all types of elements have been selected and located on the reference curve and the correspondents to these elements, if any, determined on the comparison signal, the process continues to point R by the test indicated in Block 152 answering YES. It is then determined if all curves have been processed as indicated by Block 160. It will be appreciated that each curve may be, in turn, considered first as a reference curve and then as a comparison curve. This will be discussed in greater detail in regard to the processing of dipmeter signals.

If all desired curves have not been properly processed, the test indicated by Block 160 answers NO and the process proceeds to Block 164 and a new reference and perhaps a new comparison curve is selected. These are then processed beginning at point designated as M. For example, in the dipmeter apparatus illustrated in FIG. 1A, a first reference curve might correspond to the signal obtained from pad 19 and the first comparison curve might correspond to the signal obtained from pad 20. Then, as indicated in Block 164, the second reference curve is selected to correspond to the signals from pad 20 and the second comparison curve is selected to correspond to the signals obtained from pad 21. Finally, the signals obtained from pad 21 might be regarded as the reference curve and the signals obtained from pad 21 as the comparison curve. It would be optional to complete the process by selecting the signals obtained respectively from pads 21 and 19 to be regarded as reference and comparison curves.

When all such references and comparison curves have been selected, the test indicated by Block 160 answers YES and the processes described as the first three stages is complete. Ordinarily the last stage is optional and utilizes displacements computed between the elements or outstanding samples or boundaries thereof which have been found to correspond in the previously described stages. FIG. 1B illustrates two applications. Starting then with Block 170 which indicates the beginning of the fourth stage, the first step would be to compute the displacements between the previously determined corresponding elements as indicated in Block 172. These displacements may be expressed as the number of samples, or as in the case of dipmeters, in actual inches of centimeters of borehole travel between each corresponding pair of elements located on the reference and comparison signals.

As indicated by Block 174, the actual application depends upon the source of the signals or curves. The indicated test answers YES if the signals were obtained from a dipmeter and are to be used in computing the dip of a formation feature represented by the signal elements found to correspond. In such a case the process continues by Branch 180 to Block 182. At least two displacements are required to define the plane indicated in Block 182. A method of using the determined displacements to compute a plane of intersection with the borehole represented by the correspondents is described in the previously referenced dipmeter paper by Schoonover et al. An additional description may be obtained from the paper entitled, AUTOMATIC COMPUTATION OF DIPMETER LOGS DIGITALLY RECORDED ON MAGNETIC TAPE published in the "Journal of Petroleum Technology", Volume 14, pages 771 through 782 in July of 1962 by J. H. Moran et al.

Once the plane of intersection with the borehole has been computed, additional information is needed to compute dip and azimuth. The tool positions may be obtained from other sources. For example, the tool inclination, relative bearing and azimuth of the pads is customarily recorded along with the signals obtained from the pads. When this information is available, as indicated by Block 184, they are combined with the previous displacements or plane of intersection and dip and azimuth of the dip may be computed, as indicated by Block 186. Finally, as indicated by Block 188, the output of azimuth, dip and tool position is performed. This output may be to the recorder 94 indicated in FIG. 1A, particularly when this recorder is of the usual variety of incremental X-Y plotters associated with scientific computers.

At this point, the processing would be complete as indicated by Block 200. However, if the original signals or curves were not obtained from a dipmeter but obtained from other well logging, seismic or biomedical devices as discussed herein, one application of the invention might be to compute alignment corrections as indicated by Block 192. In such case the test indicated by Block 174 would answer NO and the process would proceed by Branch 190.

The computed alignment corrections are obtained from the displacements determined between corresponding elements and may be expressed either in samples or directly in the equivalent measurements corresponding to the necessary shifts needed to align one signal in correspondence with another. Then, as indicated by Block 194, alignment corrections could be performed on the samples corresponding to the signals.

For example, if it was found that the elements on Signal 1 were displaced by four samples from the corresponding elements of Signal 2, all samples between the boundaries of these elements on one or the other signals would be shifted by four samples in the direction indicated to align the corresponding elements. The shifting of the samples properly aligns them and permits accurate combination of the samples in subsequent evaluation process indicated by Block 196.

There are numerous processes using combined samples obtained from various signals to evaluate formations and no attempt will be made to describe them herein. Thus Block 196 can be regarded as the combining of samples obtained from the various signals either corresponding to the reference or compared signals and also those signals obtained with known alignments to these signals. Thus a composite of all samples obtained from the same formation may be obtained in proper alignment. This composite may be output as indicated by Block 198. Such output ordinarily would be to a tape transport or film recorder permitting the removal of the output to offline storage. In this case the process would be complete upon such output, as indicated by Step 200.

Now that the general framework within which the invention operates is understood we shall describe the particular details relating to the previously mentioned smaller processes within the larger process. The first process to be described in detail will be the processes used to identify or recognize outstanding types of elements of a curve or signal represented by samples of that curve or signal. More specifically these processes comprise identifying the outstanding types of elements of the curve classified by specific types such as bumps, depressions, peaks, surges and so forth by searching for groups of samples of the signal which exhibits specific variation laws or patterns characteristic of the types of elements. This process includes the definition of the relative position of each element which has been identified in terms of the abscissa or sample number of at least one outstanding sample of the element. Also, for each identified element the process includes calculating a network of specific parameters representative of its form. The specific parameters may also be known herein as characteristic parameters.

The identification of certain types of elements, in particular the types known as bumps and depressions is achieved by searching for groups of samples corresponding to a variation law that incorporates the use of a given threshold. Further, in order to overcome the arbitrary classification inherent to the use of a single threshold, several different threshold values are provided which allow the quantification of the relative size of elements of a given type by splitting the type of element into a plurality of further types or subtypes corresponding to ranges between or above the thresholds. The identification procedure for each specific type of element varies according to the type of element. Further, two or more types of elements may be regarded as compliments of one and other. For example, bumps and depressions may be regarded as compliments because a bump is systematically followed by a depression which is further followed by another bump. Still further, the identification of specific elements may include the use of identification or detection functions. In particular, the identification of bumps and depressions incorporates the use of a function of the slope of the signal being analyzed.

In order to identify the bumps and depressions of a curve, a function of a slope is calculated for each sample. A search is then made for samples corresponding to extrema of the slope function. The sample forming such extrema are regarded as the beginning or end of a bump or depression. Thus, bumps may be regarded as maxima of signal amplitudes on each side of which there are extrema of the slope function. Similarly, depressions may be regarded as minima of signal amplitudes on each side of which there are extrema of the slope function.

Further, when the amplitude of the slope function is considered, bumps or depressions may be classified into further types according to their size. This process may incorporate the previously mentioned thresholds. In this case the thresholds correspond to predetermined values of the slope function. To distinguish these thresholds from numerous other thresholds used in the invention, the thresholds as applied to the slope function will be designated as Ts. When both the beginning and end of a particular element is characterized by the slope function amplitude exceeding a given threshold Ts, then the element is said to be significant in size compared with Ts. By using a continuous range of increasing thresholds such as $Ts_1, Ts_2, Ts_3 \ldots Ts_n$; then a range of continuously increasing sizes for a given type of element may be determined with each size considered as significant compared to the corresponding threshold.

It is anticipated that there may be many efficient methods of determining signal elements meeting these definitions for the type of elements known herein as bumps and depressions significant compared to a threshold Ts. The method described herein is understood to be only one such method.

In the analysis of signals it is common to start at a specific point on a signal and proceed in a given direction. All subsequent analysis of each signal would proceed in the same direction. Therefore, a process described in terms of an analysis performed in a given direction may work equally well performed in either direction so long as it is performed consistently. In the present case, changing the given direction may result in the interchange of complimentary types of signal elements. For example, a bump might then be identified as a depression and a depression similarly identified as a bump. It is with this understanding that the following analysis method is described.

Provided now with a given direction for the analysis, bump and depression types of elements can be redefined. A bump will begin with the sample which corresponds to a maximum of the slope function and ends with the sample which corresponds to a minimum of the slope function. In the same manner, a depression begins with the sample corresponding to a minimum of the slope function and ends with the sample corresponding to a maximum of the slope function.

The extrema of the slope function on either side of a bump or depression is considered as the boundaries of the element and are retained or recorded along with its position as characterizing parameters for these particular types of elements. Comparison of the variation of the slope function with specified variations allows a particular method for the detection of the boundaries and the identification as to the size and type of element. The nature of the required variation may be regarded as a specific variation law or pattern characteristic of the type of element. Further, a given type of element may be divided into subtypes according to size. For example, the relative size of bumps and depressions can be determined if several given thresholds are chosen having increasing values $Ts_1, Ts_2 \ldots Ts_j \ldots (Ts_j < Ts_{j+1})$.

The extrema of the slope function may be compared with each value of Ts. More particularly, the variation of the slope function between these extrema may be used to size bumps and depressions. Thus, the initial and final boundaries of a bump of significant size compared with a threshold $Ts_j$ may be defined as the two samples corresponding respectively to the point of maximum slope which is significant compared with $Ts_j$ and to the following point of minimum slope which is also significant compared with $Ts_j$. Likewise the initial and final boundaries of a depression of significant size compared with a threshold $Ts_j$ may be defined as the two samples corresponding respectively to the point of minimum slope which is significant as compared with $Ts_j$ and to the following point of maximum slope which is also significant compared with $Ts_j$.

In the case of three thresholds: $Ts_1, Ts_2$, and $Ts_3$ with $Ts_1 < Ts_2 < Ts_3$ an element is considered as small if the variation from slope function extrema exceeds $Ts_1$ but does not exceed $Ts_2$, medium if the variation from the slope function extreme exceeds $Ts_2$ but does not exceed $Ts_3$ and large if the variation from the slope function exceeds $Ts_3$.

Figure 2A:
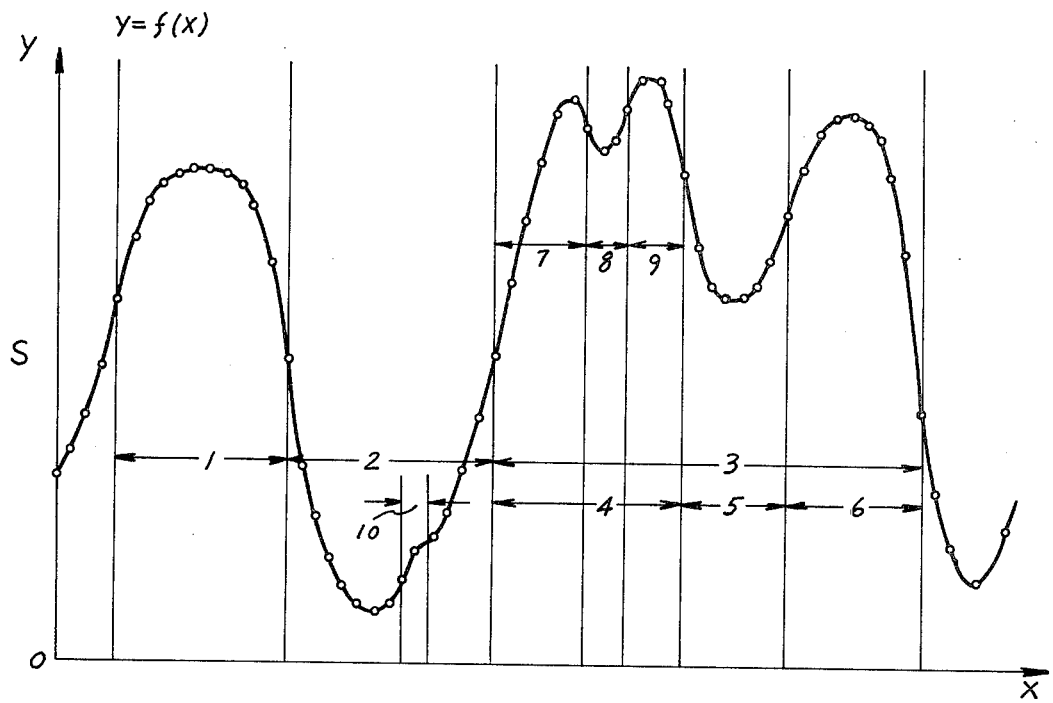
FIGS. 2A and 2B illustrate identification of types of signal elements known as bumps and depressions.
Figure 2B:
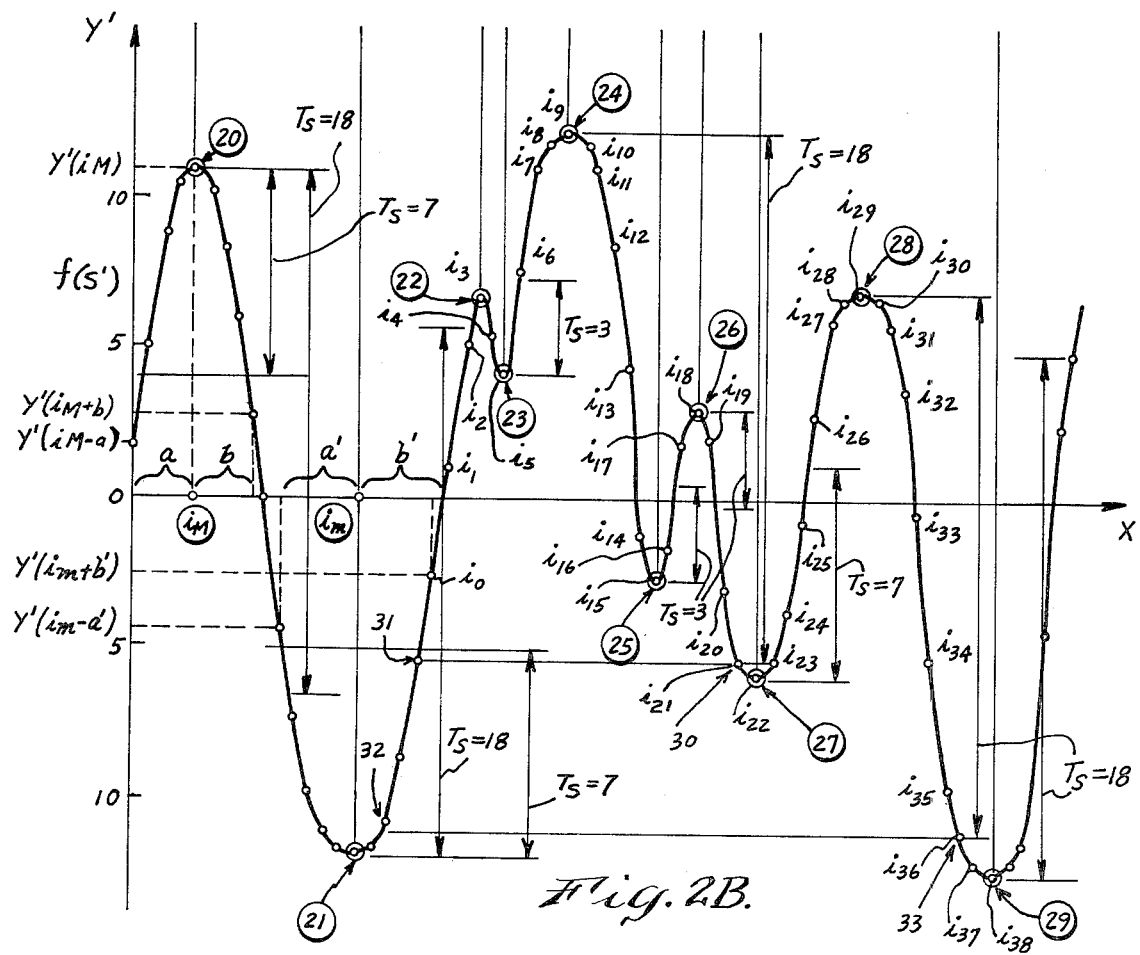

FIG. 2A and FIG. 2B illustrate the process of identification or detection of signal elements of the types known as bumps and depressions. FIG. 2A illustrates a signal S varying in amplitude as shown along the Y axis and with depth, time or sample number along the X axis. The direction of analysis considered is the direction of increasing sample numbers, abscissa values or X axis values.

Examining now the details of FIGS. 2A and 2B, we see that interval 1 in 2A contains a maximum of amplitude which began at point 20 shown in FIG. 2B. This point corresponds to a large maximum of the slope function S'. Therefore, the element in this interval can be regarded as a bump.

Interval 2 corresponds to a minimum of amplitude for the signal S which began at point 21, or the end of the bump. The interval ends with a large maximum of the slope function at point 24. Therefore, the element in interval 2 is a depression.

Interval 3 of 2A corresponds to a bump incorporating several small extrema of amplitude which began with a large maximum of the slope function at point 24 and ends with a large minimum of the slope function at point 29. Note that intervals 2 and 3 include smaller extrema of slope shown as points 22, 23 and points 25 through 28 respectively. Closer examination of FIG. 2B indicates the presence of three threshold values: $T_s = 3$, 7 and 18. The variations of the slope functions between points 22 and 23 did not exceed even the smallest threshold while the variations between points 25 and 26 exceeded only $T_s = 3$. The variations between points 26, 27 and 28 exceeded $T_s = 7$. It is in this manner that the thresholds may be used to classify a given type of element according to size.

The extrema of the slope function are considered as determining the initial and final boundaries for bumps and depressions. The size of the bump or depression is related to the size of both its boundaries, as determined from the slope variation on either side of each of the two extrema which determined its boundaries. The variation is considered in regard to a given threshold Ts. If the amplitude of the slope function varies on both sides from its extremum value by an amount which at least exceeds a threshold Ts without exceeding the extremum value, then this extremum determines a boundary which is considered significant compared to Ts. If, however, on either side of the extremum the amplitude exceeds the previous extremum value before threshold is exceeded it is no longer considered.

A small sized element of the type designated as a bump or depression is detected when the extrema of the signal amplitude which determined its boundaries vary as described above so that both its boundaries are considered as significant compared with at least the smallest threshold $T_{s1}$. If either boundary is not considered significant compared to $T_{s1}$, the element is not considered as small. Similarly, the boundaries of medium sized elements are considered with regard to $T_{s2}$ and large sized elements with regard to $T_{s3}$.

Examining now the slope function illustrated about point 20 in FIG. 2B there is shown two intervals a and b adjacent to the point on the X axis designated as $i_M$. The outside edges of intervals a and b correspond to the first samples of the slope function which vary from an extremum of the slope function (here a maximum at point 20) by an amount greater than the threshold $T_s = 7$. Thus, the variation of slope function at $i_M$ defines an extrema which determines the location of a boundary considered as significant compared with $T_s = 7$ because within the intervals a and b, the slope function varies from its extremum by more than Ts without exceeding the extremum at $i_M$ (become more positive) within the intervals.

In the same manner $i_m$ designates an extremum of the slope function (here a minimum at point 21) on each side of which there are intervals a' and b' respectively whose outside ends are defined by the first sample of the slope function which varies from the minimum by an amount greater than the threshold $T_s = 7$. Thus, it can be said that $i_m$ defines an extremum of the slope function significant compared to threshold $T_s = 7$ because within the intervals a' and b', the slope function does not exceed the extremum at $i_m$ (become more negative).

Thus $i_M$ and $i_m$ indicate an additional method of considering boundaries defined by extrema of the slope function so that they may be considered as significant in size as compared to a threshold Ts.

The preferred slope function incorporates features designed to distinguish bumps and depressions from other elements such as peak-bumps and peak-depressions. More particularly, the preferred slope function would filter out variations in signal amplitude which correspond to high frequencies and low amplitudes. Thus, the preferred function enables large variations in the amplitude occurring at low frequencies to be detected while small variations occurring at high frequencies will not be detected.

Figure 3:
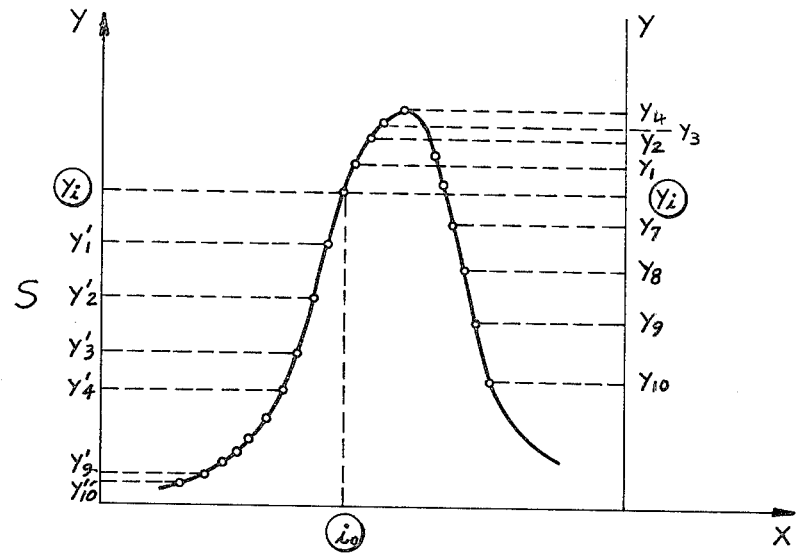
FIG. 3 shows how a slope function of a sampled signal might be calculated for a given sample.

To obtain these features the slope function incorporates samples obtained on either side of a considered sample. Referring now to FIG. 3, consider the sample designated $i_o$ as illustrating such a sample. The value of the sample corresponding to the signal at point $i_o$ is shown as $Y_i$. The values of samples located progressively to the right of $i_o$ are designated as $Y_1, Y_2 \ldots Y_{10}$. Values of the samples located progressively to the left of $i_o$ are designated $Y_1', Y_2', Y_{10}'$. One method of computing a slope function which obtains the desired frequency and amplitude characteristics incorporates the use of varying weights applied to the differences in amplitude values of the samples respectively located on either side of the considered point $i_o$. Additionally, these weights may decline in value with the distance between the sample and the considered sample $i_o$. For example, one such equation for computing the slope function P at $i_o$ is:

$$P_i = 10(Y_1 - Y_1') + 9(Y_2 - Y_2') \ldots + 2(Y_9 - Y_9') + 1(Y_{10} - Y_{10}') \qquad \text{(Equation 2)}$$

The first number in each term, for example the numbers 10, 9 . . . 2 and 1, illustrate a set of declining weights which vary with the distance from $i_o$. A more general equation is:

$$P_i = \sum_{j=1}^{J} WT(j) \, [Y(i_o + j) - Y(i_o - j)]. \qquad \text{(Equation 3)}$$

j is the number of samples between the considered point $i_o$ and the sample on either side of $i_o$. WT(j) defines the value of the weights applied with distance j on either side of the considered sample. J is the number of samples considered in the intervals on either side of the considered point $i_o$. In the case where $WT(j) = 11-j$ and $J = 10$, Eq. (3) and Eq. (2) are equivalent. However, any predetermined set of J weights WT(j) may be used in Eq. (3) and thereby vary the desired function response.

Referring now to FIGS. 3A through 3F there are shown various signal models which vary in amplitude about a central point $i_o$. Values of Y' and Y are respectively shown on the left and right of the point $i_o$. The computation of the slope function P using Equation (2) is illustrated for each of the models. The maximum amplitude in each model is shown as 20 units. FIG. 3A shows a sudden large increase in amplitude at point $i_o$.

The rate of increase decreases progressively with FIGS. 3B and 3C. The values of P correspondingly are also reduced, varying from 1100 to 440 from FIGS. 3A to FIG. 3C. Thus, higher values of this slope function are expected for rapid and large amplitude variations than for slow and small amplitude variations.

FIGS. 3D through 3F illustrate the effect of frequency variations. FIG. 3D illustrates a frequency of one cycle over the 21 sample interval used in calculating the slope function. The frequency increased to five cycles in FIG. 3F. The values of the slope function 600, 424 and 120 are shown to be progressively reduced with the increase in frequency shown respectively in FIGS. 3D through 3F.

FIGS. 3A through 3F illustrate how various threshold levels for the slope function may be employed to control the detection of bumps and depressions. If the smallest Ts value was 300 for those models, the model illustrated in FIG. 3F would be eliminated.

Figure 4:
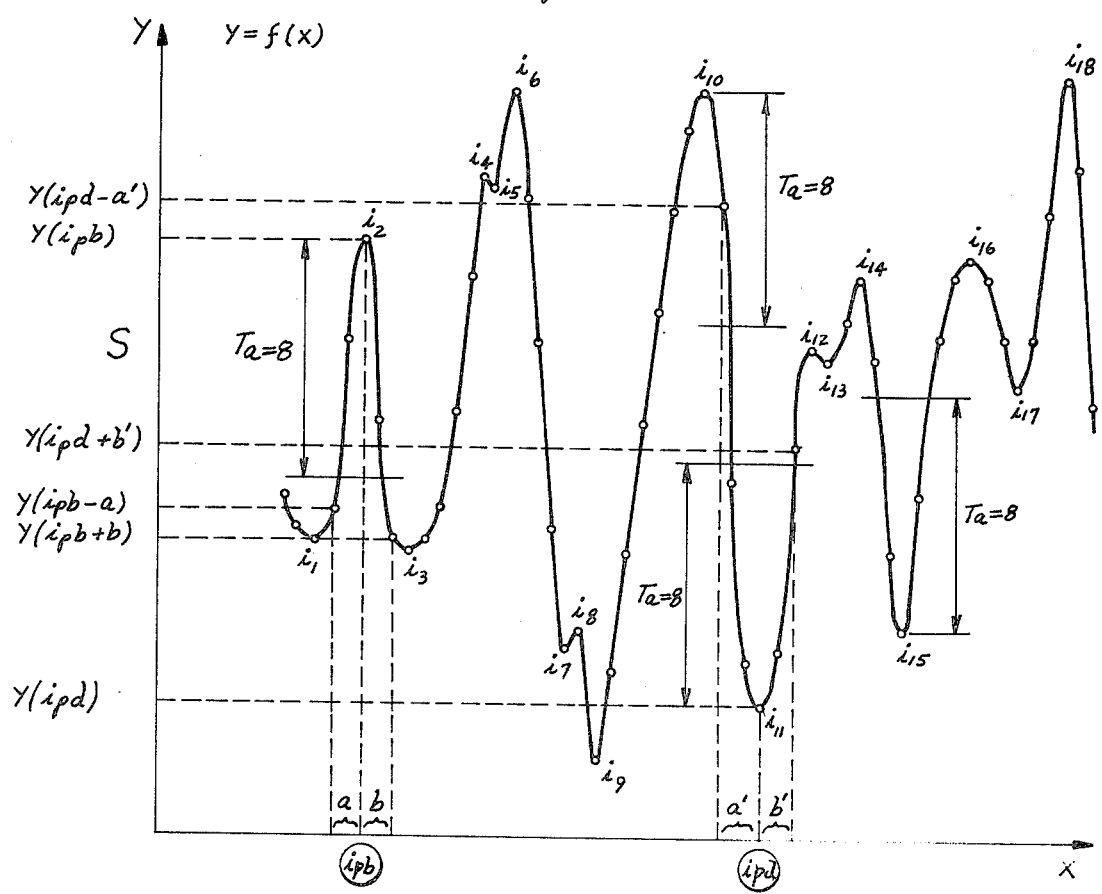
FIG. 4 illustrates identification of types of elements known as peaks-bumps and peak-depressions.

Referring now to FIG. 4, the detection and recognition of signal elements of the type regarded as peaks will be discussed. In the preferred method of searching for peaks, no slope function is employed in contrast to searching for bumps and depressions. However, a slope function could be employed but in such a case it would not contain the amplitude and frequency filtering characteristics of the slope function illustrated as Equation (2). This is because, in contrast to the large features of bumps and depressions, peaks are considered to be the finer details of the variations in signal amplitude. This is apparent in comparing the features of the signals illustrated in FIG. 2A with those in FIG. 4.

In the illustrated method of searching for peaks, the analysis is performed directly on the signal samples rather than on a slope function. In further contrast with the analyses for bumps and depressions, the analysis for peaks is performed on each extrema of the signal amplitude and considers the samples of the signal located on both sides of the extrema which occur without encountering further extrema of the signal amplitude of any size. Each extremum is considered to be the only boundary of the peak.

The polarity of the amplitude is used to further classify peaks into types of elements known as peak-bumps and peak-depressions. A peak-bump then corresponds to a maximum of signal amplitude and a peak-depression to a minimum of signal amplitude.

Thresholds may be also used to classify peaks into sub-types according to size in a manner similar to the use of thresholds for sizing bumps and depressions. Sample $i_2$ at point $i_{pb}$ of FIG. 4 is considered to be a peak-bump of a size significant compared with a threshold for amplitude variation Ta when the amplitude varies on both sides of the maximum value by more than Ta without encountering further extrema of amplitude. As illustrated in FIG. 4 at $i_{pb}$ the extrema (here a maximum at sample $i_2$) has on each side of its two intervals a and b whose ends are defined by the first samples having variations of amplitude from the extrema by an amount greater than a threshold Ta without encountering within the same intervals further extrema of amplitude.

In a similar manner at $i_{pd}$ the extrema (here a minimum at sample $i_{11}$) has on each side of it, two intervals a' and b' whose ends are defined by samples varying in amplitude from the extrema by an amount greater than a threshold Ta without having encountered within these intervals a further extrema of amplitude. Thus samples $i_2$ and $i_{11}$ correspond to peaks significant in size compared to Ta. Further, since $i_2$ is a maximum and $i_{11}$ is a minimum of the signal amplitude, they correspond to a peak-bump and a peak-depression, respectively. The boundaries of these peaks are considered to be at $i_{pb}$ and $i_{pd}$, respectively. These boundaries, since they correspond to the extrema, may also be considered to be of a size significant to a threshold Ta.

Another method for searching for peaks would be to locate or detect extrema of amplitude and search on either side thereof for intervals wherein the signal amplitude constantly increased, in the case of peak-bumps, or constantly decreased in the case of peak-depressions, until the variation in amplitude from the extrema varied more than a threshold Ta.

In a further method, each extrema of signal amplitude could be detected using well known peak detection logic. Since it is inherent that a peak-bump will follow a peak-depression which in turn will follow a peak-bump, it is necessary only to examine the amplitude at the extrema on both sides of the given extrema and, more particularly, to calculate the variation in amplitude values noted between each adjacent extrema and the given extrema. If both amplitude variations exceed a threshold Ta, then the given extrema is considered to be a boundary of a size significant compared with Ta. If the given extrema was a maximum, the element located at the extrema is defined as a peak-bump. If the given extrema was a minimum, the element located at the extrema is defined as a peak-depression, each respectively considered significant in size compared to Ta.

As was in the case of peak-bumps and depressions, a series of increasing thresholds for amplitude variations $Ta_1$, $Ta_2$, ... $Ta_n$ may be given to classify peaks into increasing sizes of varying significance. FIG. 4 illustrates only one threshold, Ta=8. FIG. 4 will be again discussed in the sample-by-sample analysis method illustrated in FIG. 8B and used for the detection of peaks.

Figure 5:
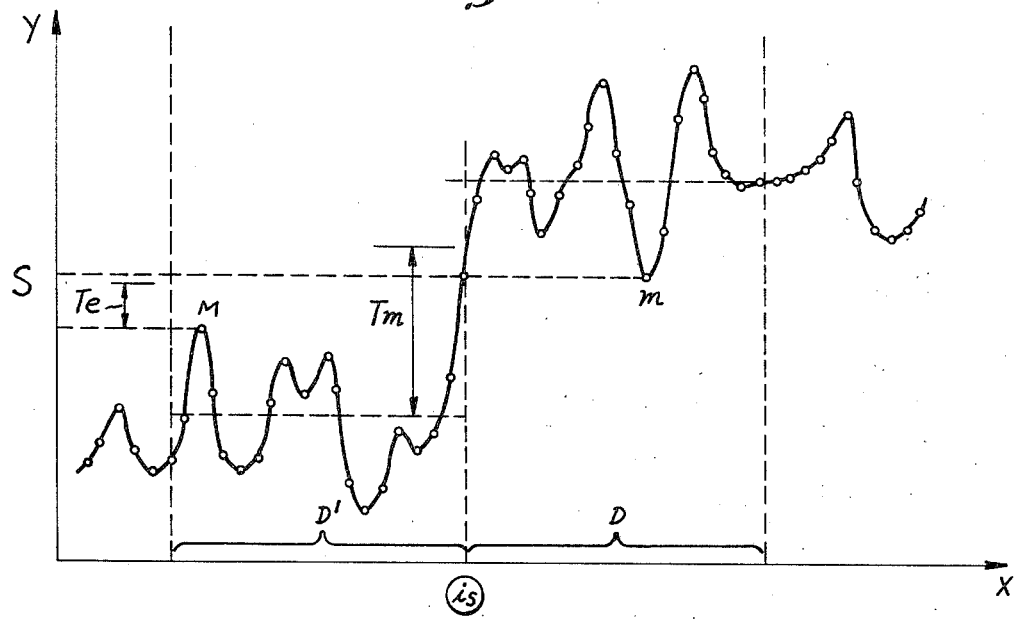
FIG. 5 illustrates identification of a type of element known as a surge.

Referring now to FIG. 5, there will be described two methods of detecting signal elements of types known as ascending and descending surges. Consider now the sample located at $i_s$. On both sides of $i_s$ there are two predetermined intervals of identical length used in both methods. The number of samples in each interval will usually be in excess of ten but the number may be any predetermined number depending upon the source of the samples.

In the preferred method of detecting surges, the value of the amplitude at each maxima and minima within an interval D' before $i_s$ is determined and similarly, the value of the amplitude at each extrema of the signal within an interval D following $i_s$ is determined. The amplitude at each maximum within each interval is compared and the largest maximum amplitude within each interval selected. Similarly, each minimum within each interval is compared and the smallest minimum amplitude within each interval is selected. If the largest maximum selected within D' is less than the smallest minimum selected within D, a positive or ascending surge is detected. Similarly, if the smallest minimum selected within D' is greater than the largest maximum selected within D, a negative or descending surge is detected.

By using thresholds in comparing the amplitudes at selected extrema, the difference in amplitudes may be compared to a threshold Te and if this difference exceeds the threshold, a surge is determined which can be considered to be of a size significant compared to Te.

By using a series of increasing values for this threshold $Te_1, Te_2, \ldots Te_n$, surges can be further classified into subtypes of increasing size. The only boundary of a surge is considered to be located at the sample $i_9$. This boundary may also be considered to be of a size significant to the threshold employed to detect the surge.

As an example of the above method, the sample designated as M in FIG. 5 would be found to be the largest maximum within D' and the sample m the smallest minimum within D. The amplitudes at M and m differ by an amount greater than Te. Therefore sample $i_s$ corresponds to the boundary of an ascending surge of size significant compared to Te.

An alternative method of detecting surges is also illustrated in FIG. 5. Considering the sample $i_s$ and same intervals D' and D, an average value for the amplitude of the signal may be obtained over each interval. For the interval occurring before $i_s$ the average value will be:

$$AB_{i_s} = \frac{1}{J} \sum_{j=1}^{J} Y(i_s - j) \quad (4)$$

For the interval following $i_s$, the average value will be $$AF_{i_s} = \frac{1}{J} \sum_{j=1}^{J} Y(i_s + j) \quad (5)$$

where:
J is the number of samples in each of the identical intervals D and D'; and
Y is the signal amplitude at the sample designated by ($i_s+$ or $-j$).

In a similar manner, the mean value or a comparable value for the intervals D and D' may be calculated. In any case, the value obtained for the interval D' is compared with the value obtained from the interval D. If these values differ by an amount greater than a given threshold value for such comparisons a surge is detected. If the average or mean value for D' is less than the average or mean value for D by an amount exceeding the threshold Tm, an ascending surge of a size significant compared with Tm would be detected. In the same manner, if the average or mean value occurring within D' exceeded the average or mean value occurring within D by an amount more than the threshold Tm, a descending surge of a size significant compared to Tm would be detected.

Again, a series of threshold of increasing values $Tm_1$, $Tm_2 \ldots, Tm_n$ may be used to further classify surges into increasing sizes of varying significance. The only boundary of the surge is considered to be located at $i_s$ and may be considered to be of a size significant compared to the threshold Tm used to detect the surge.

For an example of this alternative method, refer again to the intervals D' and D illustrated in FIG. 5. The two dashed horizontal lines in each interval indicate the average or mean value for each interval. These values differ more than Tm so a surge of a size significant to Tm is detected at $i_s$. Since the value in D' is less than in D, the surge is of the ascending type.

The general characteristics of the signal elements specified as bumps, depressions, peak-bumps, peak-depressions and ascending and descending surges have been described. Knowing these characteristics, several approaches have been described for their detection. Specific approaches will be described later in conjunction with the process diagrams.

A significant feature of the present invention is the characterization of the detected elements which allows the comparison of possibly corresponding elements without requiring an identical number of samples within each element. In contrast to standard correlation methods wherein an identical number of samples within two defined intervals are compared on a sample-by-sample basis, the present invention characterizes detected signal elements by computing characteristic parameters varying in number and nature according to the type of element. Since the type of element is known, as well as the order for such characteristic parameters for each type of element, the characterizing parameters will be employed to determine the degree of comparison of possible corresponding signal elements. Further, since each type of element may have the same number of characterizing parameters, it would be possible to compare different types of signal elements. For example, it would be possible to compare a large and medium size bump, even though they may differ substantially in length or duration, and particularly in the number of samples representing the signal features.

Since the type of element is known for each element, it is also possible to restrict the comparison of possible corresponding elements to those elements of the same or of at least compatible types. Further, if circumstances warrant, it would be possible to compare elements known to be of different types, such as a bump with a depression. This might be the case where anti-correlations would be ordinarily expected. In such cases, signal features which actually correspond to the same measured phenomena are reflected in a manner opposite to one another. For example, the signal from a device which produces a maximum of amplitude for a given phenomena may be compared with a signal from a different device which produces a minimum of amplitude for the same measured phenomena.

One of the most important characteristic parameters computed for each signal element is its boundaries. More particularly, the boundary's position expressed in terms of a sample number or abscissa value, the signal amplitude at the boundary, and the rate of change or slope of the signal at the boundary are considered as characterizing parameters. Further, characteristic parameters specific to a given type of element may be included. In the case of bumps and depressions, the length of the element may be determined by the difference in the position of its initial and final boundaries. In the cases of elements characterized by having an extrema of amplitude, the value of the amplitude at this extrema would be included. In the case of peaks, the number of samples examined in the interval on each side of the extrema before the amplitude value exceed a threshold might be retained. Further, the slope of the signal at the first sample on both sides of the peak or which exceeded the threshold amplitude necessary to define the peak might be retained.

In the case of surges, the average or mean values compared within the intervals before and following the sample which corresponds to the detection of the surge would be included as a characteristic parameter. In addition, the amplitude at the largest maximum and smallest minimum could be included, as well as the number of extrema of amplitude within each interval. These and other characteristic parameters which are obvious to those of ordinary skill could be included in the list of characteristic parameters computed to characterize each element for the purposes of comparing such elements.

Two important features of the present invention, the detection of specified elements and the characterization of these elements have been discussed. In summary, there has been disclosed how specific elements are detected and how for each such detected elements, characteristic parameters and boundary positions for the element are derived. It will now be disclosed how to use the boundaries for the elements in a process for limiting the search for possibly corresponding elements.

Figure 6B:
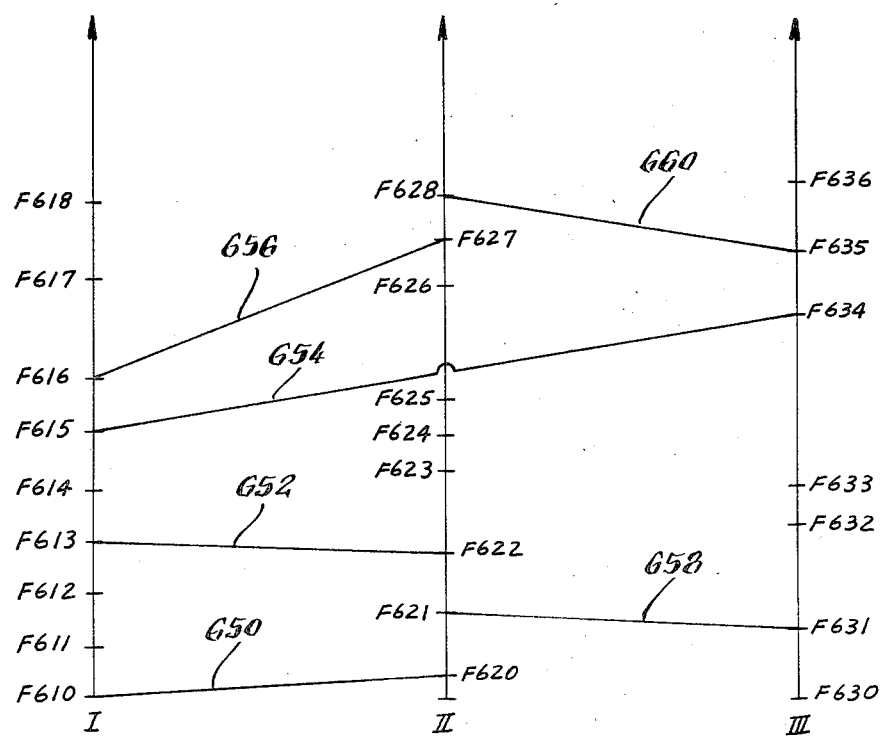

Referring now to FIG. 6B there are shown three signals designated as I, II and III. On each signal is indicated a series of boundary positions designated by F followed by a number. The boundaries located on Signal I are designated F610 through F618, on Signal II as F620 through F628 and on Signal III as F630 through F636. Certain of these boundaries are known to correspond through information already derived in the correlation process. These correspondences are designated by lines connecting the boundary positions. For example, F610 corresponds to F620 and F615 corresponds to F634 as designated by lines 650 and 654 respectively. Use of such boundary designations in references to represent information already derived facilitates both the operation of the invention and the discussion of its processes.

In the operation of the invention, once the boundaries of the elements located on a given curve or signal have been defined, they will be assigned boundary designations such as illustrated in FIG. 6B. These designations allow processing of boundaries without the necessity of associating the boundaries with the elements for which they were derived. This ability to disassociate boundaries from their elements if a further important feature of the present invention. It is in this manner that intervals between elements or their boundaries can be readily adjusted without regard to the number of samples contained within these intervals. It is possible to stretch or shrink, or more generally warp, the interval between any two given boundaries to match the interval between any other two boundaries located on different signals.

Since a boundary itself corresponds to a characteristic feature of an element, such as an extremum value of amplitude or an inflection point on the flank thereof, they constitute naturally occurring end points for correlation purposes. For example, in bumps and depressions the initial and final boundaries correspond to extrema of a slope function representing the initial and final rise and fall of the signal amplitude. Thus they define the end points of a correlation interval which is both optimumly placed on the curve and of an optimum length. The advantage of comparing signals within such a naturally defined interval will be obvious in contrast to the method ordinarily employed in correlation using fixed intervals which are arbitrarily placed.

Further use of the boundary positions in the correlation process allows an optimumal definition of the end points of a search interval used in the search for possible corresponding signal features. For example, it would be natural to start the search for corresponding elements such as bumps at a boundary defined as the initial boundary for such feature and terminate the search at a boundary defined as the final boundary of such a feature. The advantages of this concept will be obvious in contrast to the fixed and arbitrarily placed search intervals used in standard correlation methods. Because of the important features obtained through the use of boundary positions in the correlation process, the processing of these boundary positions will be described in detail.

In order to express the relative positions of boundaries and elements detected on a sampled signal which was analyzed in the given direction, the following definitions will be used. The direction of analysis is assumed to be the direction of decreasing depth or increasing time. Therefore, the element located on the signal at a higher depth or a later time than an element located at a deeper depth or an earlier time is considered or referred to as above the last mentioned element. In a similar manner, boundaries can be considered or referred to as above or below other stated elements or boundaries. It is in this same manner that the words "upper" and "lower" are used in referring to bounds or boundaries. For example, the lower boundary of an element such as a bump would be its initial boundary $f_1$ and the upper boundary would be its final boundary $f_2$. It can be assumed that an upper bound located on a given signal will have the same or higher position than a lower bound located on the same signal.

Referring now to FIG. 6A, there is illustrated certain relationships used herein to define the relative position of boundaries and bounds located on one or more signals S. The upper bound of the boundary f is the highest possible boundary which could correspond to f. The lower bound of f is the lowest possible boundary that could correspond to f.

FIG. 6A illustrates a boundary f located on $S_1$ at Point 600. There are shown two boundaries $F_m$ and $F_n$ located on $S_2$. As indicated by the dashed lines 620 and 622 respectively, $F_m$ is regarded as the upper bound of f located on $S_2$ and $F_n$ as the lower bound of f located on $S_2$. Thus in the search for boundaries located on $S_2$ which might possibly correspond to f, only boundaries located within the upper and lower bounds of f on $S_2$ are considered. Thus the upper and lower bounds, respectively, are considered as the upper and lower limits in the search for possible correspondents.

The notation used herein is as follows: the upper bound of a boundary f used in the search for possible correspondents on a signal S is designated Maj (f,S). Similarly, the lower bound of a boundary f used in limiting the search for possible correspondents on signal S is designated Min (f,S). Thus, the upper bound of f on $S_2$ is designated Maj (f,$S_2$) and the lower bound of f on $S_2$ is designated Min (f,$S_2$).

When sets of boundaries are known to correspond, as may be determined in the process described herein, the notation of upper and lower bounds may still be applied. FIG. 6A shows two sets of corresponding boundaries designated by solid lines. Boundary $F_i$ on $S_1$ corresponds to boundary $F_k$ on $S_2$, as indicated by line 604. In the same manner, boundary Fj on $S_1$ corresponds to boundary $F_1$ on $S_2$, as indicated by line 610.

When sets of boundaries are known to correspond, they are by definition the upper and lower bounds of each other. Thus, boundary $F_k$ located on $S_2$ is designated as both the upper bound Maj ($F_i$, $S_2$) and the lower bound, Min ($F_i$, $S_2$) of the boundary $F_i$ located on $S_1$. The reciprocal designations hold for the boundary $F_i$ on $S_1$, which is also by definition both the upper and lower bounds on $S_1$ for the boundary $F_k$ on $S_2$, since $F_i$ and $F_k$ correspond. FIG. 6A also shows the above nomenclature designated to two corresponding boundaries $F_j$ and $F_1$ located repectively on $S_1$ and $S_2$.

The definition of upper and lower bounds may be extended to boundaries located on the same signal as the given boundary. Thus, as shown at Point 600, the boundary f is by definition both the upper and lower bounds of itself located on $S_1$. In the same manner the upper and lower bounds are also designated as boundaries $F_i$ and $F_j$ all located on $S_1$ can also be designated as illustrated in FIG. 6A.

Turning now to FIG. 7, there is shown a series of boundaries and elements located along a signal S. The boundaries are designated as F700 through F790. The elements are designated as E70 through E79. FIG. 7 indicates another definition used herein to refer to the relative position of elements located on a given curve S in regard to boundaries also located on the same curve. There are two such references, Majax and Minax which refer to elements located respectively above the below a given boundary.

Further, there will be as many Majax and Minax references as there are boundaries in the elements designated by these references. Thus the references are determined in accordance with a given type of element, such as an element of type T1 and a given boundary f. Thus, the first element of a given type T1 any part of which is located above and which has its $f_1$ boundary located above the boundary f, is designated $Majax_1$ (f,T1). Also the first element of the type T1, any part of which is located below f, and which has its $f_1$ boundary located below f is designated a $Minax_1$ (f,T1).

Referring now to FIG. 7, element E76 is illustrated as the only element of type T1 any point of which is located between boundaries F725 and boundaries F750, all located on signal S. Further, element E76 is of the type that has two boundaries $f_1$ and $f_2$. The initial boundary $f_1$ is designated as F731 and the final boundary $f_2$ is designated as F742. Thus, in regard to boundary F725, element E76 may be referenced as both $Majax_1$ (F725,T1) and $Majax_2$ (F725,T1).

In the same manner element E76 may be referenced in regard to boundary F750 as the first element of type T1, any part of which is below this boundary and which has its initial boundary $f_1$ below boundary F750. It is also the first element which has its final boundary $f_2$ below boundary F750. Thus element E76 is referenced as both $Minax_1$ (F750,T1) and $Minax_2$ (F750,T1). Element E79 would be considered as the Majax of boundary F750 if no elements of type T1 were found in between. However, element E73 could not be considered as the Minax of boundary F750 because E73 is of the same type as E76 and element E76 is first below boundary F750. Element E70 is of a type T2, different from the type T1 of element E76 so it is the first element of this type below F750 and could be considered as the Minax of boundary F750.

The Majax and Minax references may be used to efficiently locate elements of a specified type which have their $F_n$ boundaries located first above or below, respectively, a given boundary on the same signal. The give boundary is typically a lower or upper bound for a boundary located on an additional signal. Thus, tables of Majax and Minax references are useful in the search for possibly corresponding elements of a specified type located within such bounds.

Considering now elements E73, E76, and E79 as the only elements detected on signal S of type T1 which are located in the section of the signal shown in FIG. 7, a table of references may be constructed using the information shown. The following table illustrates the Majax and Minax references for elements of type T1 in relation to boundaries F725 through F750. Only the initial $f_1$ and final $f_2$ boundaries of each element is considered in the table. For element types of more than two boundaries, additional references would be tabulated in the table as indicated by the dashed lines contained between the $Majax_1$ and $Majax_2$ tabulations. For element types having only one boundary, only one Majax and Minax reference would be tabulated.

| BOUNDARY (f) | $Majax_1$ (f,T1) | $Majax_2$ (F,T1) | $Minax_1$ (f,T1) | $Minax_2$ (f,T1) |
| --- | --- | --- | --- | --- |
| F725 | E76 | E76 | E73 | E73 |
| F731 | E79 | E76 | E73 | E73 |
| F742 | E79 | E79 | E76 | E73 |
| F750 | E79 | E79 | E76 | E73 |

In a general sense then, a bound is a boundary which represents the farthest possible location of a corresponding boundary. Its purpose is to limit the search for corresponding boundaries and elements, thus it may also be referred to as a search bound. Since such a limit for possible corresponding elements or boundaries must assume some previous information in regard to the possible displacements between corresponding elements or boundaries, these bounds serve to reference relative position information which has already been established.

It thus appears that the role of the upper and lower bounds is to define what is already known at a given point of the search process, about the relative positions of boundaries belonging to different signals or curves. In summary then, consider only two curves C and C'.

The upper bound of the boundary f on the Curve C' will be designated as:

Maj (f, C').

Likewise, the lower bound of the boundary f on the Curve C' will be noted as:

Min (f, C').

Note here that it is not necessary to know on which curve the boundary f is located. The same definition holds for the cases where f is located on C or C'.

When the correspondence between two boundaries f and f' located on curves C and C' respectively is established, the boundary f' must become both the upper bound and the lower bound of the boundary f on C'. This can be stated as:

Maj(f,C')=Min(f,C')=f'.

The reciprocal relationship for f' on C is:

Maj(f',C)=Min(f',C)=f.

Together these statements are equivalent to stating in terms of the references Maj and Min that f and f' correspond.

Returning now to FIG. 6B, three sets of boundaries designated by boundary sequence numbers located on the illustrated Curves I, II and III are shown schematically as previously described by three vertical lines.

Assume, for example, that the correspondence between boundaries connected by solid lines have already been established. Note that it would be illogical for such lines to cross one another. FIG. 6B shows:

F610 corresponds to F620 - Line 650
F613 corresponds to F622 - Line 652
F615 corresponds to F634 - Line 654
F616 corresponds to F627 - Line 656
F621 corresponds to F631 - Line 658
F628 corresponds to F636 - Line 660

According to the definitions given above, the following cross references can be constructed:

|  |  | Correspondences |
|---|---|---|
| Maj (F610, II) = F620 | Min (F610, II) = F620 | F610–F620 |
| Maj (F611, II) = F622 | Min (F611, II) = F620 | |
| Maj (F612, II) = F622 | Min (F612, II) = F620 | |
| Maj (F613, II) = F622 | Min (F613, II) = F622 | F613–F622 |
| Maj (F614, II) = F627 | Min (F614, II) = F622 | |
| Maj (F615, II) = F627 | Min (F615, II) = F622 | |
| Maj (F616, II) = F627 | Min (F616, II) = F627 | F616–F627 |
| Maj (F610, III) = F631 | Min (F610, III) = ⎫ outside | |
| Maj (F611, III) = F634 | Min (F611, III) = ⎬ of | |
| Maj (F612, III) = F634 | Min (F612, III) = ⎭ figure | |
| Maj (F613, III) = F634 | Min (F613, III) = F631 | |
| Maj (F614, III) = F634 | Min (F614, III) = F631 | |
| Maj (F615, III) = F634 | Min (F615, III) = F634 | F615–F634 |
| Maj (F616, III) = F635 | Min (F616, III) = F634 | |

To facilitate the handling of the references for elements and boundaries located on a given curve or signal and, more particularly, to allow efficient handling of cross-references between elements and boundaries located on several curves, a system of element and boundary sequence numbering has been developed. Sequence numbers may be assigned to elements and boundaries as the result of a sort operation which utilizes the relative positions of elements and boundaries to each other. The sequence numbers are assigned in an order determined by the sort operation performed on the information obtained from a single curve. It may be regarded as part of the process described as the first phase or stage.

The cross-references which may use these sequence numbers are generated in what is regarded as the second stage or phase and generate reference information relating more than one curve or signal. However, it is not necessary that the sequence numbers or cross-references be performed only at the illustrated points in the process. As shown in FIG. 1A, these operations may be performed any time after enough information is available to commence the operation.

Figure 10:
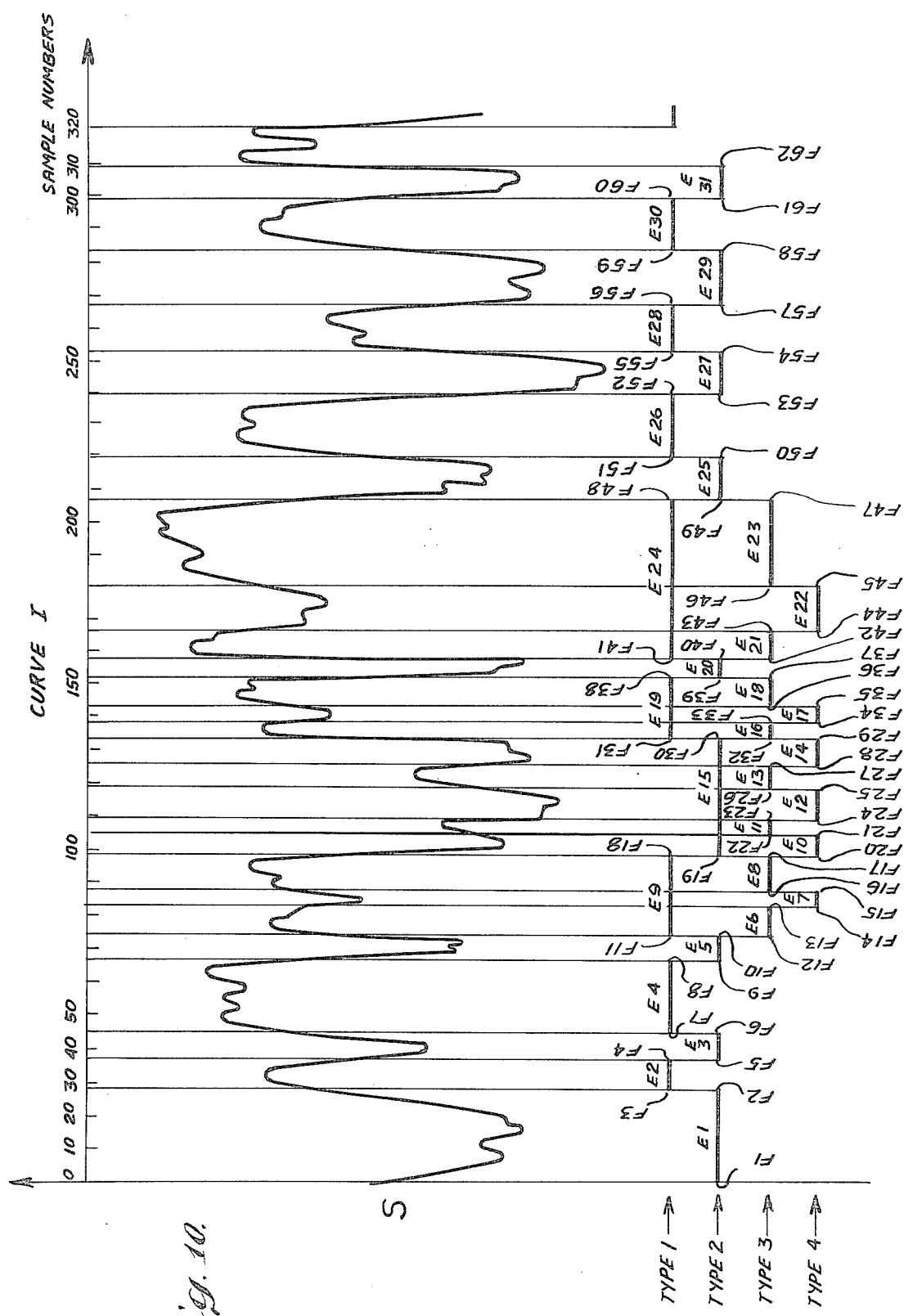

Referring ahead to FIGS. 10, 11 and particularly to the tables illustrated in FIGS. 12 through 14, the usefulness of sequence numbers in preference to abscissa values, for example, will be immediately obvious. Element sequence numbers are designated by the capital letter E followed by the sequence number. Boundary sequence numbers are designated by the capital letter F followed by the sequence number. From the ascending order of the element and boundary sequence numbers, it is apparent that such numbers incorporate relative position information into the assignment of the sequence numbers. This information is obtained from various sort processes which will now be explained.

Assuming that the following had been recorded in the element detection phase of the process, as a sequence of numbered records, one record for each detected element, (all types of elements recorded in whatever order they were detected):
record number;
type, number of boundaries, abscissa values or sample numbers for boundaries $f_1, f_2 \ldots f_n$ as $i_1, i_2, i_n$, characteristic parameters, outstanding samples and their positions.

The records may first be searched and sorted (perhaps by record number) to determine element sequence numbers. The records are sorted primarily according to the $f_2$ boundary positions. This primary sort is to arrange those records having the lowest $f_2$ positions ($i_2$) first and those records having the highest $f_2$ positions last. Records with identical $f_2$ positions will consequently be grouped together. Where several records have identical $f_2$ positions, these records will be further sorted to order those records having the highest $f_1$ positions ($i_1$) first and those records having the lowest $f_1$ positions last. At the completion of the sort, element sequence numbers may be assigned to each original record in the order indicated by the sorted record numbers.

This sort process assures that when two elements start at the same point ($f_1$ positions are equal) the element with the highest $f_2$ position (longest element) is assigned the highest sequence number. Also when two elements terminate at the same point ($f_2$ positions are equal) the element with the lowest $f_1$ value (longest element) is assigned the highest sequence number. Thus for any given group of element sequence numbers contained within common boundaries, the element with the highest sequence number is the longest element.

Note that since a large size element of a given type will not be considered as also qualifying as a smaller size element, it is not possible to have two elements which have identical $f_1$ and $f_2$ positions. Once the record numbers have been arranged according to the above sorting procedure and element sequence numbers assigned, Tables I and III of FIGS. 12 and 13 may be completed.

Record numbers are used, or, more particularly, the addresses of the records may be used, along with the $f_1$ and $f_2$ abscissa values in the sort operation to prevent having to move the entire contents of the record when the relative position of a record is changed during a sort operation. Once the sort operation is complete, then the appropriate record can be located and updated by assigning the sequence number determined by the record sort. For example, once the record numbers, or their addresses, corresponding to all elements detected on a given curve are sorted to provide a given sequence, a sequence number can be assigned to each of the elements in accordance with the sorted sequence of the record numbers.

While element sequence numbers can be used to distinguish which of several overlapping elements is the longest, they are not useful to distinguish if the elements overlap or to determine which elements are above or below a given element. An additional parameter, a boundary sequence number is needed.

A similar sort operation may be made to determine boundary sequence numbers. These numbers will be sequenced from the first (lowest) and to the last (highest) boundary for a given signal. The records are sorted according to their boundary positions in a primary sort independent of their associations as to $f_1$ or $f_2$ boundaries or as to the type of their associated element.

The primary sort is to arrange the boundaries in the order of their increasing abscissa values. The boundaries having identical abscissa values will consequently be grouped together. These boundaries can then be sorted in a secondary sort according to whether they correspond to an initial boundary $f_1$ on a final boundary $f_2$. The $f_2$ boundaries of lower elements are ordered before the $f_1$ boundaries of higher elements so they will receive lower sequence numbers.

Still further, those boundaries which have identical absicca values and are also $f_1$ or $f_2$ type boundaries will consequently be grouped together. These boundaries are again sorted according to the associated boundary position or alternatively in the order of their associated element sequence number. This latter sort may be based upon the same relationship used in determining the element sequence number. Thus for identical $f_2$ positions, the $f_2$ boundary with the higher $f_1$ position (lower element sequence number) is ordered before a $f_2$ boundary with a lower $f_1$ position (higher element sequence number) so it will be assigned the lower boundary sequence number. For identical $f_1$ positions, the $f_1$ boundary with the higher $f_2$ position is ordered before a $f_1$ boundary with a lower $f_2$ position so it will be assigned a lower sequence number. These sort operations are illustrated in FIG. 8E.

Once the sort operations are complete and boundary sequence numbers have been assigned, reference Tables I through IV of FIGS. 12 and 13 may be completed. Of course, it is possible to complete Tables II and IV without using the element sequence numbers presented in Tables I and III, by using the same relationships which determine the element sequence numbers. Similarly, the element sequence number assignments may be made using the properties of previously assigned boundary sequence numbers.

The assigned boundary sequence numbers allow easy and direct determination of the relative position of various elements independent of their nature or type. For example, given an element sequence number, the boundary sequence numbers for its $f_1$ and $f_2$ boundaries may be easily obtained and compared with the boundary sequence numbers assigned to the $f_1$ and $f_2$ boundaries of other elements on this same signal to easily determine if these elements are included or excluded from the give element. If excluded, it can also be easily determined if the excluded element is below or above the given element.

To illustrate, assume that it is given that elements having group sequence numbers E8 and E9 have boundary sequence numbers, F17 and F18 for their respective upper ($f_2$) boundaries and E10 and E15 have boundary sequence number F20 and F19 for their respective lower ($f_1$) boundaries. It can be quickly determined that E8 and E9 are below E10 and E15 since the $f_2$ boundaries are below the $f_1$ boundaries as indicated by their boundary sequence numbers. Further E9 is longer than E8 and E15 is longer than E10 since the longest elements are always distinguished by their higher element sequence numbers. Also since F17 and F18 are in sequence, E8 is included completely within E9. Similarly since F19 and F20 are in sequence, E10 is completely included within E15. Further, it can be easily determined that no part of E9 (or E8) is included in E15 (or E10). The utility of the above system will be appreciated when it is pointed out that the abscissa values for boundary sequence numbers F17, F18, F19 and F20 are identical, as illustrated in Table II. The elements are illustrated in FIG. 10.

Further, given a particular element sequence number, its lower and upper boundary sequence numbers can be easily found to produce a range for boundary sequence numbers. From this range it can be easily determined if any part of any element is excluded (not overlapped) by the boundaries of the particular element. The elements which have any of their boundary sequence numbers within the range of the given boundary sequence number would not be considered. Similarly it can be easily determined if the elements are completely included (overlapped) by a given range of boundary sequence numbers. Only the elements which have all boundary sequence numbers within the range of sequence numbers are included.

The boundary sequence numbers are also useful to easily determine if any given boundary occurs above or below another boundary. In this case if a given boundary has a boundary sequence number F3 which is higher than the sequence number F2 of another boundary, the given boundary must occur at, or above the other boundary. If the given boundary had a sequence number F1, for example, which is lower than the sequence number of another boundary, the given boundary must occur at, or below the other boundary. This determination of relative position is possible in this case even though the abscissa values for boundary sequence numbers F1, F2 and F3 may be exactly the same value. The determination is also easily made without knowing if the boundary is an initial, intermediate or final boundary or without knowing the type of element to which the boundary corresponds. In fact, the use of boundary sequence numbers assigned by the above process allows the use of these boundaries to automatically control both the length of the correlation interval and the search bounds without knowing the nature of the samples which originally defined the abscissa values of the boundaries.

The above information regarding the relative positions of various elements and their boundaries were easily derived using the described system of sequence numbers. However, the same information could also be derived using the actual abscissa values but the analysis is much more complex even when only one curve is involved. When determining relative positions of elements composed of several component elements, to the position of other elements and boundaries and, in particular, when doing so for more than one signal, the described system of using sequence numbers proves to be extremely valuable as compared to a system using abscissa values. One particular area where the sequence number system has a distinct advantage is in the handling of the correlation results, regardless of what type of correlation may be employed. For example, when two points on one signal are found to correspond to two points on another signal but each of the corresponding points indicate a different displacement, the change in displacement must be resolved by adding (stretching) or deleting (shrinking) samples from one of the curves.

In resolving this problem using ordinary methods, there is a risk of changing the nature of sample curves between the two corresponding points by duplicating or deleting certain samples. This change may effect any subsequent results which may use these samples. In particular, any subsequent correlation processes employing short intervals within the longer interval between these corresponding points would be effected. It is these shorter interval correlations which provide the valuable detailed information sought by the geologist. Use of the sequence number system described herein avoids this problem and prevents possible distortion of displacements or correlation quality in subsequent detailed correlation processes.

The correlation process described herein uses boundaries which may be designated by sequence numbers and evaluates possible corresponding elements related to these boundaries. When correspondence is found, the process may then designate corresponding elements by assigning appropriate bounds for corresponding boundaries in terms of these sequence numbers. The actual intervals between the abscissa values for the boundaries may be effectively warped (stretched or compressed) as the correlation process continues from long intervals to short intervals, for example. The warping automatically takes place every time a change is found in the displacement between sets of corresponding points on the correlated curves.

To illustrate, assume that boundary F10 on curve A is found through correlation to correspond to boundary F112 on curve B. If their abscissa values differ by ten samples, it would be assumed that the curves are displaced by ten samples at this point. Then boundary F11 on curve A is found through subsequent correlation to correspond to boundary F113 on curve B. However, their abscissa values now differ in the same direction but now by 12 samples. It still can be assumed that the curves are displaced by 12 samples at this point. However, the interval on curve B between boundaries F112 and F113 has been stretched by two samples relative to the interval on curve A between boundaries F10 and F11.

The sequence number system leaves the exact position of the necessary warping to be later determined by subsequent detailed correlations between the corresponding boundary sequence numbers. The characteristic samples and parameters of form have already been established for the elements between these boundaries. They will not suffer from possible deletion or duplication of samples between these boundaries, as would be the case in prior art methods. After the completion of phase I and the generation of the references illustrated in FIGS. 12 and 13, the initial cross-references between boundaries and elements of two or more curves are generated in the second stage or phase. These cross-references are illustrated in FIGS. 14 and 15, as Tables V and VI. They are illustrated in terms of the boundary and element sequence numbers assigned in the first phase and already discussed. These tables represent the same two curves illustrated in FIGS. 10 and 11 and the boundary and element information derived therefrom. The tables are tabulated in terms of the boundary sequence numbers for a small initial portion of the illustrated curves.

In the initial determination of the upper and lower bounds used in the search for corresponding elements, some estimate must be made for the approximate displacement between the pairs of curves or signals to be correlated. This initial estimate should consider the largest possible displacement between the two signals. The estimated displacement, of course, will depend on the nature of the source of the signals. For example, in dipmeter work the inclination of a hole in combination with a maximum possible inclination of formations would be considered. In such a case a typical estimated displacement may vary up to an interval corresponding to several meters, which may be equal to approximately 200 samples.

The initial displacement assumed in making the illustrated Tables V and VI is 100 samples. Thus the initial upper bound for boundary F1 which has an abscissa value of 0, as illustrated in Table II, is first assumed to be boundary F21 which has an abscissa value of 104, as illustrated in Table IV. Boundary F121 is the first boundary occurring after the 100 sample interval first assumed as the maximum possible displacement. The range for the initial lower bounds illustrated in Table VI is limited by the starting point of the data.

To overcome possible incoherence problems under conditions where the starting or ending points of the data occur, an artificial boundary, here designated F0 for the start of Curve I, may be employed. Further this boundary is regarded as corresponding to all such starting boundaries for other curves, F100 for Curve II, for example. Thus it is by definition of corresponding boundaries that these boundaries are both the upper and lower bounds for one another, as shown in FIGS. 14 and 15. Still further the artificial boundary for the start of a curve always becomes the lower bound for the actual first boundary, and in some cases of the initial reference Min, for many boundaries above the actual first boundary.

A similar boundary with corresponding relationships for upper bounds may be employed at the end of each curve. In the same regard, artificial elements may be employed as occur respectively on the start and end of each curve. These artificial elements are considered to correspond to all types of elements and, as such, become the respective next lowest and next highest element for all the boundaries of the actual first and last element of each type on each curve. Elements E0 and E100 represent the artificial element at the start of Curves I and II respectively.

The artificial elements serve only to terminate each curve with an element which qualifies in all regards to Minax and Majax. In regard to characteristic parameters, artificial elements may be considered as having zero valued characteristics so that in the event they should be considered as a possible corresponding element, they always compare unsatisfactorily.

As previously discussed, these initially assumed upper and lower bounds will be modified upon the finding of corresponding elements or boundaries in the subsequent correlation process. The initial upper and lower search bounds generation is illustrated as Stage two, Block 126 of FIG. 1B. The modification processes are illustrated in Block 144 of Stage three. The generation of the initial upper and lower search bounds is illustrated in more detail in FIG. 8F. The assignment of the Majax and Minax parameters illustrated in Table VI may be accomplished by the process illustrated in FIG. 8G.

Figure 9B:
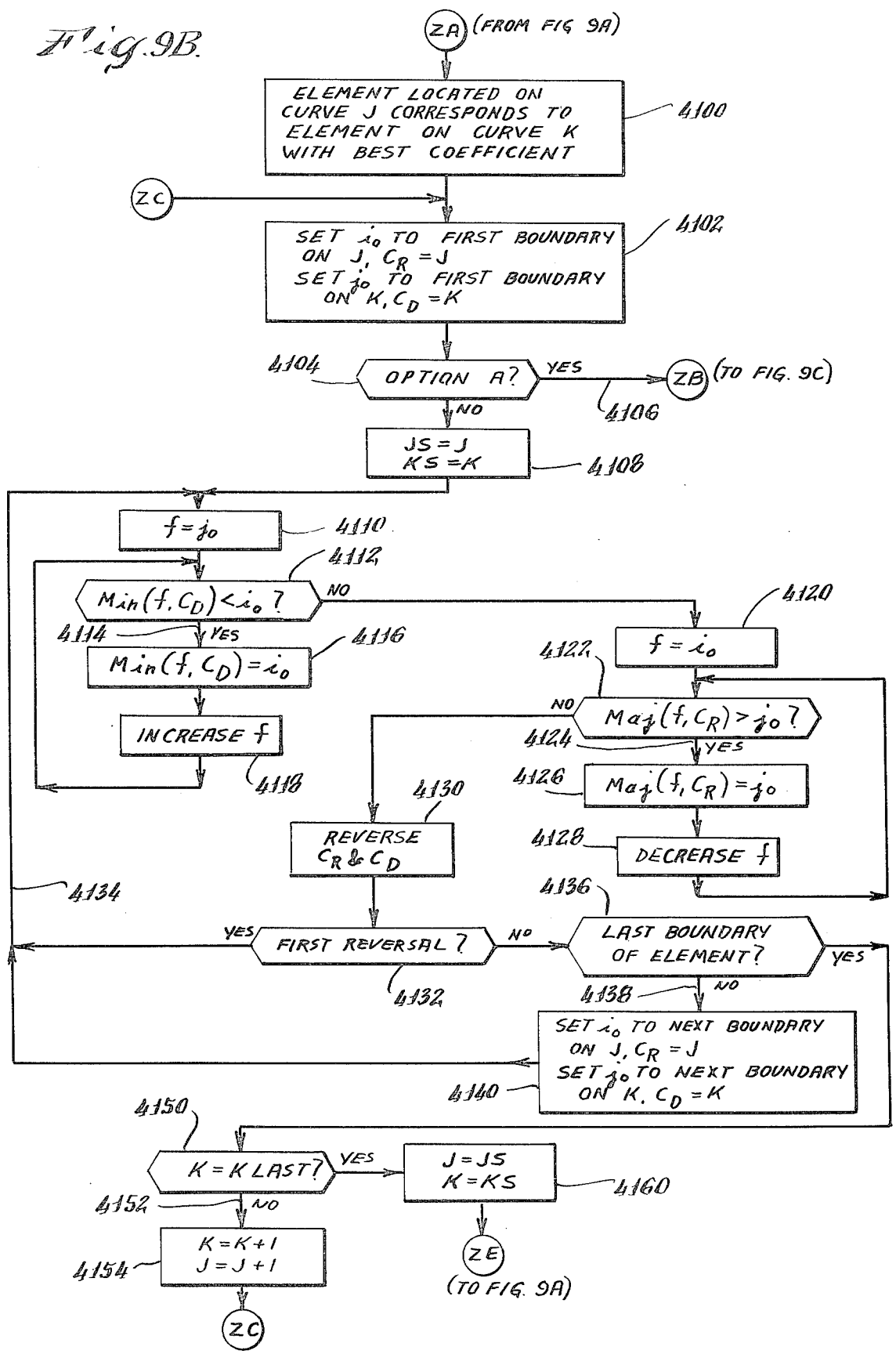
Figure 9C:
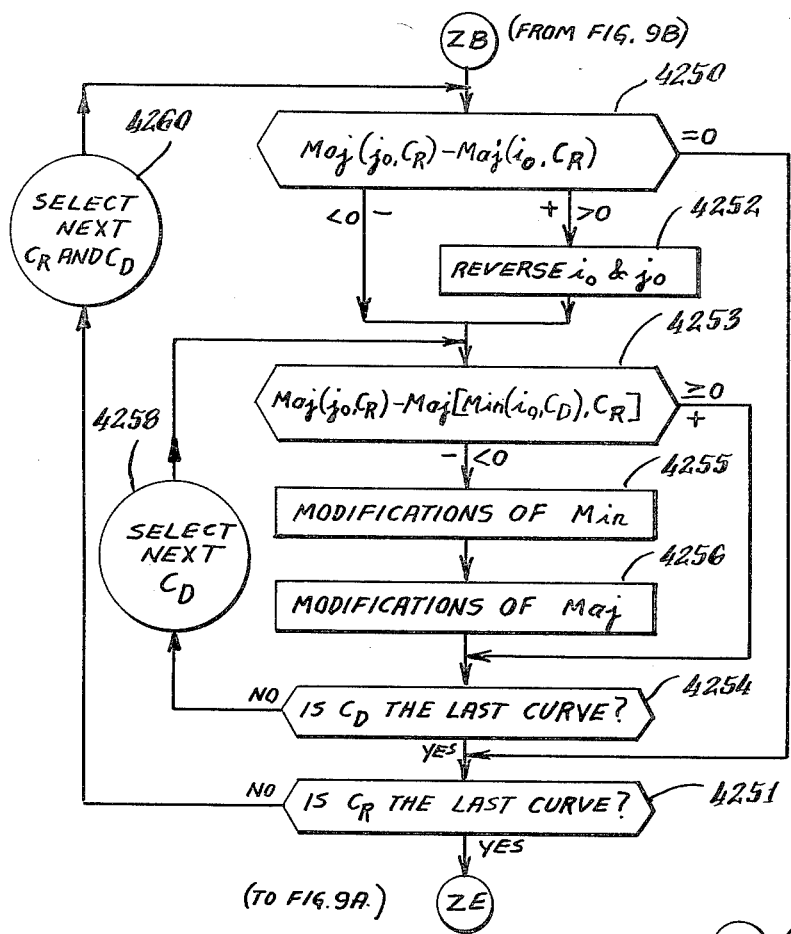

The modification of the initially assumed bounds may be performed by two different methods illustrated in the processes shown in FIGS. 9B and 9C. Before describing the details of the steps, the general philosophy incorporated in the modification of upper and lower bounds will be described in detail.

Figure 18:
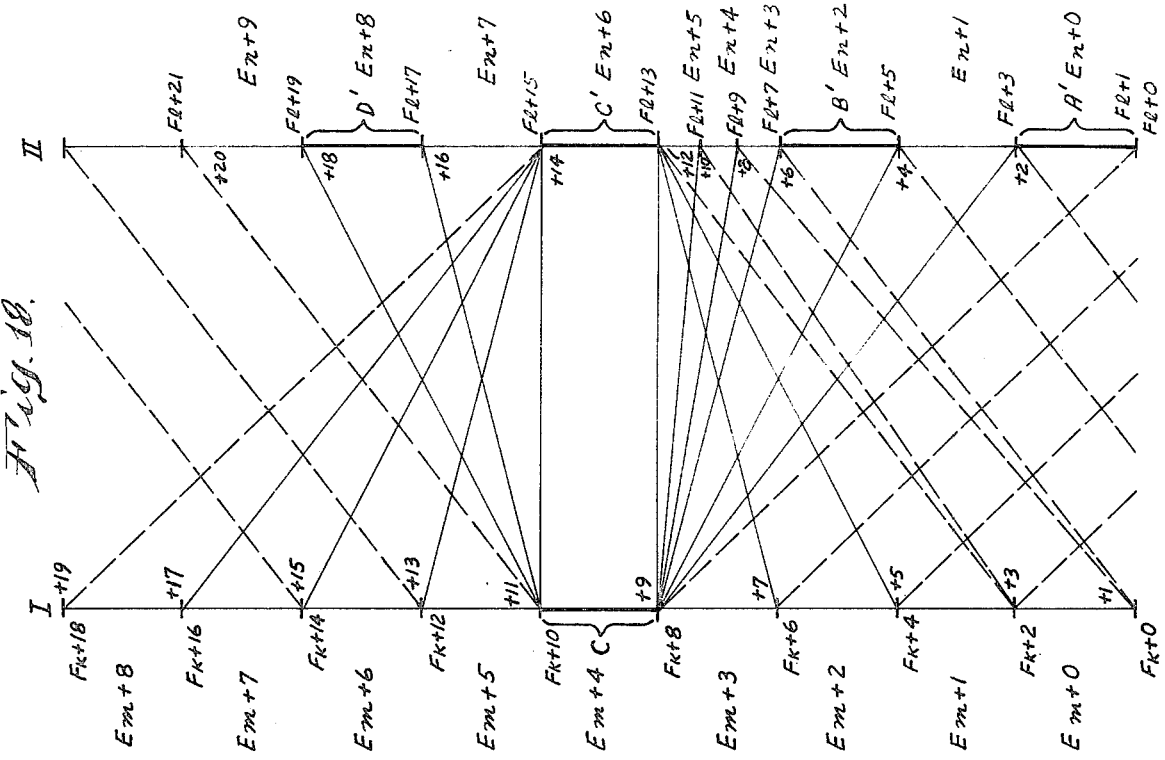
FIG. 18 illustrates a possible result of modifications illustrated in FIGS. 17A through 17D'.
Figure 16:
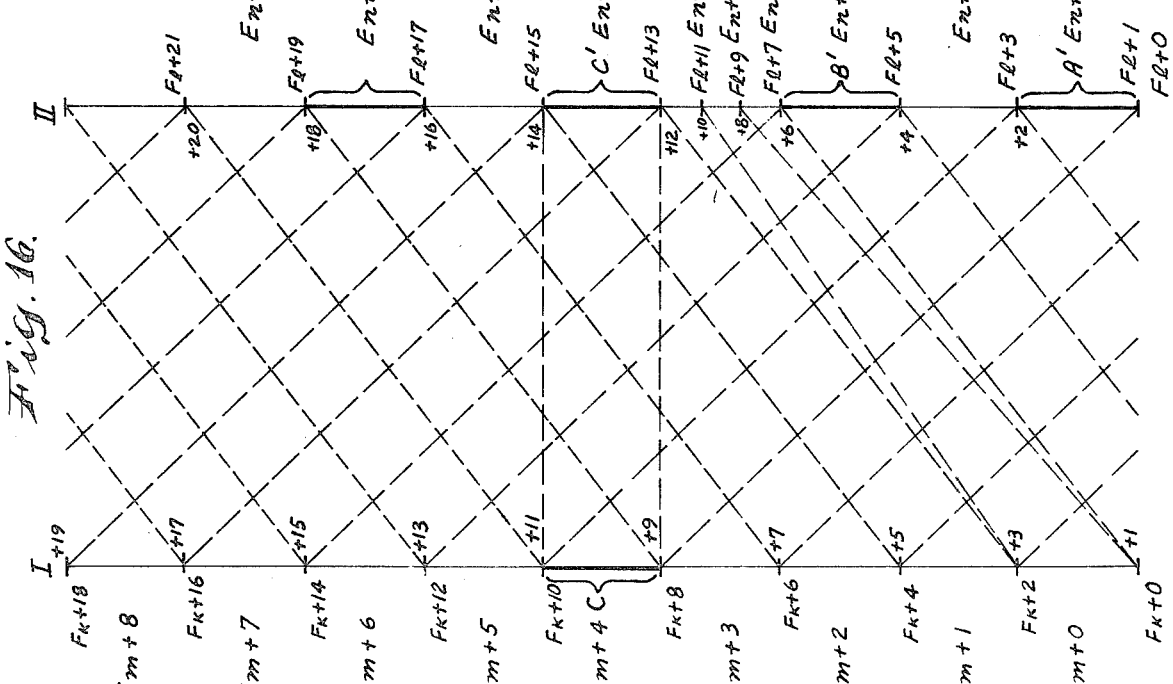
FIG. 16 illustrates upper and lower bounds for boundaries used to guide the search for possible corresponding elements.

The modification of upper and lower bounds are done in accordance with certain procedures to be performed on the occurrence of certain conditions. The actual order of performance may be in any order so long as all of the required conditions are tested for and the indicated steps performed. The modifications consider two curves at a given time, which are designated as a reference curve $C_R$ and a dependent curve $C_D$. These designations may be exchanged during the process. The results of the process are illustrated in FIGS. 16 through 18.

The modifications may be performed according to the following general statements: the lower or upper bounds of boundaries which are located at or respectively above or below a given boundary on $C_R$ whose respective lower or upper bounds are located below or above a counterpart boundary on $C_D$ known to correspond to the given boundary will be moved to this counterpart boundary. More specifically stated for the modification of upper bounds, the upper bounds of boundaries f which are located at or below a given boundary of a given element on a curve $C_R$ whose upper bounds are located above a counterpart boundary of an element on curve $C_D$ known to correspond to the given element will be lowered down to this counterpart boundary. Corresponding processes can be stated for the modification of lower bounds and still more specifically. For both upper and lower bounds of each boundary (upper and lower boundaries, for example) of a given element.

These processes can be stated as variations to a general description by way of inserting certain wording, indicated here by underlined word numbers, in their place which designate the relative positions of bounds and boundaries or directions of adjustments according to a particular step in the process. Here a step in the process will be designated by a line number in a first table and then by a letter in a second table which follows. The line designates which set of numbered words are to be used to complete the wording of the process description. Such tables are useful in designing the logic or program steps necessary to perform complex processes.

The general description of the process, using the accompanying table to supply the numbered words as indicated can be stated as follows:

The Word I bound of boundaries which are located at or Word II bound, the Word III boundary of a given element on a given curve Word IV whose Word I bounds are located Word V, the Word III boundary of an element on a curve Word VI known to correspond to the given element will be Word VII to this Word III boundary.

| Step | Word I | Word II | Word III | Word IV | Word V | Word VI | Word VII |
|------|--------|---------|----------|---------|--------|---------|----------|
| 1 | lower | above | lower | $C_R$ | below | $C_D$ | raised up |
| 2 | upper | below | lower | $C_D$ | above | $C_R$ | lowered down |
| 3 | lower | above | upper | $C_R$ | below | $C_D$ | raised up |
| 4 | upper | below | upper | $C_D$ | above | $C_R$ | lowered down |

By interchanging each designated curve under consideration first as the reference curve $C_R$ and then in turn as the dependent curve $C_D$, a second table can be derived similar to above. In all, eight steps are thus determined for elements having upper and lower boundaries. For purpose of complete illustration, the following table will describe eight such steps illustrating considerations made when modifying the boundaries for two elements located on curve I and curve II previously found to correspond. The table is used in the same manner and with the same process described above.

| Step | Word I | Word II | Word III | Word IV | Word V | Word VI | Word VII |
|------|--------|---------|----------|---------|--------|---------|----------|
| A | lower | above | lower | I | below | II | raised up |
| B | upper | below | lower | II | above | I | lowered downed |
| C | lower | above | lower | II | below | I | raised up down |
| D | upper | below | lower | I | above | II | lowered down |
| A' | lower | above | upper | I | below | II | raised up |
| B' | upper | below | upper | II | above | I | lowered down |
| C' | lower | above | upper | II | below | I | raised up |
| D' | upper | below | upper | I | below | II | lowered down |

Figure 17A:
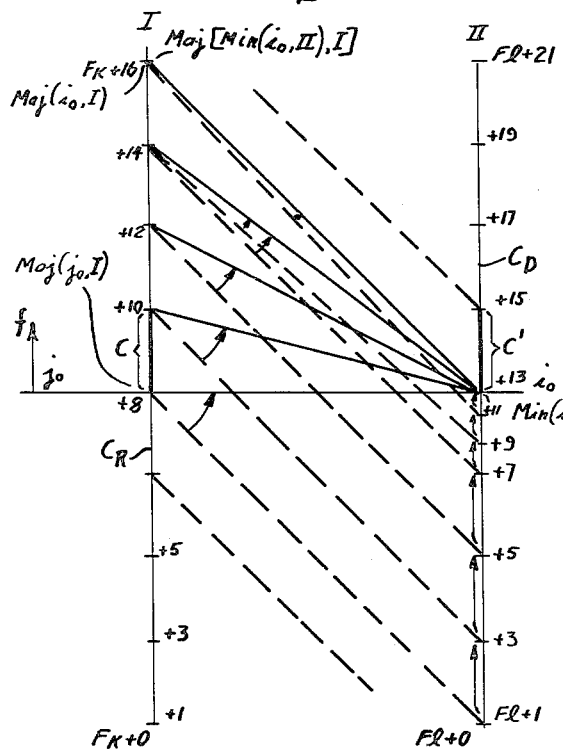
FIGS. 17A through 17D' illustrate steps in the process of modifying upper and lower bounds corresponding to two of the elements illustrated in FIG. 16 which were found to correspond.

These eight steps A through D' described above are illustrated respectively in the eight FIGS. 17A through 17D'. Only the boundaries and bounds involved in each step is illustrated for clarity. For example, FIG. 17A illustrates the process carried out for Step A, FIG. 17B for Step B . . . etc. and FIG. 17D' for Step D'.

FIG. 16 illustrates boundaries $F_{k+0}$ through $F_{k+19}$ on Curve I and boundaries $F_{1+0}$ through $F_{1+21}$ on Curve II. The boundaries on Curve I were determined by elements $E_{m+0}$ through $E_{m+8}$ respectively. The boundaries on Curve II were determined by elements $E_{n+0}$ through elements $E_{n+9}$ respectively.

The search for corresponding elements may begin by the location of an element of a particular type on a reference curve, here Curve I. In the FIGS. 16 through 18, this element is denoted as element C and corresponds to element $E_{m+4}$. The search for corresponding elements on Curve II is limited by the current upper and lower bounds located on Curve II for the boundaries of element C. These provisional bounds are illustrated by dashed lines in FIG. 16 and FIGS. 17A through 17D'. For example, the upper bound for boundary $F_{k+10}$ on Curve I is the boundary $F_{1+21}$ on Curve II.

Four elements of the same type of element as element C are illustrated on Curve II and designated as A', B', C' and D' respectively. The lower boundary of element A' is at, not above, the lower bound for the lower boundary of element C so it is NOT considered as a possible corresponding element to element C. Both the upper and lower boundaries of element B', C', and D' fall within the upper and lower bounds for the corresponding boundaries of element C so these three are considered as possible corresponding elements.

As illustrated in FIG. 16 by additional dashed lines connecting the corresponding boundaries, a subsequent correlation of the possible corresponding elements has determined that elements C and C' on Curve I and Curve II correspond respectively. Thus it is known that the lower boundary of element C corresponds to the lower boundary of element C' and the upper boundary of element C corresponds to the upper boundary of element C'. These boundaries must be modified to become both the upper and lower bounds for these boundaries. In addition the bounds for boundaries above and below these boundaries must also be modified. This may be accomplished in accordance with the modification procedures described herein.

Referring now to FIG. 17A, the lower boundary of element C is designated $j_o$. Curve I is designated $C_R$. Curve II is designated $C_D$. The illustrated modifications in FIG. 17A correspond to the modifications of the lower bounds of boundaries which are located at or above the lower boundary of the element C on the curve designated $C_R$. The lower bounds which are located only below the lower boundary of element C' on curve $C_D$ must be modified to become the lower boundary of the element C'.

One approach to systematically performing these modifications is to start at the boundary designated $j_0$ and proceed upward from $j_0$, each time increasing the position of considered boundary f located on $C_R$. Thus each boundary at and above the lower boundary of element C will be considered in turn, one by one. For each considered boundary on $C_R$, the lower bound is tested as to its relative position to the counterpart boundary located on curve designated as $C_D$ which is known to correspond to boundary $j_0$. This boundary is illustrated in FIG. 17A as the lower boundary of element C' and is designated as $i_0$.

Thus, for example, if the lower bound for boundary $j_0$ is found to be below $i_0$, the lower bound is modified to become $i_0$. In doing so this bound may be regarded as raised up to $i_0$. The modification process is illustrated in FIGS. 17A through 17D' by arrows indicating the direction of movement taken in the modification of the bounds. The solid lines between the boundaries of each curve designate the resulting new bound. For example, the lower bound of boundary $F_{k+8}$ on $C_R$ was first found to be the boundary $F_{1+1}$ on $C_D$. Since this lower bound is below the boundary $i_0$ known to correspond to $j_0$, the lower bound is raised up to $i_0$ by the modification process. When the boundary $F_{k+10}$ is considered, its lower bound was found to be $F_{1+3}$ which is below $i_0$ and accordingly modified. The process continues until at a boundary whose lower bound is equal to or above $i_0$ is found. This boundary is designated as Maj [(Min($i_0$ II), I] in FIG. 17A. As illustrated in the figure, the lower bound for this boundary is found to be $i_0$ which is = to $i_0$ and not below $i_0$, therefore, this lower bound is not modified.

Figure 17B:
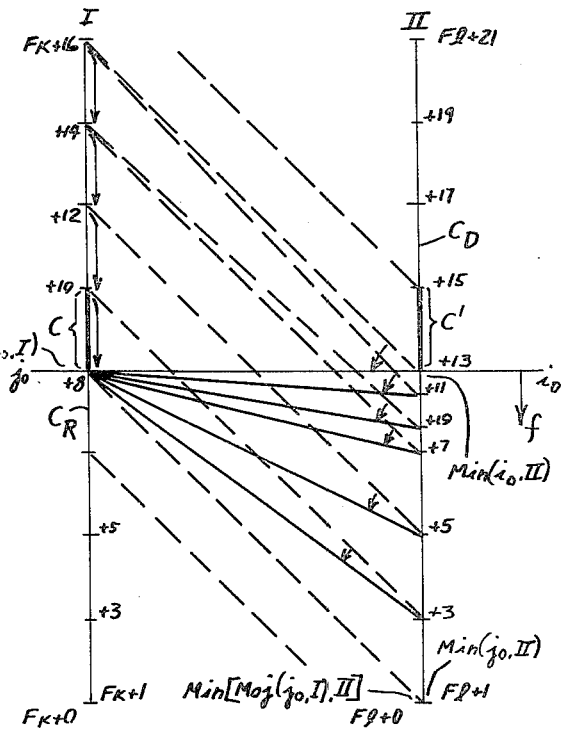

In FIG. 17B, a similar process is illustrated, here considering boundaries on curve II starting at $i_0$ and working downward with decreasing positions of f. For each such boundary, the position of the upper bound is compared with $j_0$. If the upper bound is found above $j_0$, it is modified to become $j_0$ as illustrated by the arrows indicating the direction of modification. This modification process continues until boundary f considered has its upper bound equal to or below $j_0$. This is the boundary designated on FIG. 17B as Min[Maj($j_0$, I), II].

This last considered boundary corresponds to the lower bound on Curve II for the boundary $j_0$. By definition the upper bound for this last considered boundary is also $j_0$ which was known before. Therefore this knowledge could be used to stop the process of decreasing f.

Figure 17C:
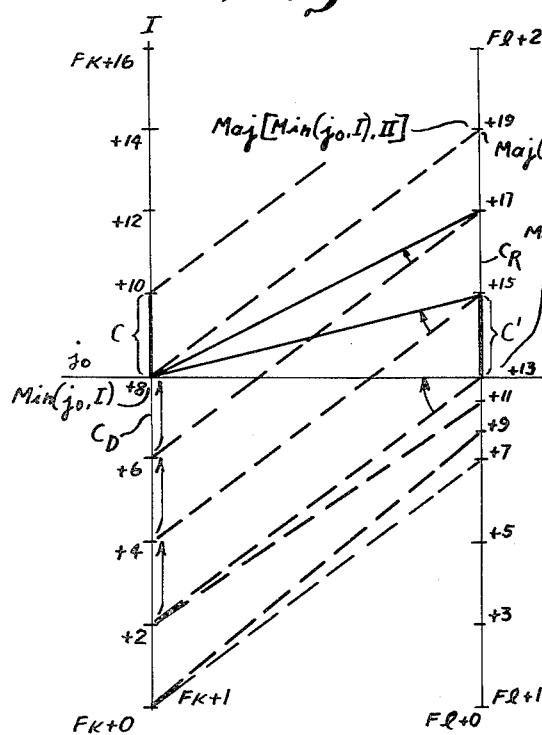
Figure 17D:
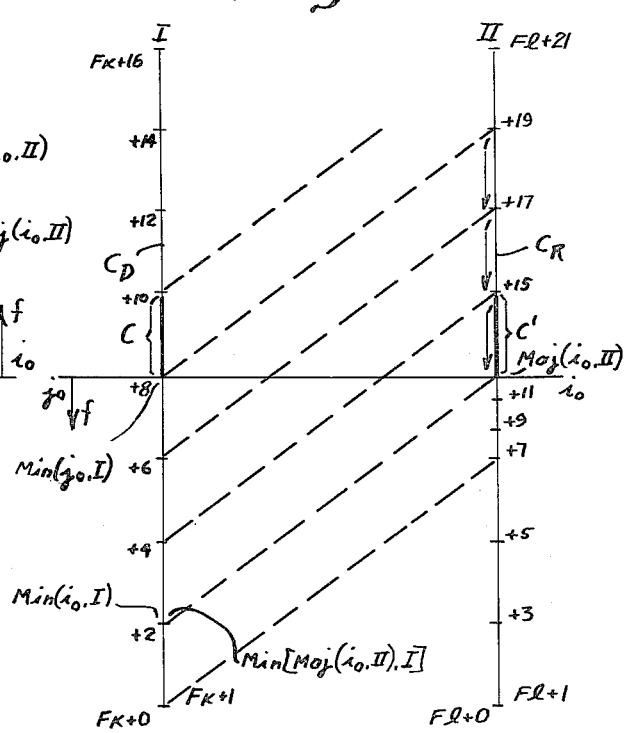

FIGS. 17C and 17D indicate similar processes described in detail as steps C and D of the previous table. They complete the illustration of the modification of upper and lower bounds for the lower boundaries of elements C and C'. In a similar fashion, FIGS. 17A' through D' illustrate the modification of upper and lower bounds for the upper boundaries of the corresponding elements C and C'.

While the above figures illustrate the modifications for boundaries on only two curves, it should be understood that this modification procedure would be applied to all curves considered in the correlation process. For example, in dipmeter correlation three or perhaps four such curves would be considered when two elements are found to correspond.

When elements which have only one boundary are found to correspond, the number of steps in the process is decreased accordingly. In a similar fashion, when elements having more than two boundaries are found to correspond, the process is increased by a corresponding number of steps. For the case of more than two curves, the process is performed by repeatedly interchanging the curves designated as $C_D$ and $C_R$ until all the desired curves have been considered.

Referring now to FIG. 18, there is illustrated for comparison, the new bounds for the boundaries shown in FIG. 16. As a result of the modification process illustrated in the preceding figures, upper and lower bounds for many of the boundaries located on these curves have been modified. The modified bounds are shown as solid lines to contrast with the unmodified bounds which are again shown as dashed lines as was the case in FIG. 16. By comparing FIG. 16 with FIG. 18, a graphic illustration is obtained for the improvement in search bound information provided by the modification steps of this invention which result from the knowledge that element C and C' correspond.

The limits imposed by these bounds in the search for corresponding elements now would clearly prevent considering as possible correspondents any elements located on Curve I above the element C as a possible correspondent for any element located on Curve II below element C'. In fact, the search for possible corresponding elements located on Curve II for any element on Curve I located above the element C is now restricted to elements which are also located above the element C'.

The process graphically illustrated in FIGS. 17A through 17D is described in greater detail in regard to FIG. 9B. A similar process is illustrated in FIG. 9C. This later process will now be described in terms of the definitions and symbols used herein. The determination of the correspondence between two boundaries $i_0$ and $j_0$ leads to a modification of the lower bounds of certain boundaries of a reference curve $C_R$ which are located on a dependent curve $C_D$ and a modification of the upper bounds of certain boundaries of the curve $C_D$ which are located on the curve $C_R$. The boundaries whose bounds are to be modified can be expressed as follows: The modifications are needed only in two cases; The first case can be expressed as;

$$\text{and} \begin{bmatrix} Maj\ (j_o,\ C_R) < Maj\ (i_o,\ C_R) \\ Maj\ (j_o,\ C_R) < Maj\ [Min\ (i_o,\ C_D),\ C_R] \end{bmatrix}.$$

The boundaries f of the curve $C_R$, whose lower bound on $C_D$ Min-(f,$C_D$) is to be modified by the correspondence between the boundaries $i_0$ and $j_0$, are such that:
$$Maj(j_0,C_R) \leq f < Maj[Min(i_0,C_D),C_R].$$

Then, for these boundaries, Min(f, $C_D$) takes on the value of Min($i_0$, $C_D$). See FIGS. 17A and 17A', where $C_R$=Curve I and $C_D$=Curve II. The boundaries f of the curve $C_D$, whose upper bound on $C_R$Maj(f, $C_R$) is to be modified by the correspondence between the boundaries $i_0$ and $j_0$, are such that:

$$\text{Min}[\text{Maj}(j_0,C_R),C_D] < f \leq \text{Min}(i_0,C_D).$$

Then for these boundaries, Maj (f, $C_R$) takes on the value of Maj ($j_0$, $C_R$). See FIGS. 17B and 17B'. The second case can be expressed as;

$$\text{and} \begin{bmatrix} \text{Maj }(i_0, C_R) < \text{Maj }(j_0, C_R) \\ \text{Maj }(i_0, C_R) < \text{Maj }[\text{Min }(j_0, C_D), C_R]. \end{bmatrix}$$

The boundaries f of the curve $C_R$ whose lower bound on $C_D$Min(f,$C_D$) is to be modified by the correspondence between the boundaries $i_0$ and $j_0$, are such that:

$$\text{Maj}(i_0,C_R) \leq f < \text{Maj}[\text{Min}(j_0,C_D),C_R].$$

Then, for these boundaries, Min(f, $C_D$) takes on the value of Min($j_0$, $C_D$). See FIGS. 17C and 17C' where $C_R$=Curve II and $C_D$=Curve I. The boundaries f of the Curve $C_D$, whose upper bound on $C_R$Maj(f, $C_R$) is to be modified by the correspondence between the boundaries $i_0$ and $j_0$ are such that:

$$\text{Min}[\text{Maj}(i_0,C_R),C_D] < f \leq \text{Min}(j_0,C_D).$$

Then for these boundaries, Maj(f, $C_R$) takes on the value of Maj($i_0$, $C_R$). See FIGS. 17D and 17D'.

It can be immediately noted that the two cases considered which are in fact very similar and that it is sufficient to reverse $i_0$ and $j_0$ in one of them to get the other. In all the other cases, no modifications will be required on the upper and lower bounds. In a practical manner, when a correspondence has been extablished between two elements the process will consider each curve successively and, taking the curve as the reference Curve $C_R$, determine for each of the other curves $C_D$ successively taken as curves dependent on $C_R$, which are the boundaries of $C_R$ whose lower bound on $C_D$ must be modified and which are the boundaries of $C_D$ whose upper bound on $C_R$ must be modified. The same process will be carried out for each pair of counterpart boundaries of the two elements, i.e., only once if the two elements have a unique boundary, twice if they have two boundaries and n times if they have n boundaries.

For two corresponding boundaries $i_0$ and $j_0$, the following steps will be repeated for each curve $C_R$. First, compare Maj($J_0$, $C_R$) and Maj($i_0$, $C_R$). If these two references are equal, no modification is required. The process can then proceed to the next curve. If, however, Maj ($j_0$, $C_R$) is higher than Maj ($i_0$, $C_R$), i.e., if the second case is involved, $i_0$ and $J_o$ are reversed so that it becomes the first case, for which Maj ($j_o$, $C_R$) is lower than Maj ($i_o$, $C_R$).

The other curves are then considered. One curve is designated as $C_D$, and the comparison of Maj ($j_0$, $C_R$) and Maj [Min ($i_o$, $C_D$), $C_R$] is made.

If Maj($j_0$, $C_R$) is lower than the reference Maj [Min ($i_o$, $C_D$), $C_R$], modifications are required on the upper and lower bounds.

Thus, the boundaries f of the curve $C_R$ are determined such that:

Maj($j_o$,$C_R$) $\leq$ f < Maj[Min($i_o$,$C_D$), $C_R$]. Their lower bounds on $C_D$, Min (f, $C_D$), are then modified to the value of Min ($i_o$, $C_D$).

Likewise, the boundaries f of the curve $C_D$ are determined such that:

$$\text{Min}[\text{Maj}(j_o,C_R),C_D] < f \leq \text{Min}(i_0,C_D).$$

The upper bounds on $C_R$, Maj (f, $C_R$), are then modified to the value of Maj($j_o$, $C_R$).

When all the curves $C_D$ have thus been treated, the process is repeated for the following curve designated as $C_R$.

In the case of four curves $C_1$, $C_2$, $C_3$ and $C_4$, as in a four-pad dipmeter, for example, the permutation of the reference curves $C_R$ and of the dependent curves $C_D$ may be performed in the following four processes:

1  $C_R$=$C_1$ with $C_D$=$C_2$, then $C_3$, then $C_4$;

2  $C_R$=$C_2$ with $C_D$=$C_1$, then $C_3$, then $C_4$;

3  $C_R$=$C_3$ with $C_D$=$C_1$, then $C_2$, then $C_4$; and

4  $C_R$=$C_4$ with $C_D$=$C_1$, then $C_2$, then $C_3$.

This modification procedure for the upper and lower bounds is illustrated by the diagram of FIG. 9C, the details of which will now be described.

Beginning at Block 4250 the difference:

Maj ($j_o$, $C_R$)-Maj ($i_o$, $C_R$) is computed. If this difference is zero, no modifications are necessary. The test indicated in Block 4250 creates a "O" answer and the process goes directly to Block 4251. If there are more curves to be considered as $C_R$, the process continues to Block 4260 and a new $C_R$ is selected. If appropriate, a new $C_D$ may also be selected. The process begins again at Block 4250. However, if it is determined that $C_R$ is the last curve to be considered, the modification process is complete as indicated by the test shown in Block 4251 answering YES.

If the result of the test indicated in Block 4250 is positive, the process branches to the operation indicated in Block 4252, where $i_o$ and $j_o$ are exchanged or reversed before continuing to Block 4253. If the result of the test is negative, the process go to Block 4253 directly. The operation indicated at block 4253 is the computation and testing of the difference:

Maj($j_o$,$C_R$)−Maj[Min($i_o$,$C_D$),$C_R$].

If the difference is positive or zero, the process branches to Block 4254. The test indicated there is to determine if $C_D$ is the last curve to be considered. If it is, the process goes to Block 4251 which has already been described. If the test indicated in Block 4254 answers NO, a new curve is selected for designation as $C_D$ as indicated in Block 4258. The process beginning at Block 4253 is then repeated.

If the result of the test at Block 4253 is negative, modification of upper and lower bounds are required. The modification of the lower bounds is indicated at Block 4255 and the modification of upper bounds at Block 4256. The process then continues to Block 4254 previously discussed.

It is immediately apparent that this constant transformation of the upper and lower bounds of the boundaries as new corresponding elements are determined involves a constant adjustment of the search intervals determined by the upper and lower bounds. With each modification there is a gradual closing of the search interval, making it possible to reduce the search for corresponding elements, comparisons, tests and the corresponding risks of error.

When the end of the modification process is reached, the correspondences between elements established throughout the correlation process are incorporated into the cross-reference tables of upper bounds are lower bounds. This occurs when both the upper bound and the lower bounds of each of the two boundaries on the curve of the other boundary is the corresponding boundary.

To obtain the results of the correlation process from these references, i.e., the corresponding boundaries, a successive review of the boundaries f of each curve $C_R$ may be performed and, for each curve $C_D$ different from $C_R$, a check is made to see if the following equality exists: Maj (f, $C_D$)=Min (f, $C_D$). In other words, are the upper and lower bounds of f on $C_D$ the same boundary? If this equality exists, the boundary f of $C_R$ corresponds to the boundary f' of $C_D$, so that that same boundary is $$f' = \text{Maj}(f, C_D) = \text{Min}(f, C_D).$$

The results obtained can then be processed by any of several known methods in order to obtain the values of displacements, dip, velocity and so forth which are related to the established correspondences.

The main advantages of the process just described can be summarized as follows: The correspondences established are not between intervals of the same length divided arbitrarily, but between intervals whose ends are naturally determined by the form of the curve. In other words, the detection process isolates a characteristic element whose form is defined by a network of characteristic parameters. The search for possible correspondence is refined by search bounds terminated by the naturally determined ends. Further, the search looks for an element which exhibits characteristic parameters as similar as possible. However, this similarity does not require the elements to be of equal length.

This search for similarity between elements represents a considerable gain in effectiveness because:

1, the density of the results are related to the number of characteristic elements contained in the curves and, consequently, to the activity of these curves;

2, the probabilities of error are much smaller because there is little danger of considering sections of curves cut up in an arbitrary manner;

3, correspondences can be established in transition zones where the offset from curve to curve is not constant, even if this offset changes rapidly;

4, the establishment of correspondences is not hindered by the disappearance of certain elements on one or more of the curves;

5, correlations are NOT obtained at any cost because no correspondences are determined in cases where the reliability of such correlations appears doubtful.

The search for the correspondent of an element is carried out only on a limited number of possible correspondence, i.e., elements of the same type which must be located within an interval determined in a "rational" manner. Elements located outside of this interval are eliminated from the search by previously established correlations. Consequently, as the search progresses, the number of possible correspondents gradually decreases. This results in a significant gain in processing time because the number of tests is reduced as the number of established correlation is increased. Also, a gain in reliability results since the imposed limits constitute virtual protective barriers eliminating the possible physical absurdities which could result from miscorrelations, i.e., correspondences between elements separated by a correspondent already established. Further, the search for correspondences between elements no longer considers an element whose correspondent has already been found.

It should also be noted that by beginning the search with the most reliable correlation types of elements, i.e., those for which the risks of errors are smallest, and ending with the less reliable types, i.e., those for which the risks of errors are greatest, it is possible for the last searches to benefit from the protective barriers established from the first, i.e., to considerably reduce the risks of erroneous correlations from the elements of lesser reliability.

As applied to the field of geology and more particularly to dipmeter surveying, the advantages of the methods disclosed herein over prior art methods can be summarized as follows:

1, improved density of results;

2, obtaining dips for the fine structures of geological formations;

3, better detection of dip variations within short intervals;

4, better delineation of transition zones, such as those associated with faults, unconformities, and so forth;

5, detection of disappearance of formation features;

6, reduced risk of miscorrelations; and 7, detection of zones in which a formation has no variation upon which to define its dip, i.e., formations which have no internal structures.

While it is recognized that the invention may be performed on special hardware designed specifically for this purpose and permanently programmed to perform the steps described herein, such as is illustrated in FIG. 1A, the preferred method of practising the invention is with a general purpose digital computer system, in particular those systems designed for general purpose scientific work. Such a computer system would require input facilities to read the sampled signals or curves to be correlated along with the control functions and parameters necessary to control the processes within the system in a manner to perform the invention by the method described herein.

The control parameters for such systems typically take the form of instructions generated from diagrams such as FIGS. 8A through 8G and 9A through 9D. Programmers of ordinary skill using higher level languages such as Fortran utilize such diagrams along with the description contained herein to construct such control sequences which enable the implementation of a method within a general purpose digital computer system. A detail description of the diagrams and the steps they illustrate follows.

Figure 8A:
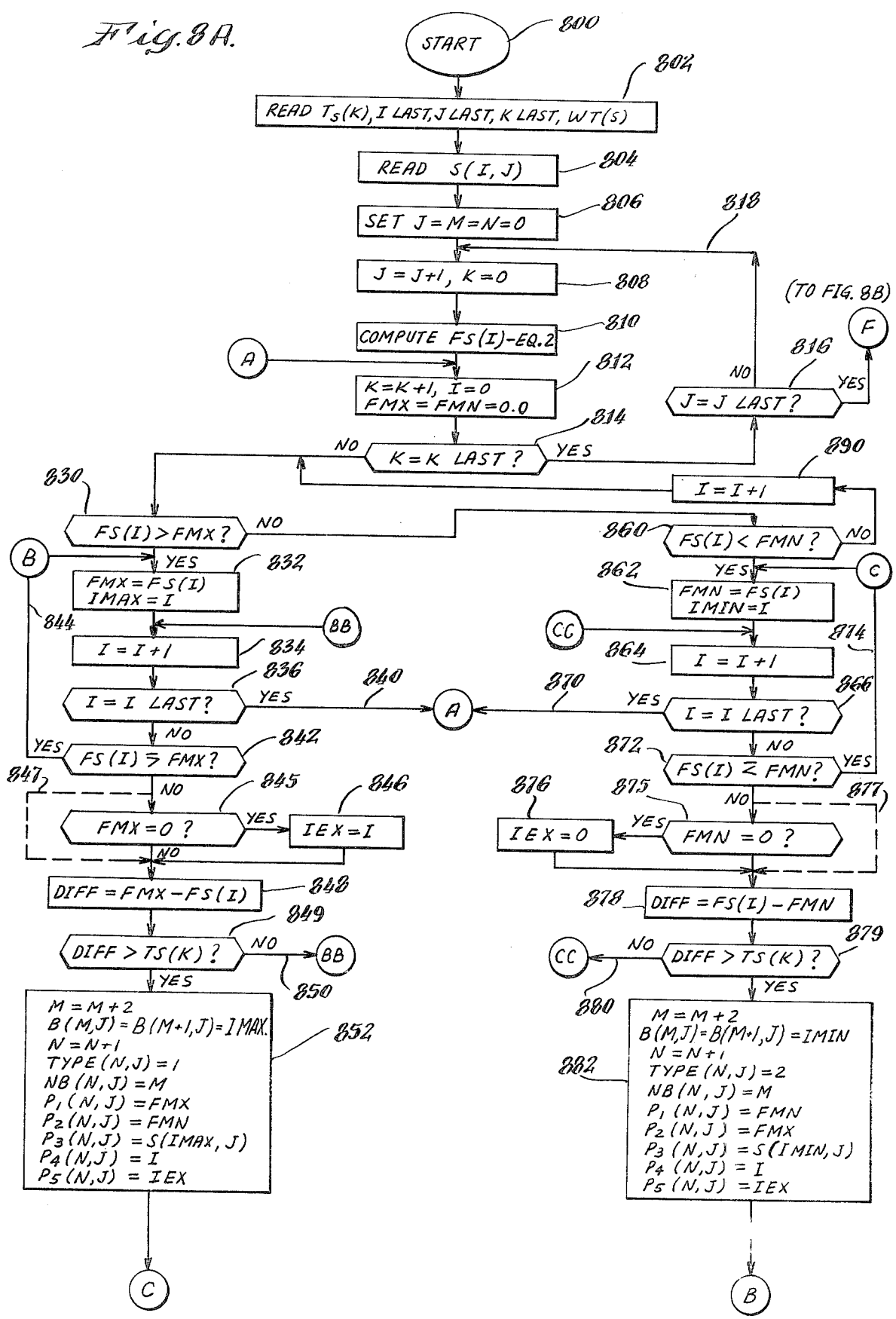
Figure 8B:
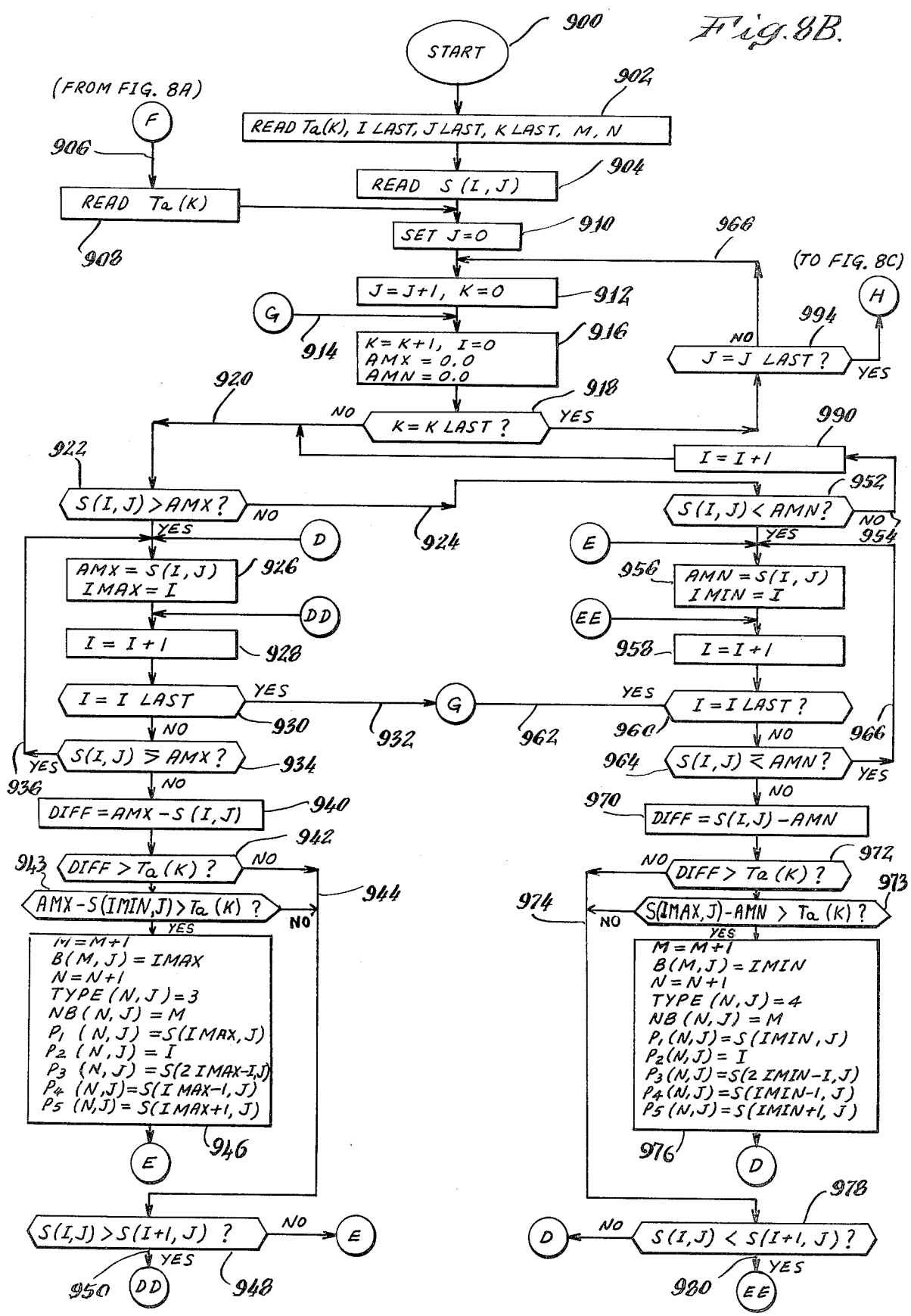

Referring now to FIG. 8A, there is shown the general steps necessary in the process of detecting various sizes of elements of a type known as bumps and depressions. Block 800 designates the start of the procedure. This step includes the preparation of the computer and the details of control sequence generation and loading such that the process may be performed automatically without human intervention thereafter. Block 802 represents the possibility of reading preselected parameters into the system from conventional input devices such as card readers, tape transports and the like. Illustrated inputs are K values of the slope function threshold Ts, a last sample designation ILAST, a last signal designation JLAST, a last threshold designation K and optionally weights WT(S) to be employed in the calculation of a slope function.

The next step in the operation may be, as indicated in Block 804, the reading of the signal samples S(I,J). Each signal shall be considered to be of I samples and there are J such signals. As previously described, these samples are typically derived from signals previously derived from devices such as seismic geophone arrays, borehole devices or from biomedical applications, for example. The signals are typically recorded as discrete samples, usually in digital representation, on magnetic tape or other media compatible with computer input.

The next step in the process may be as indicated in Block 806 where the counters J, M and N are initialized to a value here given as zero. In the initial processing the next step would be as indicated in Block 808, but thereafter the process may be reentered at this point as indicated by Branch 818, as one result of the test indicated in Block 816. In any case, Block 808 illustrates the incrementing of a signal designator J by 1 and the simultaneous initialization of a threshold designator K. K designates which threshold Ts(K) is currently being considered to determine the size of the element being sought in the signal analysis process which follows.

Block 810 illustrates the computation of the slope function herein designated as FS(I). The computation equation may be Equation (2) described herein or optionally Equation (3) when a more general approach is desired. Equation (3) uses the weights WT(S) provided as input. The slope function values FS(I) may be computed for all I samples of signal J at this time or any other time before these values are needed in the subsequent process.

NEXT as in Block 812, the initialization required to start the search for bumps and depressions of a size significant compared to each of the thresholds Ts(K) is indicated. Each time this operation is performed, K is incremented from its original value by 1. Further, the sample designator I is initialized to one to designate the initial sample. In addition, two parameters used for the storage of the maximum FMX and minimum FMN value for the extrema of the slope function are set to zero.

The next step in the process is the test indicated in Block 814 which determines if the last of the K thresholds has been considered. If at least one threshold remains, the test answers NO and the process continues as indicated in Block 830. In this block the value of the slope function FS at sample I is compared to the stored value FMX of its previous maximum. For the initial sample FMX has been set equal to zero, so this test determines whether the first possible element will be a bump or a depression. If the signal J is as illustrated in FIG. 2A, the slope function may be regarded as the function Y' illustrated in FIG. 2B which is increasing at sample zero. Thus, in such cases, the test indicated at Block 830, answers YES. However, a decreasing slope at this point would cause the test to answer NO and would indicate that the first element to be detected might possibly be a depression. In such a case the process branches the righthand part of FIG. 8A which is characteristic of the analysis for depressions.

If the situation illustrated in the initial part of FIG. 2A occurs, the test at Block 830 answers YES and the analysis for the detection of a bump commences at Block 832. As indicated in Block 832, the current value of the slope FS(I) is stored in FMX and the sample position of this slope is stored in a value called herein IMAX. The sample designator I is then incremented by 1, as indicated in Block 834 and tested to see if I could possibly be the last sample as indicated in Block 836. If so, this test answers YES and the analysis exits by Branch 840 to restart with possibly a new threshold or curve by reentering as indicated at Point A in FIG. 8A. If, however, I is not the last sample, the test in Block 836 answers NO and the process continues as indicated to Block 842.

Since I has been incremented as indicated in Block 834, the test in Block 842 tests the next value of the slope function and which determines if the slope is further increasing or remaining on the same level as the last maximum FMX. If such is the case, the test answers YES and the process returns as indicated by Branch 844 to the previously discussed Block 832. This process of testing the slope of successive samples continues until the value of the slope no longer equals or exceeds the continuously updated maximum value FMX and at that point the test in Block 842 answers NO. The process then continues to Block 845.

In Block 845 is illustrated an optional feature for the search for values of the slope function equal to zero. Such zero values are characteristic of maxima and minima points of the signal amplitudes from which they were computed. If such extrema of the signal amplitude are indicated, the test answers YES and the position of this outstanding sample is stored in the parameter designated IEX, as indicated in Block 846. Thereafter the process continues to Block 848, as would be the case if the test in Block 845 answered NO, or if this optional feature was not present and the process continued as indicated by optional Branch 847.

In block 848, there is indicated the convenient computation of the difference between the last occurring maximum of the slope function FMX and the current value FS(I). This difference represents the amount by which the slope function has decreased from the last maximum of slope to the current sample and is useful in comparing with the current threshold Ts (K). This comparison is indicated in the next test designated as Block 849. This test will answer NO until the slope function has decreased from FMX by an amount greater than the threshold. Until then the process continues, as indicated by Branch 850 to Point BB at Block 834. I is incremented and the search continues for a slope function value differing from the last maxima by an amount greater than Ts(K). When this value is found, the test in Block 849 answers YES and the initial boundary of a bump significant in size compared to Ts(K) has been detected. The process then proceeds to Block 852.

Block 852 represents the recording of the position of the detected boundary and its number M in the sequence of occurrence of boundaries. M was initially set to zero and since bumps and depressions have two boundaries, the boundary number M is incremented in this case by two, which also illustrates the fact that the detected boundary position may be used not only as the initial boundary of a bump which follows but possibly as a final boundary of a depression which may have been previously detected. Therefore the position of the boundary which has been stored as IMAX is recorded both as the boundary B(M,J) and as the boundary occurring next in sequence after the boundary M, here designated as M+1. This operation further illustrates that two or more boundaries may have the same abscissa value. Two such boundaries would be the final boundary of a previously detected element and the initial boundary of an element which follows. An element number N is incremented by I and a code designating the type of element detected is recorded in a location here labeled TYPE (N,J). In this case the element is known to be a bump of the size significant compared to Ts(K) and may be coded as Type 1, for example. A cross-reference may be generated at this time which relates the recording location of the boundary, as indicated by M, to the recording location of the Nth element on curve J, here designated as NB(N,J).

Characteristic parameters, here designated P1, P2, P3, etc. may also be recorded at this time as indicated in Block 852. These parameters may be assigned to the Nth element which, of course, in the case of the first boundary, may relate to a first occurring element which did not exist. However, thereafter the parameters may be related to the proper elements through the use of the element number N and the knowledge that the detection of a bump of a given size necessarily is followed by the detection of a depression of the same size. The characteristic parameters indicated in Block 852 in their illustrated order are the value of the slope function at the last occurring maximum and minimum as stored in FMX and FMN respectively, the value of the signal amplitude at position of the last occurring maximum of the slope, the sample I at which the slope first exceeded FMX by Ts(K) and the sample IEX which corresponds to the position of the extrema of the amplitude for the signal. Further characteristic parameters may be recorded which are not illustrated in Block 852 but described herein or which are obvious to those of ordinary skill.

Additional characteristic parameters may be computed from the parameters already recorded. For instance, the difference in amplitude between the signal at IMAX and IEX would indicate the sharpness of the boundary and the number of samples between I and IMAX would indicate the distance b, in the case of an initial boundary of the bump or b′ in the case of a depression as shown in FIG. 2B which may be used to characterize the nature of the transition between a bump and a depression. Further, characteristic parameters recorded at subsequent boundaries as indicated in Block 882 may be used in combination with the parameters recorded as indicated in Block 852 to compute further parameters.

After completion of the determination and recording of the characteristic parameters, the process continues to Point C and then to Block 862 where current slope function value is stored as FMN for use in the search for the final boundary of the bump and the initial boundary of a depression.

Block 860 of FIG. 8A corresponds to the search for the initial boundary for the first occurring depression, if no bump preceded this sample. In such a case, FMN would be at its initial value zero. If a depression was the first element to occur, the test would answer YES and the process would continue at Block 862, otherwise the process answers NO and I is then incremented as indicated by Block 890. If it should occur that the slope of the signal in its initial portion was zero, the process would continue between Blocks 830 and 860 until a value of the slope function other than zero was found. If the first non-zero slope value was less than zero, the test in Block 860 answers YES and the process continues to Block 862.

The process which follows, as indicated in Block 862 through 882, corresponds to the search for the final boundary of the bump or the initial boundary of the depression. Here comparable relationships to the minimum value of the slope function, as was previously described in regard to the corresponding Block 832 through 852 for the maximum value, is considered in the process. Therefore, the details of these steps will not be repeated having been sufficiently described previously.

In the search for either bumps or depressions, the possibility of encountering the last sample of the given signal ILAST may occur. In such a case, the test indicated by Blocks 836 or 866 will answer YES and the process will branch to point A and then to Block 812 where as indicated, a new threshold is assigned and the process of searching for boundaries of elements considered significant in size to this threshold follows. This process continues the search for boundaries of elements in the order of the size of the given thresholds until all such thresholds have been cnsidered, as indicated by the test in Block 814 answering YES. In such a case the test indicated in Block 816 follows which determines if the last curve has been processed. If the current Curve J does not correspond to the last curve, designated as JLAST, this test answers NO and a new curve is selected by the process which follows Branch 818. However, if the last curve has been processed, the search for bumps and depressions of various sizes is complete and the process exits, as indicated by the test in Block 816 answering YES. The next process begins at Point F in FIG. 8B.

Having now considered the detailed steps which may be used to detect bumps and depressions of various sizes, refer to FIGS. 2A and 2B wherein examples of the results of this process may be illustrated. Assume that the current value for the threshold Ts is 17 units and the last detected maximum of the slope occurred at IMAX=$i_M$ indicated on FIG. 2B. As the search on the slope function illustrated in FIG. 2B proceeds to the right, successive samples are compared to the last maximum of this function FMX found at Point 20 in FIG. 8A. This continues until the difference in the slope function amplitude from FMX, exceeds the threshold indicated as Ts=17 in FIG. 2B. This would occur at sample $i_{m+b}$.

At this point the test in Block 849 of FIG. 8A would answer YES and the detection of the boundary located at point 20 would be recorded. The value of the slope function at $i_{M+b}$ would then be taken as a provisional minimum slope value and the search for the actual minimum of the slope function started. Comparison of subsequent slope samples with this provisional minimum would continue with the updating of the provisional minimum until the true minimum at Point 21 is found.

The detection of a true extremum actually occurs at the sample immediately thereafter when it is found that this sample differs from the last extremum in a new direction. In the case of the search of a minimum of the slope function, this new direction is an increase as indicated in Block 872. In the case of the search for a maximum of the slope function, this new direction is a decrease as indicated in Block 842.

In either case, the test indicated in these respective blocks answers NO and the process of comparing subsequent slope samples with the detected extremum begins. This process continues until the subsequent slope samples differ from the previous extrema value by more than the current threshold, as would be the case indicated by sample i in FIG. 2B. At this time it would be concluded that Point 21° corresponded to a minimum of slope, significant compared with Ts=17 and that this point corresponded to the final boundary of the previous bump and the initial boundary of a depression which follows. The position of the Points 21 and 20 are both known as IMAX and IMIN so characteristic parameters of form can now be derived for the element now known to occur between these two boundaries.

If preferred, the determination of characteristic parameters can occur later in the process. For example, the determination of characteristic parameters of form might be done after all boundaries have been detected and sorted as to their significance in size as compared with various thresholds. The initial and final boundaries of each element would then be known and additional characteristic parameters such as the average values of the signals between these points might be obtained. Further, the characteristic parameters for a given type of element might be varied according to the size and interval between its boundaries.

Referring back to FIG. 2B, Points 22 and 23 illustrate respective maximum and minimum of slope function which failed to exceed a threshold Ts=3. At sample $i_3$, as shown in Block 872, the threshold for Ts=18 is exceeded and Point 21 concluded to correspond to a minimum of slope significant compared to Ts=18. A search is started at B' for a maximum would follow with the subsequent determination at sample $i_4$ that the slope function was decreasing. Thus, as indicated in Block 832, the value of the slope function at $i_3$ would have been retained as the maximum value FMX and corresponding to the fact that Point 22 does represent the current maximum of slope. The search continues until at sample $i_6$, a value for the slope function greater than the last maximum corresponding to $i_3$ would be found as indicated in Block 842 without exceeding even the smallest threshold. The value is then assigned as a new maximum FMX as indicated in Block 832. In such cases where new extrema of slope are detected which vary less than the smallest threshold they will not be retained as either a maximum or minimum of slope which would otherwise define a boundary. The search continues looking for a maximum of slope which is found at Point 24.

A similar situation occurs at Points 25 and 26 of FIG. 2B. However, here the difference in the slope function amplitude between Point 25 and Sample $i_{17}$ is found to exceed the threshold for Ts=3 and Point 25 therefore would be recognized as a boundary significant in size compared to Ts=3. In a similar manner, Sample $i_{20}$ determines that Point 26 also exceeds the threshold Ts=3 and both points are taken as boundaries significant compared Ts=3. However, when Ts is increased in value to Ts=7, for example, these points will be processed in the same manner as Points 22 and 23 because they will not exceed the threshold for Ts=7. Thus Points 25 and 26 are uniquely defined as significant only to Ts=3.

An alternate approach to sizing boundaries as significant compared to a threshold would be to detect an extrema of the slope function without the use of any threshold, or perhaps only the smallest threshold. Then, knowing the position of the extrema, examine the slope function before and after the extrema until a sample was found which exceeded the desired threshold. This process can be illustrated, for example, by the position designated at $i_M$ which is known to correspond to an extremum of the slope function.

A search conducted over the two intervals a and b determined as previously described, would find samples of the slope function which differs from its value at $i_M$ by more than the thresholds of Ts=3, 7 and 18, for example. Thus Point 20 would be defined as a boundary significant in size compared to Ts=18. In a similar manner, a search conducted over the intervals a' and b' about the position designated as $i_m$ which is known to correspond to an extremum of slope would find samples of the slope function which differ the slope function at $i_m$ by more than the threshold for Ts=3, 7 and 18. Thus Point 21 would be defined as a boundary significant in size compared to Ts=18.

In all cases, the intervals a and b and a' and b' respectively, must also be examined for extrema of the slope function more extreme than the maximum or minimum corresponding to $i_M$ and $i_m$. If an extremum more extreme than the considered extremum occurred within the intervals necessary to exceed a given threshold, the point would not be considered as a boundary significant compared to that threshold.

Using the illustrated thresholds of Ts(1,)=3, Ts(2)=7 Ts(3)=18 for detecting respectively small, medium and large elements, as illustrated in FIG. 2B, Points 20 through 29 are found to correspond to the extrema of the slope function. However, Points 22 and 23 are not found to be significant compared with Ts=3. Points 25 and 26 are found to be respective minima and maxima significant only to Ts=3. Points 27 and 28 are found to be respective minima and maxima significant compared to Ts=3 and Ts=7. Points 20 and 24 and Points 21 and 29 are found to be respective maxima and minima significant compared with Ts=3, 7 and 18.

Thus points 25 and 26 define the respective initial and final boundaries of a small depression indicated in FIG. 2A by interval 8 and Points 24 and 25 the respective initial and final boundaries of a small bump indicated in interval 7. Points 26 and 27 are similarly regarded for the small bump indicated in interval 9, Points 27 and 28 for the medium depression in interval 5, Points 28 and 29 for the medium bump interval 6, Points 24 and 29 for the large bump in interval 3, Points 21 and 24 for the large depression in interval 2, Points 20 and 21 for the large bump in interval 1.

Referring now to 8B, there is illustrated the steps of the process which may be used to detect elements of a type known as peaks, more particularly peak-bumps and peak-depressions, on a sampled signal or curve to be analyzed. Block 900 indicates the start of the process which may be performed before, after or separately from the process illustrated in FIGS. 8A and 8C. If performed separately, this process would include the preparation of a general-purpose computer with process controls as necessary to perform the process described herein. Thereafter, as indicated in Block 902, additional predetermined controls necessary to specify the details of the process may be read from any conventional input unit such as a card reader, for example. The indicated controls are: K values of the threshold Ta used in testing amplitudes and the last sample, signal and threshold designations, which are ILAST, JLAST AND KLAST, respectively. Also input are M and N which are the initial numbers which are to be used, respectively to count detected boundaries and elements.

The signals S(I,J) are then read, if not already read, as indicated in Block 904. As previously discussed, there may be J such signals to be analyzed, each composed of as many as I samples. If the peak detection process is performed along with the bump and depression detection process described in FIG. 8A, only the thresholds Ta need be read as indicated in Block 908, the process continuing at Point F from FIG. 8A. With the exception of the previously discussed thresholds, the values read in Block 902 and 904 would be retained from the previous process in such a case.

In either case the process continues, as indicated in Block 910 by initializing the signal designator J to zero. J is then incremented by one each time a new signal is to be analyzed, as indicated in Block 912. The threshold designator K may be initialized to zero at this time. In Block 916 which follows, K is incremented by one and the sample designator I is set to zero indicating the first sample. In addition, the amplitude maximum and minimum storage parameters AMX and AMN, respectively are initialized to zero. Thus the above mentioned steps serve to select a curve J, then select a threshold K and initialize the search for a maximum or minimum of amplitude on curve J to be compared with Ta(K).

In Block 918, a test is made to see if K corresponds to the last threshold. If not, the process proceeds through Branch 920 to Block 922 where sample I on signal J is checked to see if it exceeds the last previous maximum for amplitude AMX. This would be the case if the first sample of the signal was greater than zero. However, if as illustrated in FIG. 4, the first samples decline in value rather than increase in value, the test in Block 922 would answer NO and the process would proceed through Branch 924 to Block 952 and the process thereafter which is designed to detect minima of signal amplitude. This latter process will be discussed later.

In the case where the signal amplitude exceeds the previous maximum AMX, the test indicated in Block 922 answers YES, and the search designed to detect maxima of signal amplitude begins as indicated in Block 926. There the current signal amplitude is stored as a new maximum AMX and the position of this sample retained as IMAX. I is then incremented by one, as indicated in Block 928 and tested against the last sample value ILAST, as indicated in Block 930. If I was the last sample, this test would answer YES, and the process continues through Branch 932 to Point G which restarts the process with the same curve but with a new threshold. In most cases the test indicated in Block 930 answers NO and the process continues to Block 934 where the next sample is checked against the old maximum AMX. As long as this and subsequent samples exceed the previous maximum AMX, this test answers YES and another sample is considered and similarly tested as indicated by Branch 936 until the test indicated in Block 934 answers NO.

At this point the signal amplitude has been found to begin a decline in value. It is convenient to calculate the difference between the current signal amplitude value and the last maximum AMX, as indicated in Block 940. This difference is then tested to see if it exceeds the current threshold Ta(K). If it does, the test indicated in Block 942 answers YES and the process continues to the test indicated in Block 943. This test serves to check the preceeding side of an extrema for the same requirements as tested for on the following side in the combined Blocks 936 and 940. Since the sample corresponding to the last preceeding minimum is stored at IMIN, the amplitude at this point S(IMIN, J) may also be subtracted from AMX and compared with Ta(K). If both of the tests indicated in Blocks 942 and 943 answer YES, the process continues to Block 946 which represents the calculation of characteristic parameters for the maximum of the signal amplitude which has been detected at IMAX and which has a value AMX.

As indicated in Block 946, the boundary number M is incremented by one, the position of the boundary IMAX is recorded as boundary M on signal J, B(M,J). Since peaks are regarded as having only one boundary, the boundary number is indicated to be incremented by 1. The element number N is also incremented by 1, as illustrated and the type for element N located on curve J is recorded as a numerical code 3 indicating in this case a peak-bump has been detected. The boundary number is also recorded as a cross-reference as NB(N,J).

Characteristic parameters P1 through P5 may be recorded at this time. In the order illustrated, they are the amplitude at the peak position IMAX, the sample I which first exceeded the threshold (from which the amplitude of the corresponding sample may be retrieved as well as the number of samples between IMAX and I, both of which may be used as further characteristic parameters), the amplitude at the sample designated as (2 IMAX-I) which is a sample on the rising portion of the peak which compares with the sample I found on the descending portion of the peak, and the amplitude for the first sample on either side of the peak located at IMAX, here illustrated as P4 and P5. Once a peak-bump has been recorded, the process continues now searching for a peak-depression beginning at Point E as indicated with Block 956 and described later.

If the test indicated in Block 942 had answered NO, the process bypassed Block 946 to continue at Block 948. There the next sample is tested to see if the amplitude will continue to decrease. If so, the test answers YES and the process continues at Point DD, still searching for an amplitude which differs from AMA by more than Ta(K). If, however, the amplitude will increase at the next sample, the test indicated at Block 948 answers NO and the process continues at Point E, abandoning the previous search.

The process used in searching for peaks very much resembles the process used in searching for bumps and depressions with the exceptions that first, the search for peaks is performed on the signal amplitude in contrast to the slope function for the signal, and second, in that no intervening extrema of amplitude are permitted in the interval wherein the signal amplitude must differ from the extrema by more than the considered threshold. This is in contrast to the search of bumps and depressions where such intervening extrema were permitted and ignored so long as they did not exceed the current extremum. However, in the search for peaks such intervening extrema would be detected by the test indicated in Block 948 answering NO and a new process begins at Point E at Block 956. This new process will be described shortly. The tests indicated in Block 943 and 949 detect an interruption in the requirement for constantly decreasing signal amplitudes on each side of a peak-bump and begins the search for a peak-depression.

As previously discussed, if the test indicated in Block 922 answered NO, the process continues through Branch 924 to Block 952 where the amplitude is tested against the last minimum AMN. If in a rare case the amplitude was constantly zero such that the amplitude did not differ either from the initial AMX or AMN values set in Block 916, the process would continue through Branch 954 as the test in Block 952 would answer NO. Then the sample designator I would be incremented, as indicated in Block 990 and the process continued until a sample was found which deviated from zero.

In most cases the test indicated in Block 952 will answer YES and the search for a peak-depression follows as indicated at Block 956. This search corresponds to the search for a peak-bump which began at Block 926, except for a reversal of polarity in regard to the amplitude. Thus AMN replaces AMX, IMIN replaces IMAX and the appropriate consideration is given to the direction of amplitude variation in the search illustrated in process Blocks 956 through 978, which follow. Therefore, no detailed description will be provided herein in this regard, these steps having been previously described in the corresponding search for a peak-bump.

The process of searching for a peak-depression terminates in a similar manner as did the process of searching for a peak-bump as indicated by Block 978. The current sample $S(I,J)$ is tested to see if it is less than the next sample $S(I+1,J)$. If it is, the signal amplitude is considered to be still constantly increasing and the search continues as indicated through Branch 980 to return to Point EE at Block 958. If, however, the test answers NO, a decreasing amplitude is detected which interrupts the requirement for no intervening extrema occurring within the interval required for the difference in amplitude from AMX to exceed the threshold. In such case the process begins at point D with a new search for a peak-bump using the steps already described.

Referring now to FIG. 4, the test indicated in Block 978 would have answer NO, at the sample designated as $i_4$, thereby detecting the presence of a change in direction of the signal amplitude. Such a change in direction interrupts the search for a sample which differs from the sample at the last extremum by more than the sought threshold value, and therefore the search for a boundary of a size significant compared to the threshold value. The process test indicated in Block 948 would also detect the change in direction at $i_5$. The search for a new peak-bump which would then start would be detected at point $i_6$.

In a similar manner, the test indicated in Block 948 would answer NO at the sample indicated as $i_7$ in FIG. 4 because the next sample at $i_8$ would indicate the amplitude no longer continued to decrease. A new search for a peak-pump and then for a peak-depression would follow respectively, at samples $i_7$ and $i_8$. A minimum of amplitude would be subsequently detected at sample $i_9$.

As in the search for bumps and depressions, there are alternate methods of searching for peak-bumps and peak-depressions. FIG. 4 also illustrates one such alternate method, which uses two intervals on each side of a detected extremum, as previously described. FIG. 4 also illustrates only one of many possible values of Ta, here shown as Ta=8.

In summary, FIG. 4 illustrates at samples $i_3$ through $i_{18}$ extrema of signal amplitude. Only one threshold for amplitude is shown as Ta=8. For such a threshold, samples $i_2$, $i_{10}$ and $i_{18}$ are found to be maxima corresponding to peak-bumps of size significant compared to TA. Samples $i_3$, $i_{11}$ and $i_{15}$ are found to be minima corresponding peak-depressions of size significant compared to Ta. Samples $i_6$ and $i_9$ are considered as significant extrema compared to Ta=8 because sample $i_4$ and $i_5$ and respectively, sample $i_7$ and $i_8$ interrupt the search for samples on both sides of these extrema which differ from the extrema value by more than the threshold Ta. In a similar manner, the sample at $i_{13}$ disqualifies the extrema at $i_{12}$ and $i_{14}$ and the sample at $i_{17}$ disqualifies the extremum at $i_{16}$ by interrupting the search for samples which differed from the extrema value by more than the required threshold.

Referring now to FIG. 8C, there is illustrated the steps which may be used to detect the type of element known as a surge. As indicated by Block 1000 this process may be performed before or after, as indicated by entry point H, the search for other types of elements. Block 1002 indicates reading from a conventional input device such as a cardreader, parameters which may be used to control the process to be described. The process used in detecting surges may use two approaches which employ different threshold Te and Tm. These thresholds along with the previously defined parameters, ILAST, JLAST, M and N, may be read.

In the first method of searching for surges, a search is conducted over two predefined intervals of a length designated as LLAST samples. This parameter may also be read at this time. As indicated by Block 1004, the signal samples $S(I,J)$ may also be input from a conventional input device such as magnetic tape reader, for example.

If the process follows the processes used to detect other types of elements, as indicated by Point H, only Te, Tm and LLAST need be read at this time, as indicated by Block 1008. Further, all such parameters could have been read in one initial input step, perhaps at Block 802 of FIG. 8A.

In either case, the signal designator J is initialized as indicated in Block 1010 and subsequently incremented by 1 in Block 1012 to designate the signal to be analyzed.

In one method of searching for surges, two averages are computed about each sample I. The average, for the interval occurring before the sample I may be computed as per Equation (4) below, and is herein designated AB(I). A similar average for the interval occurring following the sample I is computed as per Equation (5) below, and is herein designated AF(I). The averages are computed from LLAST samples located on each side of sample I. In a similar manner, mean values might be computed. The equation for the averages computed before and following I are respectively:

$$AB(I) = \frac{1}{LLAST} \sum_{n=1}^{LLAST} S(I-n,J) \quad (4)$$

and $$AF(I) = \frac{1}{LLAST} \sum_{n=1}^{LLAST} S(I+n,J) \quad (5)$$

As was in the case for computing the slope function, these values may be computed all at the same time for later use as indicated in Block 1016, or computed later as each sample I is considered.

The next step in the process as illustrated in FIG. 8C is Block 1018 and initializes the sample designator I. However, alternate points on this figure are designated as AM, SA and SD. This designates respectively, the exit point and return points for a second method of detecting surges which is illustrated in FIG. 8D and will be discussed later. This second method does not use the average or mean value as illustrated in Block 1016. The second method consequently bypasses this step as indicated by alternate Branch 1014 to Point AM illustrated on FIG. 8D and thereafter returns to this process at Points SA and SD as with the first method to Blocks 1042 and 1046 respectively.

As indicated in Block 1032, it is convenient to calculate the difference DIFF between the AF(I) and AB(I) values for testing the absolute value ABSF(DIFF) of this difference for exceeding a threshold Tm for such values as indicated in Block 1034. In the method shown this test represents determining if the average or mean value for the interval occurring before sample I differs from the value for the interval following sample I by more than threshold Tm. If true, the test answers YES and an element of the type known as a surge significant in size compared with Tm has been detected. Once detected, the test indicated in Block 1038 determines if the surge is of an ascending (positive) or a descending (negative) type. This test answers YES and NO respectively for each of these types.

If an ascending surge of size significant compared to the threshold Tm has been detected, the process follows Branch 1040 to Block 1042 where the boundary positions and characteristic parameters for such a surge may be computed. As previously described, for such processes the boundary number M is incremented and the position of the boundary recorded here as the position of sample I. Further, the element number N is incremented. The code for the type of element recorded. The code used herein to designate the type of element known as an ascending surge is the number 5. Also the boundary number M is cross referenced to the element and the characteristic parameters derived and recorded as previously described. In cases of surges, the characteristic parameters describing the form of the surge might include the amplitude at sample I, which corresponded to the detection of the surge and, therefore, its boundary. Also included might be the slope function value at this sample FS(I,J) previously computed for use in detection of bumps and depressions, the average values for the interval occurring before AB(I) and following AF(I) for the sample I and perhaps the amplitudes of the samples occurring before and after the sample I, or perhaps their difference as illustrated by P5 (N,J).

After determining the characteristic parameters for a detected surge, the process continues to Block 1043. As indicated there the sample designator I is incremented now by a number of samples greater than one, here indicated to be a number one half of the number of samples LLAST used in the intervals on either side of sample I for detecting surges. Such an increment is needed to prevent repeated detection of the same surge.

After Block 1043, the process continues as indicated in FIG. 8C to Point GG as it would have continued had the test in Block 1034 answered NO. In either case I is incremented as indicated in Block 1048 and tested for its last value as indicated in Block 1050. If it is not its last value, the process begins again by returning to Block 1032 for the first method or to Point AM of FIG. 8D for the second method.

If I corresponds to the last sample the test in Block 1050 answers YES and the process continues as indicated by Branch 1060 to Block 1062 where J is tested for the last curve. If there are more curves remaining the process continues as indicated by the test answering NO through Branch 1064 to begin again with a new curve determined in Block 1012.

If the last curve has been analyzed, the test indicated in Block 1062 answers YES and the process continues to a procedure here designated as SORT. This process will be discussed in regard to FIG. 8E.

Referring back to Block 1038 of FIG. 8C, if it is found that the difference between the values representing the interval following the sample I AF(I) and the value representing the interval before the sample I AB(I) differs in a negative sense, this test answers NO and the process continues as indicated by Branch 1044 to Block 1046. This corresponds to the detection of a descending surge. The steps represented in Block 1046 serve the same functions as the steps represented in the previously described Block 1042, and therefore need not be described again.

In reviewing the first method just described in regard to FIG. 8C, refer to FIG. 5 where the sample designated $i_s$ is being considered. The interval before this sample is here designated D' and the interval after designated D. The average value for each interval is indicated by dashed lines through the signals in the intervals. The threshold Tm measured from the average value of interval D' shows the difference between the average values exceeds the threshold. Thus, sample $i_s$ corresponds to the boundary of a surge. Since the average for interval D is greater than for D' an ascending surge occurring over the interval D'+D is detected at $i_s$ which is of a size significant compared to Tm.

While still referring to the figure, the second method of detecting surges will be discussed. This method uses a threshold Te for comparing extrema of the signal amplitude. The intervals D' is searched to select the most extreme maximum and minimum within the interval. Similarly, the interval D is searched to select most extreme maximum and minimum. The maximum selected within one interval is compared to the minimum selected within the other interval to determine both the direction and size of the surge. If the maximum in the interval D' (designated as M in FIG. 5) is less than the minimum within the interval D (designated as m in FIG. 5) by a difference greater than Te, an ascending surge of size significant compared to Te is detected. In a similar manner, if the minimum selected for the interval D' exceeds the maximum for the interval D by a difference greater than Te, a descending surge of size signigicant compared to Te is detected.

FIG. 8D represents the alternate steps in conjunction with FIG. 8C which may be used to perform this second method of detecting surges. The process deviates from that illustrated in FIG. 8C first at point AM as indicated by Branch 1014, then again at point AM' as indicated at Branch 1052. From these branches the process continues respectively to Points AM and AM' on FIG. 8D.

In the case of Branch 1014, entry to FIG. 8D is made at point AM and sample designation I is initialized as in Block 2018. Thereafter as in either the case of Branch 1014 or Branch 1052 to Point AM', two values FMIN and FMAX, used for storing the respective minimum and maximum amplitude values occurring in the interval D following the sample I, will be initialized as indicated in Block 2024. Similarly, two values BMIN and BMAX used for storing the respective minimum and maximum amplitude values in the interval D' occurring before the sample I are also initialized. An interval length counter LC used for counting the number of samples examined within each interval is also initialized.

The process may then continue to Block 2026. As indicated in Block 2026, sample (I+LC) on curve J is tested to see if it exceeds the previous maximum FMAX for interval D. If it does, the test answers YES and the amplitude at this point is stored as a new FMAX. Since this sample could not also be a minimum, the process bypasses Block 2032, in such a case, to Block 2046 which will be described later.

If the sample (I+LC) does not exceed FMAX, as indicated by the test in Block 2026 answering NO, the sample might well be a minimum for the interval D which would be detected in such a case by the next test shown in Block 2032 answering YES. In such a case, this amplitude is stored as a new minimum FMIN as indicated in Block 2036.

In all cases the process continues at Block 2046 where similar tests are run for the corresponding sample (I-LC) located in the interval D'. In the same manner the corresponding process indicated by Blocks 2046 through 2056 may result in new values of maximum and minimum BMAX and BMIN respectively, in this interval.

The process of searching for maximum and minimum within these two intervals continues as long as the test indicated in Block 2058 answers NO which results in LC being incremented by 1 as indicated by Block 2062 and the continuation of the process beginning at Block 2026 with new samples. Finally, when the last samples in the interval have been tested, the test indicated in Block 2058 answers YES and, as indicated in Block 2070, a difference between the minimum value FMIN occurring in the interval following the sample I and the maximum value BMAX in the interval occurring before the sample I is computed. As indicated in Block 2072, this difference is tested against a threshold Te to see if it exceeds this threshold. If it does, the test answers YES and the process continues as indicated by Branch 2084 to Block 2090.

In such a case, an ascending surge has been detected, and the most characteristic parameter FMIN representing the interval following the sample I is assigned to AF(I). The most characteristic parameter BMAX representing the interval before the sample I is assigned to AB(I). The process then returns through Branch 2092 to Point SA of FIG. 8C.

As shown in FIG. 8C at entry point SA, the next step, as indicated in Block 1042 is to record the detection of an ascending surge, its position and characteristic parameters as previously described. Thereafter the process continues to Blocks 1043, Point GG, Blocks 1048 and 1050 and returns at Point AM'.

If, however, the difference tested in Block 2072 of FIG. 8D did not exceed Te the test answers NO and a further test is made for the possibility that a descending surge may be present. It is convenient to calculate a difference between the minimum BMIN in the interval D' and the maximum BMAX in the interval D, as indicated in Block 2076. Then this difference is compared to the threshold Te. If this difference exceeds the threshold, a descending surge of a size significant to Te has been detected. This is indicated by the test in Block 2078 answering YES. The values of FMAX and BMIN are assigned to the values AF(I) and AB(I) respectively, to represent the intervals D and D', as indicated in Block 2080. This process then returns through Branch 2082 to the process illustrated in FIG. 8C at the entry point indicated as SD.

The next step, as indicated by Block 1046, is to record the detection of a descending surge. The position of its boundary, the characteristic parameters and their positions, etc. are recorded as previously described. The process returns to FIG. 8D at Point AM'. If, however, the differences between the minimums and maximums tested in Blocks 2072 and 2078 of FIG. 8D both fail to exceed Te, no surge is detected and the process goes immediately to Point GG in FIG. 8C to examine a further sample I determined as indicated in Block 1048.

Returning now to FIG. 8E, there is illustrated a method of sorting elements of all types detected on a given curve J for a series of curves, J=1 to JLAST. The purpose of this sort is to assign element and boundary sequence numbers which have the properties previously described. This sort operation may be performed anytime after the completion of the detection of all elements in a given interval on a given signal. Normally this sort operation is conducted near the close of the process previously described on Phase I.

FIG. 8E illustrates the process as it would be performed immediately after the completion of the detection of type of element known as surges. As such, the definitions of various parameters, the element and boundary storage numbers, etc. are already available to the process. If this was not the case, the process indicated by Block 3000 would include making the necessary information available to the process illustrated thereafter in FIG. 8E.

As indicated in Block 3002, the final element number N is stored as a parameter, here designated NL and the parameter J used to designate the signals is initialized, as indicated in Block 3004. The process then continues as indicated to Block 3005 where J is incremented to the next signal and N is reset to the initial value needed to begin the search for elements located on curve or signal J. N is incremented as indicated in Block 3006, and then tested against the last value, as indicated in Block 3008. If N is not the last value, this test answers NO and the process continues, as indicated by Block 3010 to Block 3012. At this point in the process the cross-reference giving the the storage location of the boundaries pertaining to element N, here designated NB(N,J), is retrieved and assigned to M, as indicated in Block 3012. M is then used to locate the absicssa value F of one boundary of this element.

As indicated by Block 3014, the abscissa value, the curve designation, the boundary number and element number are forwarded as input to a standard sort routine herein designated ASORT. The ASORT routine is a routine which rearranges the references applied to it in accordance with the ascending order of a selected sort parameter. Such routines are well known. In the case illustrated by Block 3014, the sort parameter is the boundary abscissa value F and the parameters J, M and N enable the location of the references to the element.

As each value F is applied, the list of references corresponding to boundary M of element N located on curve J is retrieved and arranged by the ASORT routine such that the address corresponding to the lowest value of F always occurs first in the list and the address corresponding to the highest value of F always occurs last. Thus, as each new value of F is applied, F is compared to the previous submitted F values and if it is higher than all previously submitted F values, it is assigned a new and higher position in the sorted list.

If, however, F is lower than a previously submitted value, the sort operation resorts the previous addresses in accordance with the then known values F, such that the addresses within the sorted list correspond to ascending values of all known values F submitted to it at any given time.

The process then continues to Block 3016 wherein the type of element is examined. As is illustrated in this Block, if the test indicates that the type of element has more than one boundary, as was the previously illustrated case wherein the code 1 or 2 was employed for such elements, then the test answers YES. The additional boundaries are also retrieved and designated F, as indicated by Block 3020. These boundaries are also submitted to the sort routine as indicated in Block 3022, and sorted as previously described.

Further, as indicated in Block 3024, an additional sort, herein designated BSORT is employed. As indicated by the process diagram illustrated in FIG. 8E, only the second or additional boundaries of each element are designated to this routine. This sort routine, like the first sort routine, sorts the designated parameter in ascending order, but in this case, after the parameters have been previously sorted by the routine designated ASORT.

Thus, this routine handles the case where the routine ASORT finds a number of boundaries all having the same F value and therefore groups them together accordingly. BSORT then resorts these values which, in this case, correspond to boundaries having identical final boundary values. The boundaries are thus resorted in accordance with their initial boundary values, which results in the arrangement previously described in regard to the sorting of boundary values.

This boundary retrieval and sort process continues until all NL elements have been retrieved and sorted for a given curve J, and at this time the test indicated in Block 3008 answers YES. A routine called SEQUENCE is then employed as indicated by Block 3040. This routine assigns boundary sequence numbers in accordance with the order of addresses resulting from the previously described sorting operations performed for Curve J. Further, the routine may be used to assign element sequence numbers. Properties of such element and boundary sequence number have been previously described herein and are illustrated in the tables given in FIGS. 12 and 13.

After assigning sequence numbers, as indicated in Block 3040, the process continues to the test indicated in Block 3042 where it is determined if the last curve has been processed. If not, the test answers NO and the process begins again at Block 3005. If the last curve has been processed, this process is complete and the procedure exits to the point designated X which is illustrated 8F.

Referring now to FIG. 10 and 11, which respectively illustrate two exemplary signals which have been analyzed for elements of types designated as 1, 2, 3 and 4. For example, type 1 may be regarded as a large bump, 2 as a large depression, 3 as a small bump and 4 as a small depression. The properties illustrated in these two figures, however, are independent of the actual type of elements employed to the extent that any type of element may be included in other types of elements.

Thus, FIG. 10 illustrates a signal, here designated as Curve I, which contains 31 detected elements of the previously mentioned types, which have been subsequently sorted and assigned element sequence numbers E1 through E31 respectively. In general the latest occurring or highest elements have the highest element sequence numbers. However, where two or more elements have their final boundaries at the same abscissa value, the shortest element has the lowest sequence number. In addition, where two or more elements have their initial boundaries at the same abscissa value the shortest element has the lowest sequence number. This is in accordance with the previously described sort operation.

The boundaries corresponding to these elements have also been sorted in accordance with the previously described sort operation and assigned boundary sequence numbers. They are illustrated as boundary sequence numbers F1 through F62 in FIG. 10. In general, the boundaries later occurring or highest boundaries are designated with higher boundary sequence numbers. Further, when two boundaries have the same abscissa value and one boundary is the final boundary while the other is an initial boundary, the initial boundary is assigned a lower sequence number.

Further, when two final boundaries have the same abscissa value, the final boundary corresponding to the shortest element is assigned the lower sequence number. When two initial boundaries have the same abscissa value, the initial boundary corresponding to the longest element is assigned the lower sequence number.

FIG. 11 similarly designates the element and boundary sequence numbers obtained for a second signal or curve wherein elements E101 through E132 have been detected. The corresponding boundaries are designated by boundary sequence numbers F101 through F164. The same information illustrated in FIGS. 10 and 11 is displayed in tabular reference form as FIGS. 12 and 13. Thus, FIGS. 10, 11, 12 and 13 represent the type of information that would be available after the completion of Phase I.

Figure 8F:
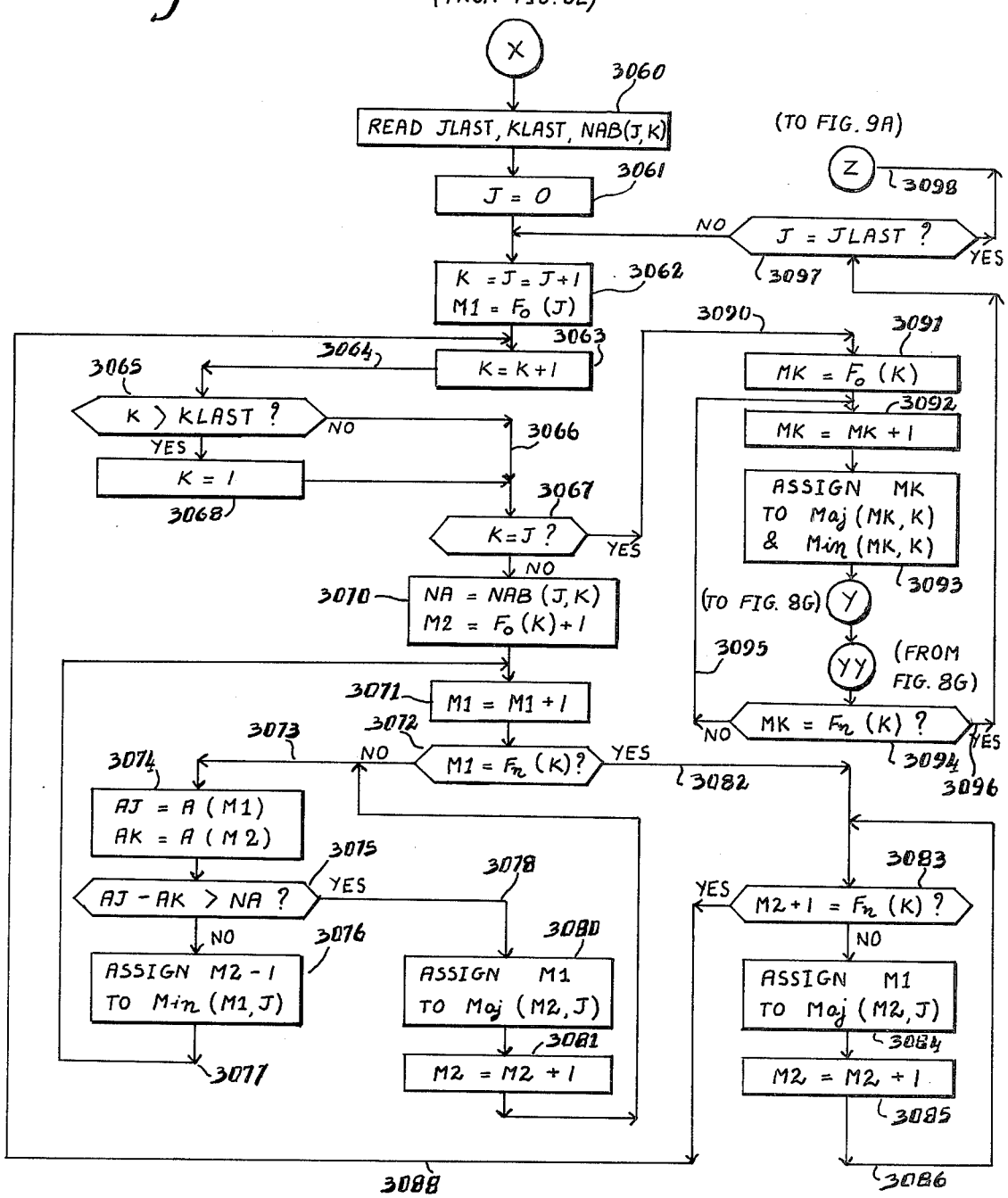

FIG. 8F, which is illustrated as following FIG. 8E beginning at point X, is representative of the process herein designated as Phase II. Its purpose is to assign the initial upper and lower bounds used in searching for corresponding elements on two or more signals. These search bounds, as they may be regarded, have been previously discussed and are illustrated as the initial Min and Maj values given in tabular form in FIGS. 14 and 15.

As previously stated, some initial displacement must be assumed as to the maximum possible displacement which could be initially considered in which to look for possible corresponding elements. These initially assumed search intervals or displacements are designated as input values NAB (J,K) in Block 3060 of FIG. 8F. They designate the search interval to be used below a point on Curve J to determine a point on Curve K. As indicated, these are determined prior to the beginning of the process and vary according to the type of tool and source of signals originally analyzed. They may be read in from conventional input means such is a card reader.

As previously discussed, the second phase involves two or more curves whereas phase one could be performed independently on one curve at a time. Thus, an additional input KLAST is illustrated in Block 3060. It is a parameter controlling the last curve to be used in this process.

With these control parameters now available, the process continues as indicated to Block 3061 where J is initialized, as an initial value zero.

In the illustrated method, a curve designated by J is regarded as the reference curve and the curve designated by K as the comparison curve. For each designation of J, KLAST designations of K are considered. Thus, for example, when J is 1, K is designated as first 2, then 3, 4 and 5, which exceeds KLAST and subsequently K is reset to 1. Thus all designations of K are considered.

In the cases where K and J are equal, the same curve is designated as both K and J. It would be possible to let this condition exist and proceed as otherwise but it is more direct to provide a special procedure for such cases. By definition, the upper and lower bound on curve K for a boundary on K is the boundary itself. Thus it can be directly stated as Maj (f,K)=Min (f,K)=f.

Also in the case where K=J, it is convenient to determine the element of each type which have their respective boundaries next above or next below each boundary on the same curve, thus the process diagrammed in FIG. 8F extends to FIG. 8G for this last process.

There is a further consideration which will be reviewed. In the previous discussions of Tables V and VI shown in FIGS. 14 and 15, the concept of artificial boundaries used to close both ends of each curve was discussed. The artificial boundary at the zero sample end of curve K is designated as $F_0(K)$ and the artificial boundary at the last sample n is designated as $F_n(K)$.

Continuing again with FIG. 8F, Block 3062 represents the initialization of curve designator K to the current new designation of curve J. Also represented is the defining of an initial boundary on curve J as the sample zero artificial boundary $F_0(J)$.

As indicated in the next blocks K is incremental by one (Block 3063) and tested for exceeding KLAST (Block 3065). If K exceeds KLAST, the test indicated in Block 3065 answers YES and K is reset to 1 as indicated in Block 3068.

With K now determined, the process continues to the test indicated in Block 3067. If K=J, as previously discussed, a special procedure is preferred as indicated by the test answering YES and the process branches to Block 3091, which will be described later.

However, if K is not equal to J, two different curves are designated and the test indicated in Block 3067 answers NO. As indicated in Block 3070, the interval NA is defined from predetermined values of NAB (J, K) for use as the maximum possible displacement between boundaries on curve J downwardly to boundaries on curve K. Also the initial boundary M2 on a second curve (here designated K) is defined as the boundary next above the sample zero artificial boundary on K.

Since it is by definition that sample zero artificial boundaries for all curves correspond, the process first considers the first boundary above this boundary as indicated by the initial definition of M2 in Block 3070 and the incrementation of M1 in Block 3071. After testing for equality with the last (n) sample artificial boundary, which would correspond to the last considered boundary on curve K, as indicated by the test in Block 3072 answering YES, the process continues to Block 3083 which will be discussed later.

If M1 is not the last boundary on curve K, the test indicated in Block 3072 answers NO and the abscissa values AJ and AK for boundary numbers M1 and M2 are obtained respectively from the previously generated references illustrated as in Tables II and IV, for example. The difference between the abscissa values for M1 and M2 is compared with the interval NA, and if indicated by the test in Block 3075 answering NO, the boundary just below M2 is assigned as the lower bound Min (M1, J).

The procedure then considers the next boundary above M1 as indicated by Block 3071 and repeats the above process until a boundary located on curve J at a position which is at least an interval NA above the position of the boundary M2 on curve K is found. This is indicated by the test shown in Block 3075 answering YES. The boundary M1 is now the highest possible boundary which could be considered as corresponding to M2, so M1 is assigned as the upper bound Maj (M2, J) as indicated in Block 3080.

The next boundary above M2 is now considered as indicated by the incrementation of M2 in Block 3081 and the above process again repeated starting at Block 3074.

Both the above processes of determining the upper and lower bounds are repeated until M1 becomes the last boundary $F_n(K)$, and as indicated by the test in Block 3072 then answering YES, the process continues to Block 3083.

The next boundary above M2 is tested to see if it might be the last boundary $F_n(K)$ as indicated in Block 3093. If it is not, as represented by the test answering NO, boundary M1 is then assigned as the upper bound Maj (M2, J) for the remaining M2 boundaries as shown by the loop indicated by Blocks 3084, 3085 and 3083.

When the next to last boundary on curve K is considered, the test indicated in Block 3083 answers YES and the process continues as indicated by Branch 3088 to previously described Block 3063, and a new curve K is designated and also processed as previously described.

When the designations for curves K and J are equal, the test indicated in Block 3072 answers YES and the preferred method of assigning the upper and lower bounds for also boundaries located on the same curve is performed as indicated by Blocks 3091 through 3094.

Initially the boundary MK on curve K is set to the zero sample artificial boundary $F_0(K)$ as shown in Block 3091, then the boundary next above is considered as shown in Block 3092 and assigned as both the upper and lower bounds of MK on curve K, as indicated in Block 3093. Disregarding points Y and YY for now, MK is the tested for the last boundary $F_n(K)$ and the above process repeated as long as the test indicated in Block 3094 for each MK answers NO.

If MK is the last boundary, the test answers YES and a test for the last curve J is performed as indicated in Block 3097. If more curves remain to be designated as curve J, the test answers NO and new J and K designations determined as indicated in Block 3062 and the process which has been already described is repeated for these curves. When the last curve J has been processed, the test indicated in Block 3097 answers YES and the process continues at point Z of FIG. 9A, which is the start of the correlation phase.

Now in regard to the points designated as Y and YY in both FIGS. 8F and 8G, the steps of the process of determining the elements to be designated as Minax and Majax will be described. At point Y a boundary MK located somewhere on curve K has been processed for the assignment of its bounds. Then in the process illustrated in FIG. 8G, this boundary will also have assigned the elements of NT types as Minax and Majax references.

The process begins by initializing an element type designation NT as shown in Block 3100. NT is subsequently incremented by 1, as indicated by Block 3102. A designated curve, here illustrated as K, is then searched upward from MK as indicated in Block 3104, by locating, from previously determined references each element which has any part of it above the boundary MK located on Curve K. The type of each such element, TYPE (L, K) is tested to determine if it is of the element type NT until a type NT element is found. In the case of elements of a type having more than one boundary, the same element may be used as the element next above each of its boundaries. FIG. 8G illustrates the case of elements having initial and final boundaries. For elements having only one boundary, this boundary may be regarded as the final ($f_2$) boundary, for example. Thus, as indicated in the test of Block 3106, it is determined if an element has already been designated as having its final boundary next above the boundary M. If it has, this test answers YES and the process goes directly to Block 3120. If Majax$_2$ has not already been assigned, this test answers NO and the process continues as indicated by Branch 3108 to Block 3110.

At Block 3110, the final boundary $f_2$ is obtained from the previous references for the element located as per Block 3104. The abscissa values for boundary MK and the final boundary may be compared, or preferably, the boundary sequence numbers for these boundaries may be compared in the test indicated as Block 3112 to determine if the final boundary is above boundary MK. If it is not, as indicated by the test answering NO, the process continues as indicated by Branch 3114 to Block 3120 where similar tests are indicated for its initial (or last) boundary. If it also is not above MK, the process begins again with a further search for elements located above the boundary MK on Curve K of type NT. This search and test loop continues until the test as Block 3112 or Block 3122 answers YES. If Block 3112, the next step as indicated in Block 3116 is to obtain the element sequence number for the located element if not already known, and, as indicated in Block 3118, assigned it to the cross-reference, here designated as Majax$_1$(MK,K).

Once this assignment has been made, the test previously indicated in Block 3106 will now answer YES and the process concerns itself thereafter only with the remaining boundaries as indicated in Block 3120. There the next (or initial boundary for the previously considered element is obtained and then tested as indicated in Block 3122 to see if it is located also above MK. If not, the test indicated there answers NO and the process continues by Branch 3124 to begin again with a new element as may be found in Block 3104. If this boundary is above MK, the test indicated in Block 3122 answers YES. The element sequence number may be obtained as indicated in Block 3126 and assigned to the cross-reference, here designated as Majax$_1$(MK,K), as indicated in Block 3128.

Thereafter, a similar search may be performed as indicated by the process beginning at Block 3134. This process is generally the same as the previously described process for locating elements of type NT on Curve K whose f1, f2, ... fn boundaries are respectively located in a given direction from the boundary MK except that in the process starting at Block 3134, the search is conducted downward from boundary MK.

To illustrate that this process may be performed in any of several sequence of steps, the process illustrated after Block 3134 searches first for the elements whose initial boundary $f_1$ is below MK and then for elements whose final boundary $f_2$ is below MK. Once located, the boundary sequence numbers may be obtained and assigned respectively to the Minax$_1$ and Minax$_2$ cross references of boundary MK on Curve K. This process is repeated for all types of elements involved in the correlation process as the test indicated in Block 3160 will answer NO, until the last type of element, herein designated as NT=6 has been processed. At this time this test answers YES, and the process returns to the point designated YY in FIG. 8F. Prior to the last type of element, the process again continues to Block 3102 as the test in Block 3160 answers NO. At Block 3102 NT is incremented to the next type number.

The processes illustrated in FIG. 8G results in cross references of the type illustrated for Curve II in Table VI of FIG. 15. In this table, only the Majax$_1$, Majax$_2$ (elements above) and Minax$_1$ and Minax$_2$ (elements below) references for boundaries f, which are of a given type T1 are shown. It should be understood that there would be as many Majax and Minax references as there are boundaries for the given type. Also there could be as many such tables as there are types of elements.

When all the types of elements have been considered, the procedure illustrated in FIG. 8C returns to Point YY of FIG. 8F. There, as indicated by Block 3094 the boundary designator MK is tested for the last boundary on curve K. The previously described process which follows continues for various boundaries until the test indicated in Block 3096 answers YES when MK corresponds to the last boundary Fn on Curve K. In such a case, the process continues to Block 3097 and Curve Designator J is tested to see if Curve J corresponds to the last Curve JLAST to be processed. If it is not further, the test answers NO and new curves designated as Curve J and K are selected as indicated in Blocks 3062.

The process continues once again to determine the initial upper and lower bounds located on Curve K for boundary M2 located on Curve K. Finally, when the last curve is then processed as indicated by the test in Block 3097 answering YES, the process continues as indicated by Branch 3098 to Point Z. This concludes the phase of the process previously described as Phase or Stage Two and results in the reference tables shown in FIGS. 14 and 15. The initial values of the cross references listed as Min (f,II), Maj (f,II), Min (f, I) and Maj (f, I) are illustrative of the process described in FIG. 8F. Further, the cross-references designated in FIG. 15 and listed as Majax$_1$ (f,T1), Majax$_2$(f,T1), Minax$_1$(f,T1) and Minax$_2$(f,T1) are illustrative of the process described in FIG. 8G.

As indicated as the preferred method, the references are constructed using element and boundary sequence numbers derived by the process described herein. It is possible, although substantially less convenient, to construct similar references using the abscissa values corresponding to each boundary and the abscissa value of a representative sample of each element. As previously indicated, the process designated as Phase Two normally is followed thereafter by process previously described as Phase 3 or Stage three. This phase begins at the point designated as Z in FIG. 8F and FIG. 9A.

In reference now to FIG. 9A, there is shown the steps in a process which may be used to select and correlate elements located on two signals, as previously described herein in Phase Three of the process. This process, like other processes or phases described herein, may be performed at any time after sufficient information has been produced from the previous processes to begin the correlation process.

As shown in FIG. 9A, the process begins at Point Z which is designated in the previous FIG. 8 F. Assuming that all the information developed in these previous processes is still available to this process, the additional information needed to control this process is read as indicated in Block 4000. Such input is from typical input devices as a card reader, for example, and such cards are prepared in advance to the initial operation. The parameters illustrated are the designation of the initial reference curve J, the initial comparison curve K, the last comparison curve KLAST, the number L of types of elements to be used in a correlation order L and L such types of elements designated CTYPE(L) in the order they are to be used in the correlation.

As previously discussed, one of the feature of the invention allows the ability to correlate the various types of elements in a given order to accomplish a given type of correlation. For example, a correlation type order may represent the progression of types of elements from the longest duration type of element to the shortest duration type of element. A specific example would be represented by a correlation type order which placing surges first, bumps and depressions next and peaks last. Another type of correlation order might be first predicated on the use of large peaks followed by large bumps, large depressions, medium peaks, medium bumps, and depressions, surges and finally the smallest of the peaks, bumps, depressions and surges. In any case, the correlation order by type is previously defined, prior to the beginning of the process.

After input, the process may continue as indicated to Block 4002 where the type order number NT is initialized to 1. In the first pass the processes, indicated as Block 4004, may be bypassed as indicated going to Block 4006, since J and K were input values. Thereafter, the process increments J and K as indicated by Block 4004 before proceeding to Block 4006, which initializes the element designator N. N is subsequently incremented by 1 as indicated by Block 4008 and tested as indicated in Block 4010 to determine if the last element NL has been designated.

If not, the test answers NO, and the process continues as indicated by Branch 4012 to Block 4014. A search is then performed on the references generated in the analysis of curve J to locate an element which is of the same type as indicated by CTYPE(NT) in the correlation type order.

When one such element is found, the process continues to Block 4016 and the initial $f_1$ boundary, $f_2$ boundary and any other boundaries for the elements are obtained from the previously generated references. As indicated in Block 4018, these boundaries are used to obtain from previously generated cross-references, the upper bound Maj(f,K) and lower bound Min(f,K) located on curve K for each boundary $f_1, f_2 \ldots, f_n$ of the element located on curve J.

The process illustrated by Blocks 4024, through 4034 indicate just one method of locating and testing each element on curve K for such limits.

When elements of the type having only one boundary are being correlated, only the steps concerning the initial ($f_1$) boundary need be performed. When elements having more than two boundaries are being correlated, a corresponding number of steps must be performed.

As Block 4020 indicates, the characteristic parameters for this element are also obtained from previously generated references. This step may be performed at this time or at any time prior to the actual comparison of such parameters. Normally the process continues to Block 4022 and a search is now performed on the references generated in the analysis of curve or signal K for an element which is of the same type or compatible types as the type of element located on curve J as was indicated in Block 4014. As indicated in Block 4026, the initial $f_1$ and final $f_2$ boundaries are obtained for this element. These are then compared with the upper and lower bounds on curve K for each counterpart boundary of the element located on curve J to determine if this element (the one located on curve K, as in Block 4024) is within the previously established limits for possible corresponding elements.

As illustrated in Block 4028, the final $f_2$ boundary $f'_2$ for the element located on curve K is tested to see if it is at or above the lower bound Min($f_2$, K) for the counterpart ($f_2$) boundary of the element located on curve J. If it does not, the test answers NO and the search on curve K continues. If $f_2$ is found to be above the lower bound, as indicated by the test in Block 4028 answering YES, then $f_2$ is tested to see if it as or below the upper bound Maj($f_2$,K) for the counterpart ($f_2$) boundary of the element on curve J. If this is not the case, the test indicated in Block 4030 answers NO and the search continues as previously described.

However, if the final $f'_2$ boundary falls within the upper and lower bound limits, the initial $f'_1$ boundary may be tested in a similar manner. As indicated in Block 4032, the initial ($f'_1$) boundary of the element on K is tested to see if it is at or above the lower bound Min($f_1$,K) of the counterpart ($f_1$) boundary of the element located on curve J. Again, if disqualified, the test answers NO and the search for possible corresponding elements is continued. If the test answers YES, then the final test for a possible corresponding element is indicated in Block 4034. The initial ($f'_1$) boundary of the element located on curve K is tested to see if it is at or below the upper bound Maj($f_1$,K) for the counterpart ($f_1$) boundary of the element located on curve J.

Since the search for corresponding elements is conducted in the same manner that the signal is analyzed, that is from the lower to upper or earlier to later samples, then the failure for the initial $f'_1$ boundary of an element to meet its upper bound limits would indicate that there are no more possible corresponding elements and the test indicated in Block 4034 would answer NO. The search for possible corresponding elements is then terminated and the process would continue, as indicated by Branch 4070. However, in the case of a possible corresponding element fully qualifying in regard to the upper and lower limits placed on each of its boundaries, the test indicated in Block 4034 answers YES and the process continues as indicated by Branch 4036. The process illustrated by Blocks 4024 through 4034 indicate just one method of locating and testing each element on curve K for such limits. An alternate method employs the use of the Majax and Minax references generated in the process shown in FIG. 8G. In this case Blocks 4024 through 4034 are replaced by a single Block which represents obtaining the elements corresponding to the Majax$_2$ ($f_1$,CTYPE(NT)) and Minax$_1$($f_2$,CTYPE(NT)) and any elements of type TYPE(NT) in between these elements on curve K. Each of these elements is processed in the same manner as the elements determined by the illustrated process.

The characteristic parameters for the element determined by either the process indicated by Blocks 4024 through 4034 or the alternate method discussed herein, is obtained from previous references as indicated in Block 4040, in the same manner that the characteristic parameters were obtained as indicated in Block 4020 for the element located on the reference curve J. The characteristic parameters for the element on the reference curve are compared for the element just located on the comparison curve, as indicated in Block 4042.

Several methods of comparing these parameters may be employed which are well known in statistics. Indeed, even the standard correlation equations previously referenced herein as prior art may be used at this point. If the elements are known to be of an unequal length, as indicated by differences in the position of the respective upper and lower boundaries, the samples contained therebetween may be resampled to provide an equal number of samples as was described in the previously referenced U.S. Pat. No. 3,760,815 issued to Doddington et al, but also warped.

In the preferred method, a simple sum of the square of differences between L like parameters for elements N and N' respectively may be employed to derive a correlation coefficient. One such equation is $$C(e) = \sum_{n=1}^{L} [P_n(N,J) - P_n(N',K)]^2 \qquad (6)$$

The correlation coefficient for each compared element set is then stored for further comparison with subsequently computed coefficients or may be compared as indicated in Block 4044 with the currently known coefficients to determine if it is the best yet determined coefficient.

The first compared element located on curve K would, of course, be the best comparing element and the test indicated in Block 4044 would answer YES and the first coefficient would then be saved, as indicated in Block 4048 as the best coefficient. The process then would proceed as indicated by Branch 4060 back to Block 4024 for the search for further possible corresponding elements.

If previous comparisons for possible corresponding elements had been performed, the current coefficient might not be the best coefficient as indicated by the test in Block 4044 answering NO and in such cases the process would proceed as indicated by Branch 4050 to Block 4052. The coefficient then is tested to see if it is the next best coefficient, as represented by the test in this block and if the answer is YES, this coefficient is also saved as the next coefficient, as indicated in Block 4056. The process agains continues as indicated by Branch 4060.

If the current coefficient is neither the best nor the next best as tested for in the tests indicated in Block 4044 and 4052 respectively, the process continues directly by Branch 4060 without updating the best and next best coefficients. If the coefficients for additional possible corresponding elements results in the test answering YES, the appropriate update is made. When the coefficients for all possible corresponding elements have been computed and so tested and the best and next best coefficient is complete, these two coefficients are then compared as indicated in Block 4072. Such comparisons may use a threshold for comparing the difference between the best and next best coefficients to determine if there is a satisfactory degree of resolution between the best and next best corresponding element. Of course, if there is not enough difference between these two elements, it would not be desirable to select the best corresponding element under these circumstances and use this element to perhaps erroneously restrict further searches, as is the nature of this process. However, two ambiguous possible correspondents can be properly distinguished by an unsatisfactory difference in these coefficients. Thus, if the test indicated in Block 4072 answers NO, or NO GOOD, as indicated in the FIG. 9A, the process continues as per Branch 4074 to begin again at Block 4008 with the incrementation of the element designator N and subsequent location of a new element on curve J.

However, if there is a satisfactory degree of discernability between the best and next best possible corresponding elements, the test indicated in Block 4072 answers YES or GOOD, as indicated in FIG. 9A and the process continues to Block 4076. The best coefficient is then compared also with a threshold to determine if the best correlation or comparison is good enough. In such cases, the test indicated in Block 4076 also answers GOOD, and the process then continues to FIG. 9B as indicated by Point ZA.

Otherwise, the best comparing element is found unsatisfactory as indicated by the test in Block 4076, answering NO GOOD and the process continues again to Block 4008 as indicated by Branch 4078. This process continues for all ements located on curve J until the last of element NL has been processed as indicated by the test in Block 4010 answering YES. The type order number NT is incremented by 1, as indicated in Block 4080. The next test, as indicated in Block 4082, might be to test to see if NT is greater than the last type order number L in the correlation type order. If this is not the case, the test answers NO, and the process continues as indicated by Branch 4084 to begin again by the initiallization of the element designator N as indicated by Block 4006.

If NT exceeds L, all specified types of elements in the correlation type order have been processed and the test indicated in Block 4082 answers YES and the process continues to the test indicated in Block 4086. The curve designator K is then tested to see if K is the last curve KLAST. If K is not, the test answers NO and the process continues as indicated by Branch 4088 to Block 4004 where a new reference curve J and a new comparison curve K are the designated for a repeat of the previously described processes.

Figure 9D:
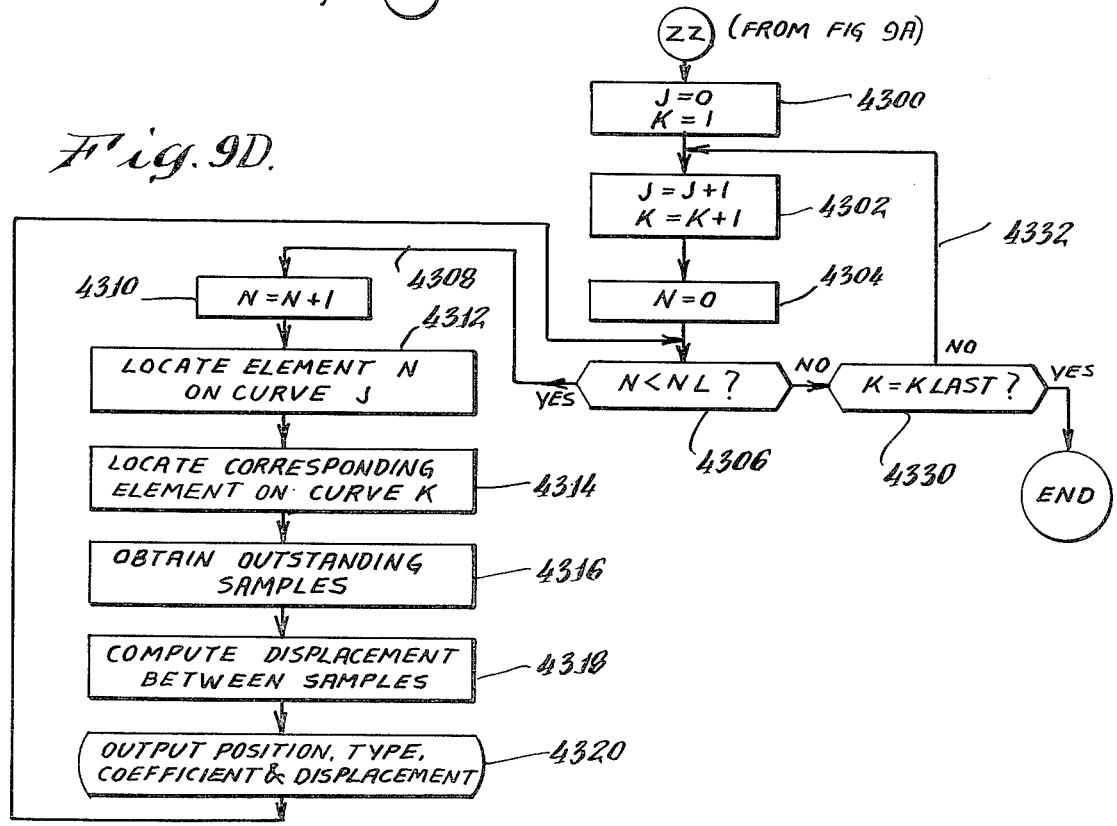
FIG. 9D illustrates steps which may be used to derive displacements.

However, if the last curve has indeed been processed, the determination of all corresponding elements for all the curves is complete, and the process continues to Point ZZ as indicated in FIG. 9D.

When the best comparing element is found to have a good coefficient, the test in Block 4076, FIG. 9A answers GOOD and the process continues to the point indicated as ZA on FIG. 9A and on FIG. 9B, which corresponds to the start of the modification of the upper and lower bounds used in the search for further corresponding elements, as was illustrated in FIG. 9A.

Before describing FIG. 9B, the alternate method of determining possible corresponding elements will be discussed and illustrated in regard to FIGS. 10 and 11 and further in the use of cross-references indicated in FIGS. 14 and 15. In this case, the curve illustrated in FIG. 10 as Curve I is considered as reference curve J. Assume now, for example, that the process has begun with the first element illustrated as type I on Curve I (E2). Thus type I would be indicated as the first element type on the correlation type order, or as CTYPE(1).

The search previously described in regard to Block 4014 considers curve I as curve J and would find element designated E2 as the first element of type I located on curve I.

To determine the possible correspondents of E2, its initial $f_1$ and final $f_2$ boundaries are located in the references as illustrated in FIG. 12. These are found to be designated respectively as F3 and F4. The upper and lower bounds for each is found on Curve II from cross-references such as Table V of FIG. 14. They are the boundaries given by Maj (f,II) and Min (f,II) respectively:

Maj($f_1$, II)=F131 and Min($f_1$, II)=F100 for $f_1$; and

Maj($f_2$, II)=F133 and Min($f_2$, II)=F100 for $f_2$.

The elements of type T1 located on curve II whose $f_1$ and $f_2$ boundaries are located next above and next below each of the above boundaries are determined from references in Table VI respectively:

Majax$_1$(F100, T1)=E100;

Majax$_2$(F100, T1)=E100;

Minax$_1$(F131, T1)=E117; and

Minax$_2$(F133, T1)=E107.

The possible correspondents of element E2 are the elements included by the highest of the Majax(E100) and the lowest of the Minax(E107). Thus the possible correspondent elements are E100, E107 and any type T1 element, if present, in between (E102).

The calculation of the correlation coefficients would show that none of the possible correspondents is the actual correspondent of the element E2, as is obvious in comparing the elements illustrated in FIGS. 10 and 11. Consequently, no correspondent is taken for the element E2. In this case, no modifications of the upper and lower bounds are required. The next element of type T1 located on curve I is located. It is designated E4.

To determine the possible correspondents of E4, its initial $f_1$ and final $f_2$ boundaries are located in the previously derived references illustrated in FIG. 12. These are found to be designated as F7 and F8. The upper and lower bounds for each are determined as previously described. They are:

Maj($f_1$, II)=F136 and Min($f_1$, II)=F100 for $f_1$; and

Maj($f_2$, II)=F141 and Min($f_2$, II)=F100 for $f_2$.

The elements of type T1 located on curve II which limit the search for corresponding elements are:

Majax$_1$(F100, T1)=E100;

Majax$_2$(F100, T1)=E100;

Minax$_1$(F136, T1)=E117; and

Minax$_2$(F141, T1)=E117.

The possible correspondents of element E4 are the elements included by the highest of the Majax(E100) and the lowest of the Minax(E117) and any type T2 elements in between. Thus the possible corresponding elements are E100, E102, E107 and E117.

Correlation coefficients compare the characteristic parameters between element E4 and possible correspondents E100, E102, E107 and E117 are then computed.

As is obvious by the comparison of these elements in FIGS. 10 and 11, element E102 would be found as the best corresponding element. Further, element E102 would compare significantly better than elements E100, E107 and E117 so there would be no doubt as to the correlation resolution in the comparison and therefore no ambiguity. Finally, the degree of comparison between elements E4 and E102 is quite satisfactory so elements E4 and E102 are taken as corresponding elements. Element E100 is artificial (zero valued characteristics).

In such cases, and as illustrated in FIG. 9A at point ZA, the process continues with the modification of the boundaries found to correspond as the result of the elements found to correspond. This process is now described in regard to FIGS. 9B and 9C.

Referring now to FIG. 9B, the point designated as ZA is the same point similarly designated on FIG. 9A and corresponds to the start of modification bounds of boundaries as the result of two elements located on curves J and K respectively having been found to correspond. As indicated in Block 4100, the element located on curve K (the element with the best coefficient as was last tested as indicated in Block 4076 of FIG. 9A) is considered to correspond to the element located on the reference curve J. The process then continues as indicated in Block 4102 to begin one method of modifying the bounds used in the search for corresponding elements. The method hereafter described in regard to FIG. 9B corresponds to a method illustrated in FIGS. 17A through 17D'.

As indicated in Block 4102, one of the boundaries of the element on curve J, for example the lower boundary, is designated as $j_o$. This curve may be regarded as the reference curve $C_R$. The counterpart boundary on a second curve K is designated as $i_o$. This curve may be considered as a dependent curve, $C_D$. As indicated by the test contained in Block 4104 there is more than one method of modifying the bounds. The method indicated as option A and resulting from the test in Block 4104 answering YES will be described in regard to the description of FIG. 9C beginning at the point designated ZD. For now, the description will continue with an additional option as indicated by the test in Block 4104 answering NO.

In such a case the process continues to Block 4108 of FIG. 9B where the initially designated reference and dependent curves J and K are respectively stored as JS and KS. This step may be necessary to restore these values upon a completion of the modification process as indicated in Block 4160.

The next step may be as indicated in Block 4110 where an initial boundary f is considered as the initial point $j_o$. Then as indicated in Block 4112, the lower bound for this boundary on the curve designated as $C_D$, here designated as Min (f, $C_D$) is tested against the point previously designated as $i_o$. If the lower bound of f on curve $C_D$ is at, or above $i_o$, the test answers NO and the corresponding point on curve $C_R$, here designated $i_o$, is then considered as the boundary f as indicated in Block 4120. The upper bound of f on curve $C_R$, here designated as Maj (f, $C_R$) is tested against the point previously designated as $j_o$. If Maj (f, $C_R$) is at, or below $j_o$ as shown by the test answering NO the designation of the curves $C_R$ and $C_D$ need to be reversed, as indicated in Block 4130. Only one such reversal is considered as indicated in the test in Block 4132.

In such a case, the process begins again by this test answering YES and proceeds by Branch 4134 to Block 4110. The boundary f is again considered as $j_o$ and its lower bound on $C_D$ compared to $i_o$ as indicated in previously described Block 4112. If perchance this test also answers NO and the subsequent test as indicated in Block 4122 also answers NO, further reversals of $C_R$ and $C_D$ will not be allowed because the test indicated in Block 4132 will this time answer NO, and no further modifications are required for this boundary and the process continues as indicated bo Block 4136. If the test in Block 4112 answers YES, however, the process continues as indicated to Block 4116. In this case the lower bound for the boundary f on curve $C_D$ is modified to the point designated $i_o$, as indicated in Block 4116. In effect, this corresponds to raising the lower bound of a boundary f located above the point designated $j_o$ on $C_R$, up to the point designated as $i_o$ on $C_D$.

As indicated in Block 4118, the value of f is increased corresponding to the next boundary above the preceding considered boundary and the processes begin again at Block 4112. This process of modifying lower bounds is repeated for all boundaries f above $j_o$ whose lower bound is below $i_o$, as illustrated in FIG. 17A. However, when a boundary f whose lower bound is equal to $i_o$ is reached, the test indicated in Block 4112 answers NO and the process continues to Block 4120. Then considering the boundary f as $i_o$ the boundaries f whose upper bounds, located on the curve designated as $C_R$, are above the point designated as $j_o$, as indicated by the test represented in Block 4122 answering YES, are modified to be equal to $j_o$, as indicated in Block 4126. However, in contrast to Block 4118, Block 4128 shows the boundary designation f is now decreased corresponding to the next boundary below the preceding boundary, as indicated in Block 4128. The process of modification of the upper bound is then repeated again beginning at Block 4122.

This modification process is illustrated in FIG. 17B and continues for boundaries f located below $i_o$ until a boundary f whose upper bound is equal to $j_o$ is found. In such a case the test indicated in Block 4122 answers NO and the process continues as indicated to the previously described Block 4130. Designations of Curves $C_R$ and $C_D$ are reversed and allowed to remain reversed if this is the first reversal as indicated in Block 4132. Otherwise the test in Block 4132 answers NO and the process continues to the test as indicated in Block 4136.

As previously discussed, elements may have more than one boundary, and in such cases the test indicated in Block 4136 tests for the last boundary for such elements. If this boundary has not been processed, the test answers NO, and the process continues as indicated by Branch 4138 to Block 4140. Here new designations for points $i_o$ and $j_o$ are obtained, corresponding to the next counterpart boundaries on J and K respectively. Further, the designations for $C_R$ and $C_D$ are reset to curves J and K respectively, as was done in Block 4102 initially. Further, the indicator used to test the first reversal, as in the test at Block 4132, is reset and the process continues by rejoining Branch 4134 to begin again at Block 4110, as previously described.

However, if the last boundary of the elements found to be corresponding have been processed as indicated by the test in Block 4136 answering YES, the process continues to the test indicated in Block 4150 which tests to see if the last curve has been processed. The last curve KLAST is tested against the current dependent curve K. If they are equal, the test answers YES and the process continues by resetting J and K to the initial values as stored in JS and KS respectively, as indicated in Block 4160. The process then rejoins the correlation process previously described in FIG. 9A at point designated ZE, the modification of bounds being complete for these corresponding elements. However, if the test indicated in Block 4150 answers NO, the process continues as indicated by Branch 4152 to Block 4154 and new reference and dependent curves are assigned. The process then begins again at point designated ZC beginning at Block 4102 previously described. When more than two curves are being processed, the successive redesignations of $i_o$ and $j_o$ become more difficult.

The reversal of the curves designated as $C_R$ and $C_D$ as indicated in Block 4130 for the first reversal allows the extension of the previously described steps, indicated as Blocks 4110 through Blocks 4128, to perform the process illustrated in FIGS. 17C and 17D.

The redesignation of the points considered as $i_o$ and $j_o$ as indicated in Block 4140 allows the previously described steps to further extend to the process illustrated in FIGS. 17A' through 17D' in regard to any additional counterpart boundaries of the corresponding elements, and in particular in regard to their upper boundary, as illustrated in these particular figures. If the considered element had only one boundary, for example, the test indicated in Block 4136 would answer YES on the first test, and the redesignation indicated in Block 4140 would not take place, nor would the process illustrated in FIGS. 17A' through 17D'.

As indicated in Block 4104, an additional method of performing the modifications described herein is possible. This process begins at the point designated ZB on FIG. 9C, as continued from Point ZB on FIG. 9B.

Referring again to FIGS. 10 and 11, consider that the elements shown as E4 and E102 are known to correspond. Therefore, their initial and final boundaries must correspond. To perform these and other modifications the following steps may be carried out. With $C_R = I$ (Curve I) and $C_D = II$ (Curve II) as indicated in Block 4102 of FIG. 9B, $i_o = F7$ and $j_o = F103$, as would be found in the references illustrated in FIGS. 12 and 13 respectively. As indicated in Block 4250 of FIG. 9C, the difference, Maj ($j_o$, $C_R$)–Maj ($i_o$, $C_R$) is computed. These references correspond to the following boundaries: Maj ($j_o$, I) = F29 and Maj ($i_o$, I) = F7. The computed difference corresponds to F29-F7, which is positive and results in the test indicated in Block 4250 answering "+". The process continues as indicated to Block 4252 where $i_o$ and $j_o$ are reversed. Thus, $i_o = F103$ and $j_o = F7$. Recalling that $C_D$ has been designated as Curve II, the difference computed as indicated in Block 4253 becomes Maj ($j_o$, I)–Maj [Min ($i_o$, II), I]. These references correspond to the following boundaries:

Maj($j_o$,I) = F7, Min ($i_o$,II) = F103, and

Maj[Min($i_o$,II),I] = F29.

The computed difference corresponds to F7-F29 which is negative, indicating that there are modifications to be made. The test indicated in Block 4253 answers "−" and the process thus continues to Block 4255 which represents the modification of the upper bounds. The boundaries f of the Curve I, whose lower bound on the Curve II is to be modified, are such that:

Maj($j_o$,I)≦f<MajMin($i_o$,II),I, that is;

F7≦f<F29.

Thus Block 4255 represents, in this case, modifying the lower bounds of boundaries f which are at or above F7 and below F29. The modification of the lower bound Min on Curve II of boundaries corresponding to F7 through F28 is Min ($i_o$, II) or F103. These modifications are illustrated as updated entries placed in the column a of Table V (FIG. 14). The actual entry of such updates are made at a later time so as not to effect the current modification process itself. Therefore, the references needing updating may be stored elsewhere temporarily.

Block 4256 represents the modification of the upper bounds. The boundaries f of the Curve II, whose upper bound on the Curve I is to be modified, are such that:

Min[Maj($j_o$,I),II]<f≦Min($i_o$,II).

These references correspond to boundaries, F100 and F103 respectively. Thus Block 4256 represents, in this case, modifying the upper bounds of boundaries f which are above F100 and below or at F103. Thus, the modification of the upper bound Maj on Curve I of boundaries corresponding to F101 through F103 is Maj ($j_o$, I) or F7. These modifications are illustrated as updated entries placed in column b of Table VI (FIG. 15).

As indicated by Block 4254, $C_D$ is tested to see if it is the last curve. If not, the test answers NO, and a new curve is designated as $C_D$ as indicated, in Block 4258. The process the begins again at the previously described Block 4253.

By reversing $C_R$ and $C_D$ in the same manner as indicated in Block 4130 of FIG. 9B, $C_R$ becomes Curve II and $C_D$ curve I. The process started at Block 4250 can again be repeated. As before, $i_o$=F7 and $j_o$=F103. Now, the difference computed as indicated in Block 4250 becomes Maj ($j_o$, II)–Maj ($i_o$, II). These references correspond to boundaries F103 and F136, respectively. The computed difference correspond to F103-F136 which is negative, which results in the test indicated in Block 4250 answering "—". Consequently, $i_o$ and $j_o$ do not have to be reversed. The process continues to Block 4253.

With $C_D$=I (Curve I) and $C_R$=II (Curve II), the difference computed as indicated in Block 4253 becomes:

Maj($j_o$,II)–Maj[Min($i_o$,I),II].

These references correspond to the following boundaries:

Maj($j_o$,II)=F103;

Min($i_o$,I)=F7 and

Maj[Min($i_o$,I),II]=F136.

The computed difference corresponds to F103–F136 which is negative, indicating there are modifications to be made. The test indicated in Block 4253 answers "—" and the process continues to Block 4255 for the modification of lower bounds. The boundaries f of the Curve II, whose lower bound on the Curve I is to be modified, are such that:

Maj($j_o$,II)≦f<Maj[Min($i_o$,I),II]; that is

F103≦f<F136.

Thus Block 4255 represents, in this case, modifying the lower bounds of boundaries f which are at or above F103 and below F136. Thus the modification of the lower bound on Curve I of the boundaries corresponding to F103 through F135 is Min ($i_o$, I), or F7. These modifications are illustrated as updated entries placed in column c of Table VI (FIG. 15).

The process continues to Block 4256 for the modification of upper bounds. The boundaries f of the Curve I, whose upper bound on the Curve II is to be modified, are such that:

Min[Maj($j_o$,II),I]<f≦Min($i_o$,I).

These references correspond to boundaries F0 and F7, respectively.

Thus Block 4256 represents, in this case, modifying the upper bounds of boundaries f which are above F0 and below, or at F7. Thus, the modification of the upper bound on the Curve II of the boundaries corresponding to F1 through F7 is Maj ($j_o$, II) or F103. These modifications are illustrated as updated entries placed in column d of Table V (FIG. 14).

The modifications resulting from the correspondence between the final boundaries F8 and F104 are determined as follows: First with $C_R$=I (Curve I), $C_D$=II (Curve II), and $i_o$=F104 and $j_o$=F8, the difference indicated in Block 4250 becomes: Maj ($j_o$, I)–Maj ($i_o$, I). These references correspond to boundaries F8 and F37, respectively.

The difference corresponds to F8-F37, which is negative, which results in the test indicated in Block 4250 answering "—". Consequently, $i_o$ and $j_o$ do not have to be reversed. The process continues at Block 4253. The difference indicated in Block 4253 becomes:

Maj($j_o$,I)–Maj[Min($i_o$,II),I].

These references correspond to boundaries F8 and F37 respectively. The difference corresponds to F8-F37, which is negative, indicating there are modifications to be made. The test indicated in Block 4253 answers "—", and the process continues to Block 4255 for the modifications of the lower bounds.

The boundaries f of the Curve I whose lower bound on the Curve II is to be modified, are such that:

Maj($j_o$,I)≦f<Maj[Min($i_o$,II),I]that is

F8≦f<F37.

Thus, Block 4255 represents, in this case, modifying the lower bound of above F8 and below F37. Thus, the lower bound on Curve II of the boundaries corresponding to F8 through F36 is Min($i_o$, 11), or F104. These modifications are illustrated as updated entries placed in column a' of Table V (FIG. 14). The process continues to Block 4256 for the modification of upper bounds. The boundaries of the Curve II, whose upper bound on the Curve I is to be modified, as indicated in Block 4256, are such that:

Min[Maj($j_o$,I),II]<f≦Min($i_o$,II).

Thus Block 4256 represents in this case, modifying the upper bound on the curve I of boundaries of which are above F103 and at or below F104. Thus, the modification of the upper bound on Curve I of the boundary corresponding to F104 is Maj($j_o$, I), or F8. This modification is illustrated as updated entries placed in column b' of Table IV (FIG. 15). In the manner previously described, $C_R$ and $C_D$ are reversed. Then with $C_R$=II (Curve II), $C_D$=I(Curve I), $i_o$=F8 and $j_o$=F104. The difference indicated in Block 4250 becomes:

Maj($j_o$,II)−Maj($i_o$,II).

These references correspond to boundaries F104 and F141 respectively.

The difference correspond to F104-F141, which is negative and indicates $i_o$ and $j_o$ need not be reversed. The test indicated in Block 4250 answers "−" and the process continues at block 4253. The difference indicated in Block 4253 becomes Maj($j_o$, II)−Maj[Min($i_o$, I), II]. This represents, in this case, Min($i_o$,I)=F8 and Maj[Min($i_o$, I), II]=F141.

The difference corresponds to F8-F141, which is negative indicating there are modifications to be made and the test answers "−". The process continues to Block 4255 for the modification of the lower bounds.

The boundaries f of the Curve II, whose lower bound on the Curve I is to be modified, are such that:

Maj($j_o$,II)≦f<Maj[Min($i_o$,I),II]; that is

F104≦f<F141.

Thus, Block 4255 represents, in this case the modification of the lower bound of boundaries at or above F104 and below F141. Thus, the lower bound on the Curve I of the boundaries corresponding to F104 through F140 is Min(i,I) or F8. These modifications are illustrated as updated entries placed in column c' of Table IV (FIG. 15).

The process continues to Block 4256, for the modification of the upper bounds. The boundaries f of the Curve I, whose upper bound on the Curve II is to be modified, are such that:

Min[Maj($j_o$,II),I]<f≦ Min($i_o$,I); that is

F7<f≦F8.

Thus Block 4256 represents in this case the modification of the upper bound on the Curve II of the boundaries above F7 and at, or below F8. The modification of the upper bound of boundary F8 is Maj($j_o$,II), or F104. This modification is illustrated as an updated entry placed in column d' of Table V(FIG. 14).

It appears clearly at this stage that the correspondences established can be found on the references of lower and upper bounds (columns a', b', c' and d') of FIGS. 14 and 15. In fact, it can be seen that:

(a) Min(F7, II)=Maj(F7, II)=F103 (columns a' and d') and Min(F103, I)=Maj(F103, I)=F7 (columns c' and b'), reflecting the correspondence between the boundaries F7 and F102; and, (b) Min(F8, II)=Maj(F8, II)=F104 (columns a' and d') and Min(F104, I)=Maj(F104, I)=F8 (columns c' and b'), reflecting the correspondence between the boundaries F8 and F104.

The search continues by returning to the point designated at ZE on FIG. 9A, to search for and process the rest of the elements of Type 1, after which the elements of type 2 are processed and then the elements of type 3 and finally the elements of type 4, for example.

To illustrate the modification of the search intervals or bounds as the processing is performed, the table below indicates for the elements E15 (of type 2), E11 (of type 3) and E12 (of type 4), as shown in FIG. 10, the number of possible correspondents, as shown in FIG. 11, which are assigned to each of them at the beginning of the search and then after determining the correlations between the elements of types 1, 2, 3 and 4 successively.

| | | Number of possible correspondents | | | | |
|---|---|---|---|---|---|---|
| | | at start | after determining correspondences between elements of type | | | |
| Element | Type | of process | 1 | 2 | 3 | 4 |
| E15 | 2 | 4 | 1 | — | — | — |
| E11 | 3 | 7 | 2 | 2 | — | — |
| E12 | 4 | 6 | 3 | 3 | 1 | — |

This example clearly shows that the modifications of the upper and lower bounds resulting from the establishment of new correspondences decreases the number of possible correspondences rather rapidly.

Referring now to FIG. 9D which begins at the point designated ZZ, previously indicated in FIG. 9A, there is illustrated one method of computing displacements between samples of elements which have been found to correspond through the processes previously described and illustrated herein. This method may be regarded as a possible fourth stage or phase. It may be performed anytime after two or more elements are found to correspond. Here the method is illustrated as being performed immediately after Phase three.

Beginning then in Block 4300, the reference curve designator J and dependent curve designator K are initialized, and subsequently incremented as indicated in Block 4302. Further, in Block 4304 an element designator N is also initialized. Then, as indicated in Block 4306, N is tested against the last element NL detected in the previous processes. If N is less than the last element on curve J, the test indicated in Block 4306 answers YES and the process continues as indicated by Branch 4308 to Block 4310 where N is incremented to the next element.

Thus, in Block 4312, which follows, the element designated N is located on curve J. The location step corresponds to examining the references previously established to obtain the element. In a similar manner, as indicated in Block 4314, the element corresponding to element N is located on Curve K also using the references. Then as indicated in Block 4316, the location of an outstanding or representative sample of each of the elements is obtained from the references.

These outstanding or representative samples might be the sample designating the peak in the case of peak-bumps and peak-depressions or the sample designating the mid-point of the elements known as a surge. In these cases, this sample has previously been designated as a boundary for such elements. In the same manner, the boundaries of elements having more than one boundary may be regarded as corresponding to the outstanding samples. In any case, it is the purpose of these samples to represent the element as to its position on the curve.

As indicated on the next Block 4318, the displacement between these outstanding samples is computed. In most cases the displacement will correspond to the number of samples actually occurring between the corresponding outstanding samples. As indicated in Block 4320, it may be sufficient to output at this point the position, type, the correlation coefficient and the computed displacements for the located elements.

However, as previously described herein, these displacements may also be used either at this time or subsequent to this process, for the purposes of computing shifts necessary to align samples or computing the inclination of a plane and thereafter the dip and azimuth of this dip, as in the case of dipmeter signals.

In either case, the process continues by returning to Block 4306. There N is tested to see if it corresponds to the last element. If not, the process continues as previously described. If, however, the last element has been processed, the test indicated in Block 4306 answers NO and the process continues to Block 4330. In this case, K is tested to see if it corresponds to the last curve KLAST. If the answer is NO, the process continues as indicated by Branch 4332 to Block 4302 where, J and K are incremented and the process previously described is repeated. Otherwise, the test indicated in Block 4330 answers YES and corresponds to the end of the process.

In summary, there has been described herein an automatic method of detecting and characterizing characteristic signal elements which correspond to recognizable features on sampled signals. The samples of each signal are searched in a process which includes computing and using various slope functions, averages and extema to detect groups of samples corresponding to known types of elements which are representative of significant signal features. When such an element is detected, the type of element, its boundaries, the positions of its boundaries, characteristic samples and parameters which represent the form of the element are recorded.

The recorded boundary values for each signal are subsequently sorted. The elements detected for each signal may be also sorted. The sorting orders the boundaries and elements in accordance to their relative position on a given signal.

After the sorting, element and boundary sequence numbers may be assigned which further represent the relative positions. The relative positions may be used to generate references and cross-references which further facilitate the process which follows. The cross-references are generated in terms of upper and lower bounds for each boundary considered on the signal designated as a reference signal. To create such bounds, two boundaries are determined on a signal designated as a comparison signal which are located respectively furthest above and below the considered boundary and within a given interval from said considered boundary. These are regarded as initial or provisional bounds for use in the search for corresponding elements located on the comparison signal which might possibly correspond to an element located on the reference signal.

Further cross-references may be generated for each considered boundary on a given signal which determines the elements of each type which have their respective boundaries located next above and next below each considered boundary.

In an additional process, an element is selected of a known type which provides the best reliability for correlations. This selected type of element is located on the reference curve. References of the selected type of element or compatible type of element detected on the comparison curve are searched to locate possible corresponding elements which have their counterpart boundaries below the initial upper bound and above the initial lower search bound for the counterpart boundaries of the reference curve element.

These possible corresponding elements are compared, in terms of their characteristic parameters, with the element located on the reference curve. Each such comparison results in a correlation coefficient. The correlation coefficients for the two best comparing elements are further compared to determine if the difference in the coefficients exceeds a given threshold for such a difference. If the difference is found to be acceptable, the best comparing coefficient is compared with an additional threshold and if this comparison is also acceptable, the best comparing elements and their respective boundaries are regarded as corresponding.

In a subsequent process, the previously determined provisional bounds are modified to reflect the above correspondence and thereby provide new provisional bounds for subsequent use in searching for possible corresponding elements. The steps of locating additional elements on the reference curve and additional corresponding elements on the comparison curve which are within the provisional bounds, comparing such possible corresponding elements to determine the correlation coefficients and determining the acceptability of the correlation coefficients continues until all such elements of all types in a type order desired on each of the curves have been processed. This process continues by selecting the type of elements according to a type order known to provide the desired type of correlation. The type order may include the most reliable corresponding types of elements first and the least reliable correlating types of elements last, the correlation of these latter elements benefitting from the correspondents determined from the previously more reliable types of elements.

When all possible corresponding elements have been found, displacements may be computed between the corresponding elements and their corresponding boundaries. If such curves or signals originated from a dipmeter tool, for example, the displacements may be used to compute the attitude of formation features represented by the corresponding elements of boundaries relative to the tool position and when further provided with the tool position, they may be used to compute the dip of the corresponding formations and the azimuth of this dip.

On the other hand, when the samples correspond to signals obtained with unknown sample displacements between the signals, the displacement computed between signals processed in the manner described herein may be used as alignment corrections to align the signals which then allows their accurate combination to further evaluate subsurface geological formations.

Still further, when the signals are obtained from other sources such as seismic signals, the method of correlation disclosed herein may be used to more accurately determine the identification of the characteristic portions of such signals, determine which portions correspond and thereafter determine the displacements between the corresponding portions.

Such displacements between corresponding signal portions determined over a multitude of traces obtained from known surface positions at known times may be used to detect or to determine the velocity of the formations traversed by the signals as a function of either depth or horizontal distance.

In further signal applications such as in biomedical signals, the method disclosed herein may be used to determine the signal elements corresponding, for example, to the various portions of a heart beat, determine the corresponding portions of the subsequent heart beats and determine the displacements between the corresponding portions to further determine the nature of the heart action over a multitude of pulses.

While particular embodiments of the present invention have been shown and described, it is apparent to those skilled in the art that various changes and modifications may be made therein without departing from the invention, and it is therefore intended to cover all such changes and modifications as fall within the true spirit and scope of the invention.

I claim:

1. A method of machine processing a first well log and a second well log, where each log is made up of a multiplicity of log samples derived from a device taking measurements while being passed through a borehole in an earth formation, so as to locate components of said first log which are likely to be incorrectly depth displaced relative to said second log and to convert one of said logs into an improved, depth-shifted log, comprising the following steps each of which is machine implemented:
    (a) filtering the logs to locate within each log a plurality of log elements which correspond to respective element types of a collection of different preselected element types, where each preselected element type corresponds to a significant well log feature and may thus correspond to a significant earth formation feature;
    (b) finding, according to the type of element, a number of representative characteristic parameters of each of the log elements located in the preceding step;
    (c) matching the characteristic parameters found in the preceding step for a log element with the corresponding parameters found in the preceding step for log elements of the other log to find which log elements correspond to each other; and
    (d) depth-shifting one of said logs based on log element correspondence found in the preceding step and producing a tangible representation of the resulting depth-shifted log.

2. A method as in claim 1 wherein the step of matching said characteristic parameters includes the step of establishing predetermined depth bounds on the second log, between which may be found an element corresponding to a specific element of the first log, and matching the parameters, of said specific element, only with the parameters of the elements of the second log which are located within said predetermined bounds.

3. A method as in claim 2 where the step of matching includes matching only said parameters of elements which are of comparable types.

4. A method as in claim 3 where the step of finding representative characteristic parameters includes detecting element boundaries which define the extent of an element and where the step of establishing said predetermined bounds includes arranging said element boundaries according to pre-established criteria of corresponding positions to provide provisional bounds for matching said parameters.

5. A method as in claim 4 where the step of establishing said predetermined bounds includes modifying said provisional bounds according to pre-established criteria of corresponding positions after determining that at least two elements, one from each of said first log and second log, correspond to each other to provide further provisional bounds for use thereafter in matching said parameters of possible corresponding elements.

6. A method as in claim 5 where the step of matching said parameters of selected types of said elements includes arranging said selected types of elements to allow matching of elements of said types in a preselected order of types.

7. A method as in claim 6 where the step of matching said parameters includes selecting as corresponding only elements which match within defined criteria.

8. A method as in claim 7 including the step of finding depth displacements between at least two elements, one for each of said first log and second log, which have been found to correspond to one another.

9. A method of machine-processing of a first well log and a second well log which are made up of log samples derived from a device or devices taking measurements while being passed through a borehole in an earth formation, so as to find depth displacements between respective samples of different logs and to use the found depth displacements to produce a tangible representation of at least one of (i) an improved, depth-shifted log resulting from filtering a first one of said logs on the basis of components thereof which have been found to be depth-displaced relative to corresponding components of the second one of said logs, and (ii) bedding plane inclinatious of an earth formation, comprising the following steps, each of which is machine-implemented:
    (a) processing samples of said logs to locate multi-sample log elements which conform to respective specific types of log elements;
    (b) finding characteristic parameters for each of a plurality of said located log elements;
    (c) sorting said locations to provide bounds for selecting possible corresponding elements;
    (d) selecting possible corresponding elements located within said bounds;
    (e) matching said characteristic parameters of one selected element of a first one of said logs with the possible corresponding elements of a second one of said logs to determine which elements of the first log and second log correspond to one another; and
    (f) using the results of the preceding step to produce a tangible representation of at least one of:
        (i) an improved, depth-shifted log resulting from modifying said first log on the basis of components thereof which are due to elements of said first log determined in the preceding step to have a selected correspondence with elements of the second log; and
        (ii) bedding plane inclinatious of said earth formation defined by elements of said first log and second log which have been found to correspond to each other in the preceding step.

10. A method as in claim 9 where the step of selecting elements includes selecting only elements of comparable specific types as possible corresponding elements.

11. A method as in claim 9 including the step of modifying said bounds according to given criteria for corresponding elements to provide new bounds for selecting further possible corresponding elements.

12. A method as in claim 11 where the step of selecting possible corresponding elements includes selecting as possible corresponding elements, only elements of types which have been selected as comparable types of elements.

13. A method as in claim 12 where the step of selecting possible corresponding elements includes selecting as possible corresponding elements, elements of a given type only after determining which elements of a previously given type correspond to one another.

14. A method as in claim 13 where the step of selecting possible corresponding elements includes selecting as possible corresponding elements only elements of a given type located within the bounds provided by modifying previous bonds according to given criteria for corresponding elements, thereby restricting the number of possible locations of corresponding elements of said given type.

15. A method as in claim 14 where the step of selecting possible corresponding elements of a given type located within modified bounds includes providing bounds modified as the result of determining which elements of a previously given type correspond to one another.

16. A method as in claim 15 including the step of finding depth displacements between elements determined to correspond to one another.

17. A method as in claim 15 where said given type of element is different than said previosuly given type of element.

18. A method as in claim 15 where said given type of element corresponds to a less significant type of element than said previously given type of elements.

19. A method as in claim 15 where said given type of element is of the type for which the determination of corresponding elements is less reliable than the determination of corresponding elements of said previously given type.

20. A method of automatically locating with a machine, characteristic signal elements corresponding to recognizable features in sampled signals and using the located elements to find which ones correspond to each other and then using the found correspondence to produce an improved signal resulting for modifying one of said signals on the basis of components thereof which are due to samples thereof having found displacements relative to samples of another of said signals, comprising the following machine-implemented steps:
(a) searching samples of said signals to detect the locations of multi-sample signal elements of a first specified type;
(b) searching said samples to detect the locations of signal elements of a second specified type;
(c) finding characteristic parameters for said detected signal elements according to their type;
(d) providing predetermined limits for corresponding elements and locating possible corresponding elements within said predetermined limits;
(e) matching said characteristic parameters for said located possible corresponding elements to determine elements which correspond to each other; and
(f) using the determination of correspondence made in the preceding step to modify the first signal on the basis of components thereof due to samples thereof having displacements relative to samples of the second signals, and producing a tangible representation of the modified first signal.

21. A method as in claim 20 including the step of finding a displacement between elements which correspond to each other.

22. A method as in claim 21 where said predetermined limits correspond to an assumed maximum possible displacement between said detected locations of signal elements.

23. A method as in claim 22 including the step of modifying said predetermined limits in accordance with the displacement between elements which correspond to provide further limits for locating further possible corresponding elements.

24. A method as in claim 23 including the steps of locating possible corresponding elements within said modified limits and comparing said characteristics to determine if any other elements correspond to each other.

25. A method as in claim 24 where the step of locating possible corresponding elements within predetermined limits includes locating, as possible corresponding elements, elements which are of one of said first and second specified type and are within said limits.

26. A method as in claim 25 where the step of locating possible corresponding elements within said predetermined limits and within said modified limits includes locating, as possible corresponding elements, elements of said first specified type within said predetermined limits and said second specified type within said modified limits.

27. A method of automatically determining with a machine characteristic signal elements corresponding to recognizable features in sampled signals and further processing the signals to extract more useful contents thereof and to produce tangible representations of said more useful contents comprising the following machine implemented steps;
(a) searching samples of said signals to detect sample patterns indicative of locations of a plurality of specific types of signal elements;
(b) determining, according to the type of element, defined boundaries and characteristic parameters of each element corresponding to a detected sample pattern;
(c) establishing bounds for locating possible corresponding elements within said bounds;
(d) locating a reference element of a preselected type and possible corresponding elements of comparable types within said established bounds and comparing said possible corresponding elements with said reference element to provide a correlation coefficient for each comparison;
(e) comparing said correlation coefficient to determine which, if any, of said possible corresponding elements correspond to said reference element; and
(f) using the determination made in the preceding step to extract selected more useful contents of at least one of said signals and to produce a tangible representation of the extracted more useful contents.

28. A well log processing method comprising:
a. deriving a first well log and a second well log on the basis of well logging measurements produced by passing one or more well logging devices through one or more boreholes in an earth formation;
b. machine-processing the logs to locate within each a plurality of log elements which correspond to respective element types of a collection of different preselected element types, where each preselected type corresponds to a significant well log feature and is therefore likely to correspond to a significant earth formation feature;

c. finding for each log element and according to the type of element, a number of representative characteristic parameters thereof;

d. for each of a number of the log elements of one of the logs, matching the characteristic parameters thereof with the corresponding parameters found for log elements of the other log; and e. generating and machine-storing a representation of the depth displacement between log elements of the two logs which correspond to each other on the basis of said matching, to machine-store thereby a representation of the depth-shift which is likely to be required for depth-aligning the two logs to each other.

29. A method as in claim 28 in which the matching step comprises matching the parameters of a given element of the first one of said logs with the parameters of only log elements of the second log which are within a defined depth span of the second log and matching the parameters of another given element of the first log with the parameters of only elements of the second log which are within another depth span of the second log.

30. A method as in claim 29 in which the matching step includes matching only the parameters of elements which are of comparable types.

31. A method as in claim 30 in which said matching comprises arranging the log elements in a selected order of types and matching elements of one type before matching elements of the next type in said order.

* * * * *